US006865458B1

(12) United States Patent
Kim

(10) Patent No.: US 6,865,458 B1
(45) Date of Patent: Mar. 8, 2005

(54) INTEGRATED DIGITAL CONTROL SYSTEM AND METHOD FOR CONTROLLING AUTOMOTIVE ELECTRIC DEVICE

(76) Inventor: Oh-Young Kim, 354-31, Shinlim 6-dong, Gwanak-ku, Seoul 151-016 (KR)

(*) Notice: Subject to any disclaimer, the term of this patent is extended or adjusted under 35 U.S.C. 154(b) by 121 days.

(21) Appl. No.: 10/019,484

(22) PCT Filed: Jun. 29, 2000

(86) PCT No.: PCT/KR00/00690

§ 371 (c)(1), (2), (4) Date: Feb. 28, 2002

(87) PCT Pub. No.: WO01/02756

PCT Pub. Date: Jan. 11, 2001

(30) Foreign Application Priority Data

Jul. 1, 1999 (KR) .......................... 1999/26331

(51) Int. Cl.[7] .............................................. F16H 61/12
(52) U.S. Cl. ........................ 701/36; 701/29; 701/31; 701/33; 701/34; 340/438; 340/439; 340/455
(58) Field of Search ............................... 701/29, 31, 33, 701/34, 36; 340/438, 439, 455

(56) References Cited

U.S. PATENT DOCUMENTS

| 4,249,498 A | | 2/1981 | Drews et al. | |
|---|---|---|---|---|
| 4,395,624 A | | 7/1983 | Wartski | |
| 4,419,654 A | * | 12/1983 | Funk | 340/438 |
| 4,580,127 A | * | 4/1986 | Blowers | 341/127 |
| 4,924,418 A | * | 5/1990 | Bachman et al. | 702/188 |
| 4,980,845 A | * | 12/1990 | Govekar | 701/33 |
| 5,270,689 A | * | 12/1993 | Hermann | 345/157 |
| 5,579,235 A | * | 11/1996 | Schlichenmaier et al. | 702/64 |
| 5,794,165 A | | 8/1998 | Minowa et al. | |
| 5,916,288 A | * | 6/1999 | Hartman | 701/36 |
| 6,009,360 A | * | 12/1999 | Knapp | 701/29 |
| 6,373,472 B1 | * | 4/2002 | Palalau et al. | 345/173 |

FOREIGN PATENT DOCUMENTS

KR    98078162    11/1998

* cited by examiner

Primary Examiner—Thomas G. Black
Assistant Examiner—Eric M. Gibson
(74) Attorney, Agent, or Firm—Rothwell, Figg, Ernst & Manbeck, p.c.

(57) ABSTRACT

Disclosed is an integrated digital control SYSTEM and method for an automotive electrical device. The SYSTEM comprises switch means for controlling each portion of a vehicle, the switch means including switches; switch monitor means for displaying switch functions and operational states of the switches input from the switch means; switch control means for generating pulse signals corresponding to the switches operated and controling the switch monitor means; auxiliary control means for performing input/output control, malfunction detection, automatic control, etc. of each logic-division portion; central control means for performing control of the auxiliary control means and all data; instrument panel/monitor means for performing an instrument panel stimulation and applications program graphic processing according to control by the central control means; and RPM pulse generating means for providing RPM pulses to the central control means and the auxiliary control means through an RPM pulse cable. The method comprises the steps of performing logic divisions of each portion of the vehicle into predetermined regions; performing digital conversion of corresponding input/output data according to each divided region, and analyzing the input data according to region and performing integrated management into integrated code data to control the electrical device in the corresponding region; detecting malfunctions of the electrical device in the corresponding region; and controlling the detected malfunctions in the corresponding region.

57 Claims, 40 Drawing Sheets

FIG.18

Normal operation determination

| Predetermined short value | Predetermined normal state value | Predetermined disconnection value |
|---|---|---|
| | Present value | |

Disconnection determination

| Predetermined short value | Predetermined normal state value | Predetermined disconnection value |
|---|---|---|
| | | Present value |

Short determination

| Predetermined short value | Predetermined normal state value | Predetermined disconnection value |
|---|---|---|
| Present value | | |

FIG.32

| | S2-1 ○ external | S2-2 ● internal | S2-3 ○ heater | S2-4 ○ A/C | S2-5 ○ other | S2-6 ○ | S2-7 ○ | S2-8 ○ | |
|---|---|---|---|---|---|---|---|---|---|
| S1_1 ● | stair light | | | | | | | internal light1 | S1_5 ○ |
| S1_2 ● | driver compartment light | | LCD monitor (conversion of monitor to internal switches since internal switches have been called) | | | | | internal light2 | S1_6 ○ |
| S1_3 ● | reading lamp(right) | | | | | | | internal light3 | S1_7 ○ |
| S1_4 ● | reading lamp(lemp) | | | | | | | internal light4 | S1_8 ○ |
| | P_1 ○ | P_2 ○ | P_3 ○ | P_4 ● | P_5 ○ | P_6 ○ | P_7 ○ | P_8 ○ | |

FIG.33

| | P increase | |
|---|---|---|
| S2 reduction | ⇕⇔ | S2 increase |
| | P reduction | |

| Check | | Cancel |
|---|---|---|

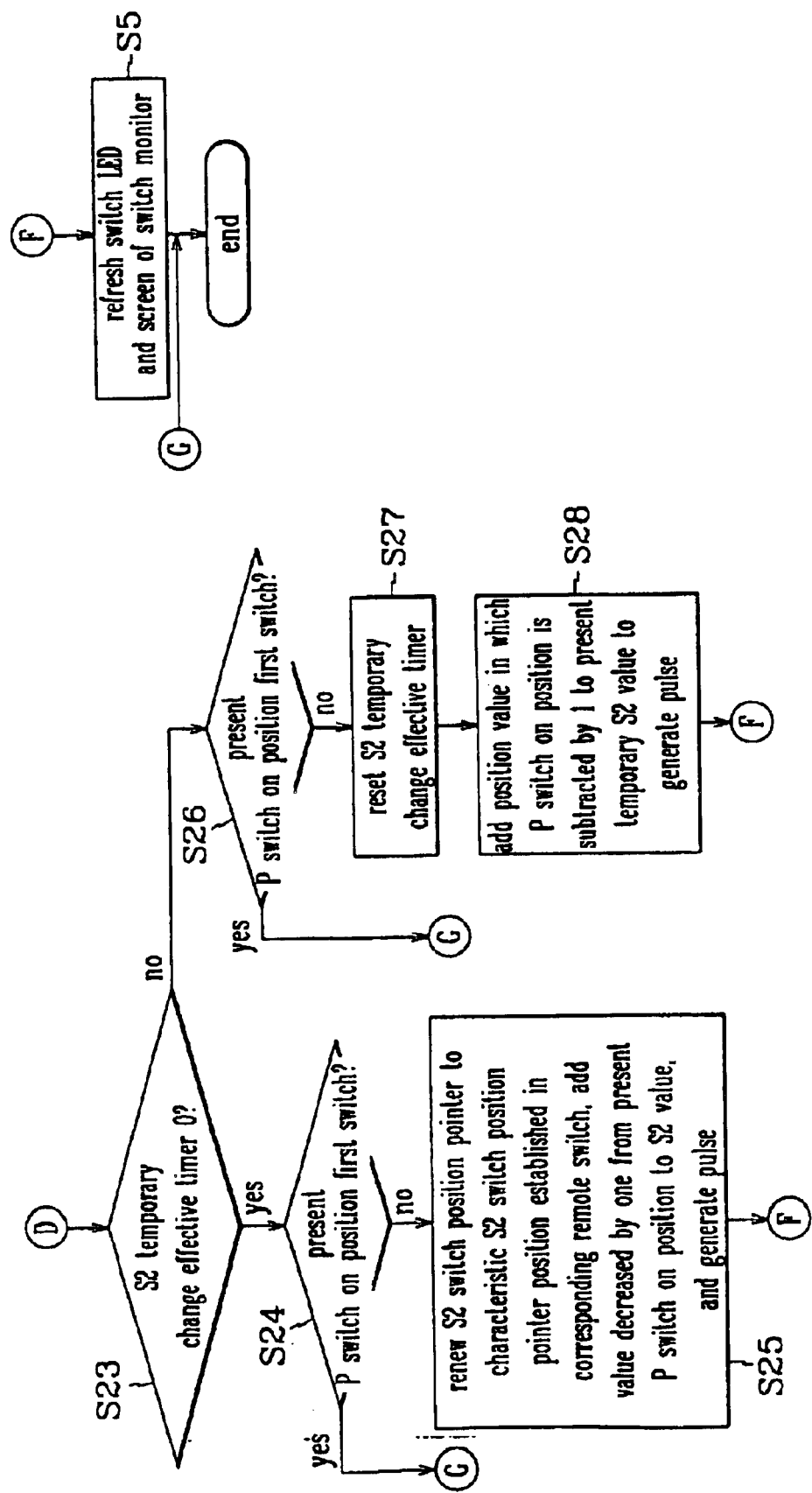

INTEGRATED DIGITAL CONTROL SYSTEM AND METHOD FOR CONTROLLING AUTOMOTIVE ELECTRIC DEVICE

BACKGROUND OF THE INVENTION

1. Field of the Invention

The present invention relates to an integrated digital control system and method for an automotive electrical device, and more particularly, to an integrated digital control system and method for an automotive electrical device in which a vehicle is separated into logic regions, and input and output elements of the separated logic regions are divided to enable digital integration.

2. Description of the Invention

The conventional automotive electrical device is provided in a centralized manner in which there are mounted a switchboard, control switches, etc. with a central instrument panel. Input lines and control lines are wired along and/or within a frame of the vehicle and coupled with the use of connectors. In buses, since the electric devices are provided to the rear of the bus, it is common to require the use of one hundred or more thick wires that are ten meters or more in length. Because such a large number of wires are positioned through the use of connectors within the frame, many electrical wiring problems result, the repair of which is difficult.

Further, since electronic control units of the conventional vehicle are individually mounted on an analog foundation, integrated control is not possible. Also, integration of the electronic control units is not possible because input and output for control of each unit is independentlyprocessed. Accordingly, many electronic control units, and a large number of wires and connectors are needed in the conventional automotive electrical device. The resulting complicated circuit structure makes for the more frequent occurrence of malfunctions and difficult repair.

FIG. 1a shows a schematic view of conventional frame wiring used to connect control switches, an instrument panel, a switchboard and output elements at a front of a bus to sensors. FIG. 1b shows a schematic view of conventional frame wiring used to connect output elements of an engine and sensors, and sensors and output elements provided throughout the remainder of the bus.

The output elements refer to parts that are controlled by electric power of the vehicle. The output elements include lamps, coils, electric motors, and assembly parts. The sensors include an oil meter sensor, a fuel meter sensor, a temperature meter sensor, an internal temperature sensor, etc. That is, the sensors are input elements mounted to the vehicle and which variably perform the display of different states of the vehicle. The sensors also include pulse sensors for generating pulses according to varying states such as an RPM pulse sensor, a KM pulse sensor and an ABS sensor. Additionally included as sensors are all input elements such as a brake light switch, an air deficient switch, a parking light switch, and various switch sensors that are On/Off operated such as a coolant level sensor.

As an example, wiring between a temperature gauge and a temperature sensor will be described. A connector 1 of driver compartment wiring is connected to the temperature gauge of the instrument panel. A connector 2 of the driver compartment wiring is coupled to a connector 5 of a lower wiring of FIG. 1b. The lower wiring circles around a lower portion of the bus leading to the rear of the same. A connector 6 at the rear of the bus is connected to the temperature sensor, thereby interconnecting the temperature gauge and sensor.

As another example, the connection between control switches and interior lights will be described. Interior light switches are connected to a connector 4 of the switchboard as shown in FIG. 1a. After passing through relays and fuses of the switchboard then the driver compartment wiring, connection to an upper wiring is realized through the connector 2 and a connector 3. That is, through the connectors 2 and 3 which provide an outlet for the driver compartment wiring, and connectors 7, 8 and 9, the connection between the control switches and interior lights is completed.

Further, since direct mechanical connections are used by the conventional automotive electrical device, many controllers and parts must be added to enable automatic control of the electrical device.

The most difficult area of control in a control method of the conventional automotive electrical device is that of automatic malfunction detection. This is a result of the sensors and output elements being directly and individually connected. For example, a hydraulic pressure sensor and a hydraulic pressure gauge are connected using many connectors and sections of wiring. If a short is generated in an input wire of the sensor, a short circuit state occurs in all the elements connected to the input wire (the remainder of the wire, hydraulic pressure gauge, etc.). In this case, it is difficult to determine the source of the short circuit (i.e., whether it originates from the wiring itself, connectors, gauge, or other devices used as input by the hydraulic pressure sensor).

Using a charge malfunction as another example, elements that can cause a charge malfunction include a voltage regulator, a generator and a battery. In more detail, a charge malfunction can be caused by problems in the elements just mentioned, corresponding fuses, connections, and indirectly by problems in belts rotating the generator (i.e., an engine pulley belt, an idle pulley belt and a generator pulley belt). Since detection in all these areas is required to enable the determination of the actual cause of malfunction, it is next to impossible to realize automatic detection of a charge malfunction.

The instrument panel displays the driving state of the vehicle and includes a speedometer, an rpm gauge, a temperature gauge, a voltage gauge, various warning lights, etc. The connection of the many sensors directly to the instrumental panel in the driver's compartment further complicates the wiring of the vehicle. Further, since the control switches are operated through direct control of a plurality of devices and controllers, much wiring, many connectors, and many mechanically operated switches are needed.

Lastly, because it is not possible to check the states of the devices and parts, automation of the electrical device is unrealizable.

SUMMARY OF THE INVENTION

The present invention has been made in an effort to solve the above problems.

It is a first object of the present invention to provide an integrated information network in which a plurality of vehicles are connected to the network, and states, location, etc. are automatically and remotely analyzed to provide information on optimal performance of the vehicles.

It is a second object of the present invention to provide an integrated digital control system and method for an automotive electrical device in which all electrical devices of a vehicle are integrally and digitally controlled.

It is a third object of the present invention to provide a method in which a vehicle is separated into logic regions and all parts of an automotive electrical device are divided into logic regions.

It is a fourth object of the present invention to provide an integrated digital control system and method for an automotive electrical device in which conventional wiring, connectors and electronic control units are not used, but instead parts of a vehicle are independently provided such that repair and replacement are easily performed.

It is a fifth object of the present invention to provide an integrated digital control system and method for an automotive electrical device in which circuitry of the vehicle is not realized by the conventional method where parts are connected by wires, and instead is realized by each independent division and method being provided in a memory such that improvements to the vehicle can be easily made without consideration to the effect on various other parts.

It is a sixth object of the present invention to provide a method in which all malfunctions in an automotive electrical device can be automatically detected according to part, and all division information is shared.

It is a seventh object of the present invention to enable the use of an operating system in a central controller to, in turn, enable control by referencing integrated code data in the operating system, thereby allowing easy development of an application program.

It is an eighth object of the present invention to digitize an automotive electrical device to enable use of digital equipment such as computer software and hardware.

It is a ninth object of the present invention to enable the transmission and reception of automotive information through the Internet such that integrated code data communication between vehicles themselves, vehicles and offices, etc. is possible such that states of a vehicle can be remotely checked, analyzed and controlled.

To achieve the above objects, the present invention provides an integrated digital control system for an automotive electrical device comprising panel and remote switch means for controlling each portion of a vehicle, the switch means including switches; switch monitor means for displaying operational states of the switches input from the switch means and an instrument panel simulation; a switch controller for generating control values corresponding to the switches operated, and for controlling an instrument panel simulation function and a switch monitor by referencing integrated code data; central control means including an operating system for referencing the integrated code data to control each applications program, a wireless communications device for enabling external connection, and a permanent storage device for recording integrated code data every time an event is generated; instrument panel/monitor means for performing an instrument panel simulation and applications program graphic processing according to control by the central control means; and a plurality of auxiliary control means for performing digital conversion, input/output control, malfunction detection, automatic control, etc. of each logic-division portion.

The integrated digital control method for an automotive electrical device comprises the steps of performing logic divisions of each portion of the vehicle into predetermined regions and performing digital conversion of corresponding input/output data according to each divided region; analyzing the input data according to region and through integrated management data, performing digital control of the electrical device in the corresponding region; and detecting malfunctions in the electrical device in the corresponding region and performing the intelligent control of the detected malfunction in the corresponding region.

Accordingly, in the present invention, if parts mounted to each part of the vehicle (control switches, controllers, sensors, output parts, etc.) are connected through a plurality of wire circuits and a single device, the single device can be realized through divisions and methods.

Here, the divisions include attributes of elements and methods, and input and output parts realized through imaginary parts having internal information in memory regions.

Further, the divisions realized through methods (subroutines, functions and procedures) can also become divisions.

In other words, an elements can be thought of as means for realizing states for a single division, and the substance can only exist in a division. That is, each sensor element or device element (output part element), etc. are not directly controlled by methods. The elements are controlled by system methods in divisions, and divisions (imaginary parts) come to maintain a state (attributes and actions) like the elements.

Here, the divisions and elements are connected through corresponding ports.

All actions of the vehicle (generation of divisions, corrections, movement, changes in division variables, calling of methods, connections) can be completely based on divisions in an imaginary space, and since the divisions generated in the vehicle can be re-generated in all controllers, it is possible for the methods to reference the divisions.

Here, the collection of divisions become an imaginary vehicle having all information.

The imaginary vehicle can be freely moved and re-generated through wireless communications, making this the foundation for the integral management of all vehicles in an imaginary space (network).

Accordingly, the collection of all divisions (imaginary vehicles) can be designated through integrated code data; all vehicles (imaginary vehicles) are connected to a network; information of states, positions states, etc. of other vehicles is automatically analyzed in the imaginary space; and vehicles having an integrated information network for notifying of optimal actions can be made. That is, the present invention includes a system in which a vehicle is separated into logic regions and each logic region is controlled to enable processing of digital conversion, control, and malfunction detection. Accordingly, each part of the vehicle is made into a module such that wiring and connectors connected through the frame can be omitted.

For example, wires passing through the frame are mostly input wires for reading sensor values and output wires for controlling devices through switches. Further, frame wiring connected to a light switches includes light lower (left, right), light upper (left, right), high-beam indicator light, each switch illumination light (plurality), wide light (front, rear, left, right), license plate light, rear light (left, right), marker light (front, rear, left, right), and a tire light (left, right).

Accordingly, if there is a method for directly processing the light switches through a pulse (control code) in each module, there is no need for the above wiring.

Further, if each part made into a module can be independently processed, the complete discontinuing of all functions is avoided since only a malfunctioning portion stops operation with such divisioning.

The present invention provides a method for such divisions, forming into modules and independent control of each part of the electrical system. Also, by simplifying the wiring of the vehicle, the occurrence of malfunctions, and improvement of overall stability and durability are obtained.

Accordingly, it is possible to omit outwardly extending devices and wiring to reduce the number of malfunctions, and elements and operations typically processed using hardware and through analog methods are processed using software.

A single assembly device is generally realized through a plurality of elements (motors, sensors, resistors, switches, wiring, etc.), and if such assembly devices can be controlled by software, it is possible to simplify control and malfunction detection.

The easiest and most precise way in which malfunctions are detected in vehicles is through a detection in units of elements. For example, if there is a malfunction somewhere between a front switchboard and a rear license plate light, a technician begins inspection in units of elements.

That is, fuse shorts are inspected, lights are disassembled to check for a disconnection or short, and if these parts are normal, a lamp assembly connector is disassembled to check for disconnections and shorts. If the connector is normal, each connector portion is disassembled to again inspect for disconnections and shorts. However, if not divided into units of elements, it is impossible to perform an effective inspection.

If input and output elements are independently divided, it is possible to check for disconnections and shorts, and otherwise perform malfunction detection.

An electronic control device of a vehicle is used to control specific devices that do not use an integrated method. A part of the vehicle is determined and controlled in a program is identical to reporting only the front of vehicle driving.

Using the abrupt start of the automatic transmission as an example, since a controller can only determine states in a limited manner, it can not be determined if there is an actual part or sensor malfunction, or if a malfunction is the result of driver mis-operation.

Even if a more perfect control program were possible, the programmer must be able to read required states of the vehicle without restriction.

Accordingly, in the present invention, all states of the vehicle are shared such that all data of the vehicle can be referenced in a program. A drawback of the conventional electronic control method is that mounting is performed on a basic central analog direct control type structure. There are many problems with this configuration.

Using an ABS wheel sensor as an example, a sensor to enable the reading of wheel rotation in an ABS controller is mounted on each wheel. Since the wiring of each wheel sensor is joined to the frame wiring so that a sensor input terminal of the ABS controller is reached, it is not possible to use a single wire and connectors that externally protrude must be used.

If a malfunction occurs in externally-protruding connection portions, the electronic device determines that the sensor is malfunctioning.

A sensor malfunction when there is some precipitation is generally a result of leakage or contact problems in the connector areas. Accordingly, it is preferable that an input wire of the electronic control device is short and not partitioned.

In a digital method of the present invention, each region is directly processed in a corresponding controller that divides the vehicle into logic regions to solve these problems.

Further, with respect to controller hardware configuration, the use of a basic input and output method is for providing flexibility to enable easy software application as when performing complicated control by controlling 0s and 1s.

For example, each portion is divided to enable direct control of input and output; a basic bit control method is used for output control (on=battery+voltage, off=battery−voltage); a basic detection method is used for disconnection, short, error and operational frequency detection; input is divided into variable input, pulse input and switch input and through the use of interfaces (in the case where the majority of sensors are variable, since operation is possible at low resistances for the flow of stable current, it is possible that an input scope is not large) that standardize all sensors, flexibility is provided to software.

In addition, since all data is renewed in a code table of a central controller through communications, various instruments, controllers, warning lights, etc., which have a single use, are not required; through a method in which all instruments are simulated in a vehicle computer, instruments, parts, wiring can all be removed; and the single-use instrument panel is made into a multi-use graphic, Internet, vehicle method device, etc.

Switches in vehicles use a digital control method, and since they are not directly connected to devices, much wiring is not required. No matter how many switches are used, 1$a$ it is possible to connect to power using a minimum of a single pulse cable. Also, although many switches are needed since each switch has a single function, the number of switch buttons can be reduced by using a method in which switches are called every time they are needed.

In the present invention, since the switches use a digital control method, even switches that can not be realized mechanically can be easily realized. Also, since control using a program is possible, it is possible to perform control using a variety of methods.

In the present invention, there are provided a malfunction detection function and a future malfunction detection function of the electrical device. These function are provided to enable referencing of all states of the vehicle in any routine through joint data without the use separate devices, and to enable the determination of malfunctions according to division since each part is not directly connected.

Using a temperature gauge as an example, if one of temperature gauge wiring, fuse, sensor, connector, etc. malfunctions, it is not possible to determine the actual source of the malfunction. However in the present invention, it is possible to determine a malfunction in the sensor.

Since leakage is possible in vehicles during vibrations, and as a result of vibrations, humidity, etc., the best manner to inspect vehicles is by checking various states while there are being driven.

Based on this concept, real-time checking of states of each division and detection is possible in the present invention.

Further, a current detection method according to division is also used in determining malfunctions. Using a experimental example of the generator, a 8 Ω resistor is connected positive terminal of the battery and a wire passing through the resistor is connected to a generator field coil (assuming 8 Ω) positive terminal, and a lamp or voltage tester for checking a current is connected to a portion passing through the resistor.

The engine is then operated and in a state where the generator is rotating, a brightness of the test lamp is checked. That is, if the brightness of the test lamp corresponds to that when connected to 12V, it is determined that there is no malfunction; if the brightness of the test lamp corresponds to that when connected to 24V, it is determined that there is an internal disconnection; if the brightness corresponds to that when connected to 10V, it is determined that there is a short in the coil portion; and if the brightness varies, it is determined that there is an internal contact defect, excess wear in the brushes, or slipping.

In such a basic method, since it is possible for a technician to make the determination rather than a tester apparatus, precise and various malfunction states can be determined.

Further, since malfunctions in the various devices of vehicles occur slowly and worsen over time, it is possible to catch malfunctions before they deteriorate into a serious problem using such real-time detection.

In the present invention, using such a method, current used in each device is read in real-time to enable intelligent determinations.

In the present invention, the entire electrical device is digitally controlled and each malfunction detection routine is able to reference integrated code data such that precise processing using software is possible.

Further, because control according to states between routines is possible, automatic malfunction detection, automatic protection, automatic control and other functions difficult to realize using conventional methods is able to be processed according to state, thereby enabling overall intelligent control and operation of the vehicle.

BRIEF DESCRIPTION OF THE DRAWINGS

The above and other objects, features and other advantages of the present invention will be more clearly understood from the following detailed description taken in conjunction with the accompanying drawings, in which

FIG. 18 is a chart used to describe how normal, disconnection, and short states are determined according to a preferred embodiment of the present invention.

FIG. 32 is a schematic view of a panel switch of FIG. 2;

FIG. 33 is a schematic view of a remote switch of FIG. 2;

FIGS. 36a–36c are flow charts of a switch input process of a switch controller of FIG. 2;

PREFERRED EMBODIMENTS OF THE INVENTION

Preferred embodiments of the present invention will now be described in detail with reference to the accompanying drawings.

Figure 1A:
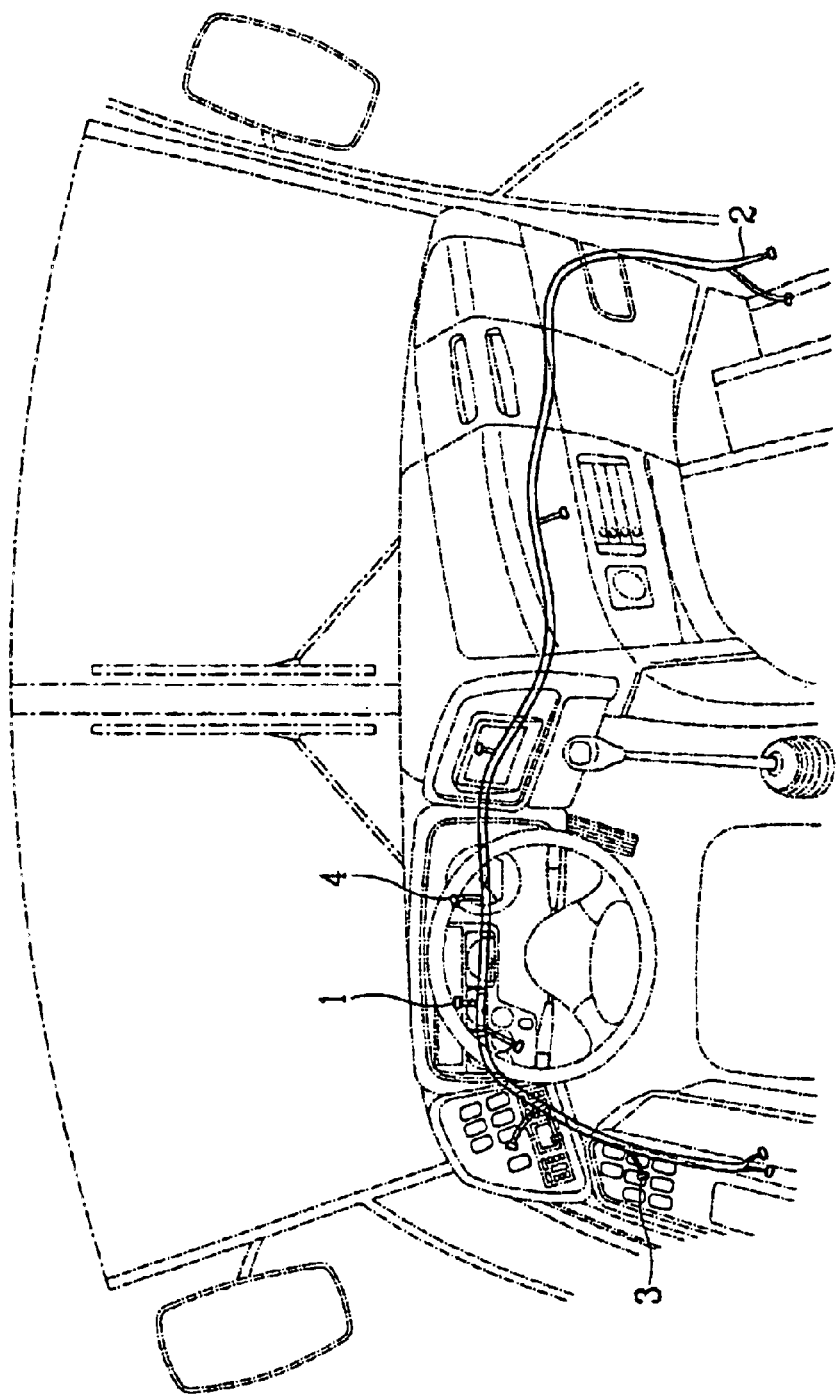
FIG. 1a is a schematic view of conventional frame wiring used to connect control switches, an instrument panel, a switchboard and output elements at a front of a bus to sensors.
Figure 1B:
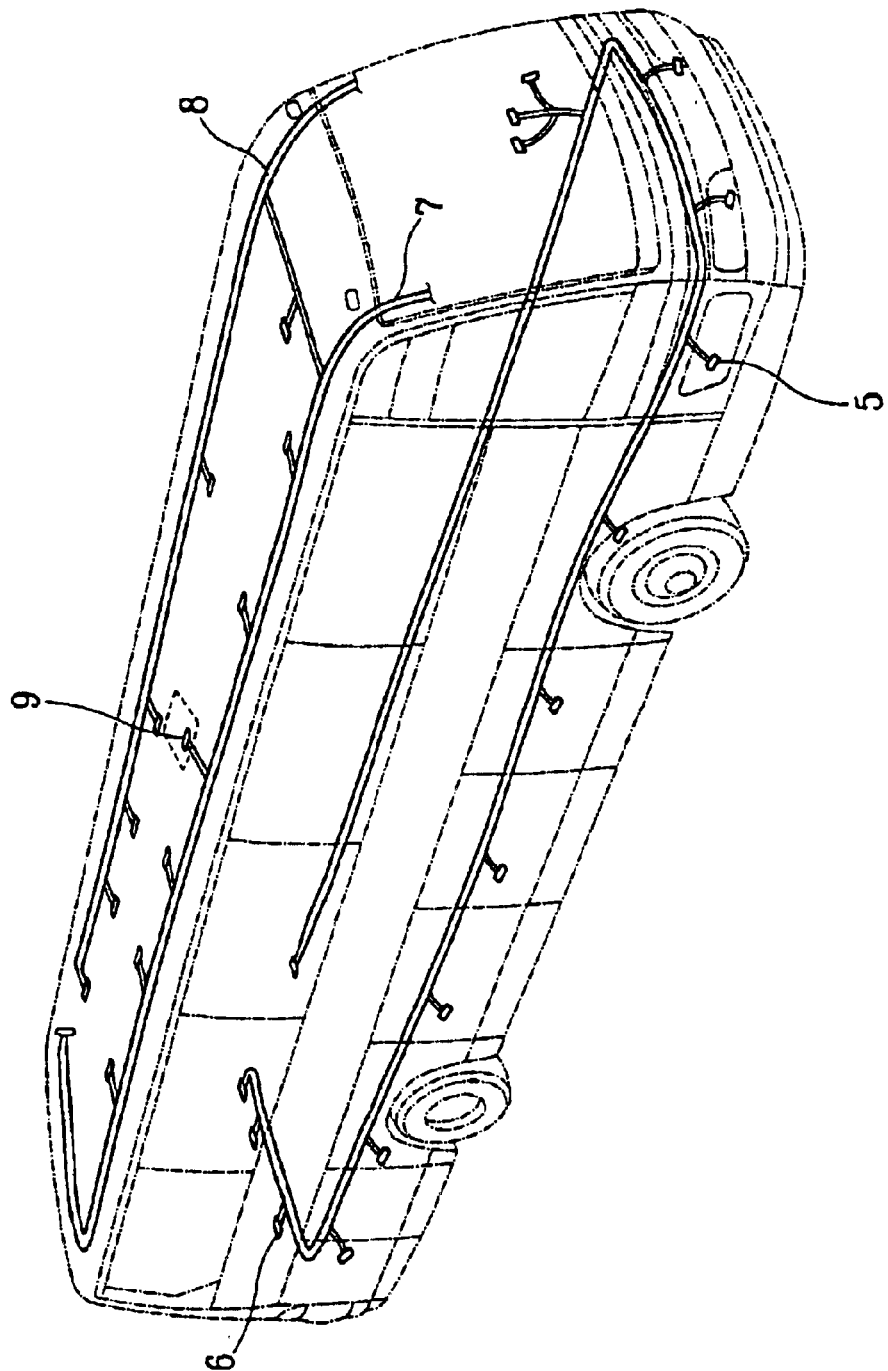
FIG. 1b is a schematic view of conventional frame wiring used to connect output elements of an engine and sensors, and sensors and output elements provided throughout the remainder of the bus.
Figure 2:
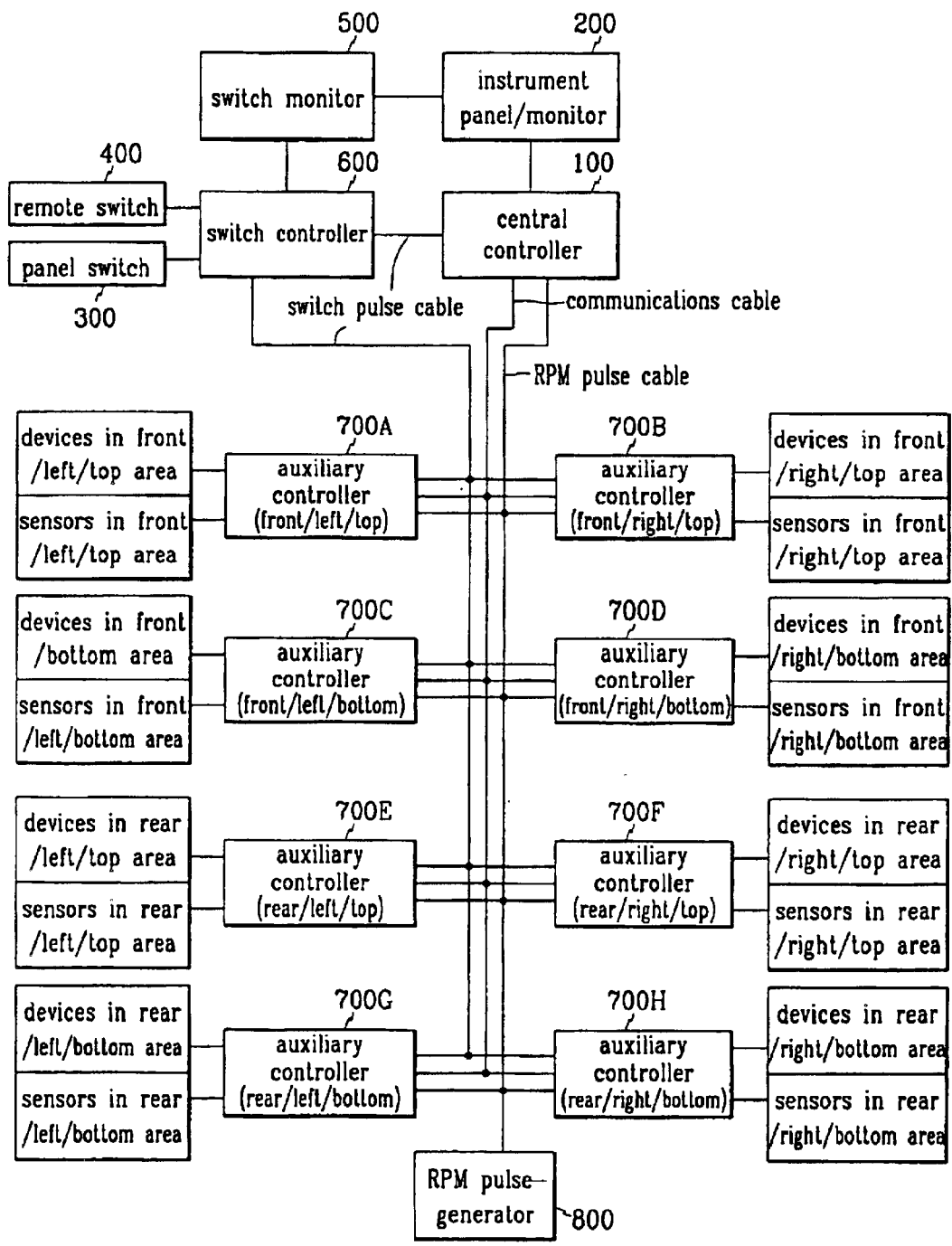
FIG. 2 is a block diagram of an integrated digital control system for an automotive electrical device according to a preferred embodiment of the present invention.

FIG. 2 is a block diagram of an integrated digital control system for an automotive electrical device according to a preferred embodiment of the present invention. As shown in the drawing, a vehicle is separated into eight logic regions as follows: front/left/top, front/right/top, front/left/bottom, front/right/bottom, rear/left/top, rear/right/top, front/left/bottom, and front/right/bottom.

The integrated digital control system includes a central controller 100 for referencing integrated code data to initiate an instrument panel simulation, wireless communications (the Internet), and an application program, and for storing events in a permanent storage device; an instrument panel/monitor 200 for performing graphic processing of the instrumental panel simulation and application program according to control by the central controller 100; a panel switch 300 for control of each portion of the vehicle, the panel switch 300 including a key; a remote switch 400 for enabling switches of the panel switch 300 to be freely positioned; and a switch monitor 500 used as an auxiliary instrument panel and realized through an LCD, the switch monitor 500 displaying operating states of switches input through the panel switch 300 and the remote switch 400.

The integrated digital control system also includes a switch controller 600 for generating control values corresponding to switch input of the panel switch 300 and the remote switch 400 for control of the switch monitor 500; auxiliary controllers 700A–700H linked with the central controller 100 and which perform input/output, malfunction detection and automatic control of each separated logic region of the vehicle; and an RPM pulse generator 800 for transmitting an RPM pulse, via an RPM pulse cable, to the central controller 100 and the auxiliary controllers 700A–700H. The central controller 100 and the switch controller 600 are connected to the auxiliary controllers 700A–700H by communications cables.

Based on the integrated code data (malfunction detection data, sensor input data, vehicle state data and control data) processed by the auxiliary controllers 700A–700H, which are assigned to different logic regions, the central controller 100 initiates the application program. In addition, the central controller 100 performs control of the instrument panel simulation to emit sounds, and enables the mounting of wireless communications devices to enable connection to the Internet.

The instrument panel/monitor 200 is an LCD and is used as a display of the central controller 100. The switch monitor 500 is provided in addition to the instrument panel/monitor 200 since the integrated digital control system has both a switch display function and an instrument panel simulation function, and when the central controller 100 is malfunctioning or being used for other purposes, the switch monitor 500 can be independently used as an instrument monitor. Accordingly, the driver is able to vary the location of the switch monitor 500 to a more easily visible and operable position.

In the present invention structured as in the above, if particular switch input is performed from the panel switch or the remote switch 400 for control of a specific area of the vehicle, switch functions and switch operations corresponding to the switch input is displayed on the switch monitor 500 according to control by the switch controller 600. Also, corresponding control values generated by the switch controller 600 according to switch input are transmitted to the central controller 100 and the auxiliary controllers 700A–700H through the switch pulse cable. As a result, the central controller 100 and the auxiliary controllers 700A–700H perform operations corresponding to the control values input from the switch controller 600.

The process of controlling a light to a first level will now be described. Here, it is assumed that there are a total of twelve auxiliary controllers.

(a) Using the panel switch 300 or the remote switch 400, if a light switch is controlled to a first level on position, the switch controller 600 transmits a control value corresponding to the first level on position of the light simultaneously to all auxiliary controllers. (b) The switch monitor 500 performs display of the on control of the first light. (c) A front/left/bottom auxiliary controller analyzes the instruction and controls to on a front/left/bottom wide light. (d) A front/right/bottom auxiliary controller analyzes the instruction and controls to on a front/right/bottom wide light. (e) A front/left/top auxiliary controller analyzes the instruction and controls to on a front/left/top secondary light. (f) A front/right/top auxiliary controller analyzes the instruction and controls to on a front/right/top secondary light. (g) An intermediate/left/bottom auxiliary controller, an intermediate/right/bottom auxiliary controller, an intermediate/left/top auxiliary controller, and an intermediate/right/top auxiliary controller analyze the instruction, and since there is no corresponding operation to perform, ignores the instruction. (h) A rear/left/top auxiliary controller analyzes the instruction and controls to on a rear/left/top secondary light. (i) A rear/right/top auxiliary controller analyzes the instruction and controls to on a rear/right/top secondary light. (j) A rear/left/bottom auxiliary controller analyzes the instruction and controls a rear/left/bottom taillight to on. (k) A rear/right/bottom auxiliary controller analyzes the instruction and controls to on the rear/right/bottom taillight to on. Next, the process of controlling a right turn signal to on using the switches will now be described.

Figure 3:
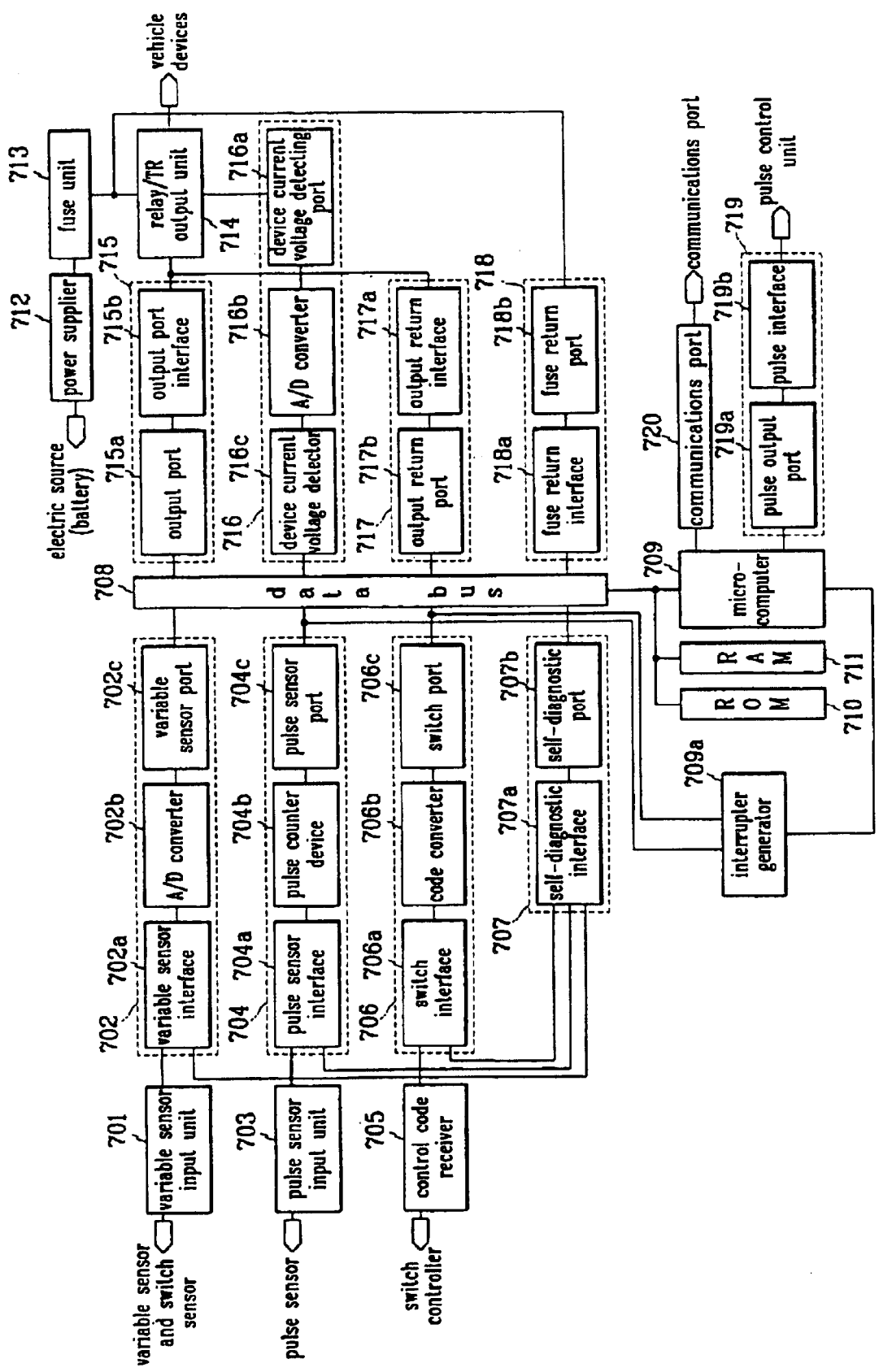
FIG. 3 is a detailed block diagram of auxiliary controllers of FIG. 2.

(a) If a right turn signal switch is controlled to on at the panel switch 300 or the remote switch 400, the switch controller 600 transmits a corresponding control value simultaneously to all the auxiliary controllers. (b) The switch monitor 500 performs display of the on control of the right turn signal. (c) The central controller 100 performs control for the display of a signal flashing state. (d) The front/right/bottom auxiliary controller calls a right turn signal method. (e) The intermediate/right/bottom auxiliary controller calls a right turn signal method. (f) The rear/right/bottom auxiliary controller calls a right turn signal method. FIG. 3 shows a detailed block diagram of the auxiliary controllers 700A–700H.

Each auxiliary controller 700A–700H includes a variable sensor input unit 701 to which all main variable sensors, auxiliary variable sensors, main switch sensors and auxiliary switch sensors are connected; a sensor input A/D converter 702 for converting to digital values operational values of the variable sensors and switch sensors input to the variable sensor input unit 701; a pulse sensor input unit 703 to which all main pulse sensors and auxiliary pulse sensors are connected; a pulse counter 704 for counting the number of pulses generated by the pulse sensors and input through the pulse sensor input unit 703 then converting the counted pulses to a digital value, the pulse counter 704 counting the number of pulses per unit of time; a control code receiver 705 for reading all switching input; a reception code converter 706 for standardizing output of the control code receiver 705 and converting the code to digital values; a self-diagnostic unit 707 connected to the sensor input A/D converter 702, the pulse counter 704 and the reception code converter 706, and which performs a self-diagnosis to determine the presence of irregularities in the system; a data bus 708 connected to the sensor input A/D converter 702, the pulse counter 704, the reception code converter 706 and the self-diagnostic unit 707; a microcomputer 709 for receiving input via the data bus 708 from the sensor input A/D converter 702, the pulse counter 704, the reception code converter 706 and the self-diagnostic unit 707, and which processes each instruction; an interrupt generator 709a for enabling the microcomputer 709 to read pulse output; a ROM 710 for storing a program for controlling the system; and a RAM 711, which is a memory for processing data. A power supplier 712 supplies power to the system and a fuse unit 713 is connected to the power supplier 712.

Further, a relay/TR output unit 714 is connected to the fuse unit 713 and controls each element of the vehicle; an output controller 715 operates the relay/TR output unit 714 according to control values output from the microcomputer 709 and received via the data bus 708; a current voltage detector 716 detects a voltage supplied to the relay/TR output unit 714 and converts the voltage to a digital value and inputs the same to the microcomputer 709 via the data bus 708; an output return unit 717 monitors an output of the output controller 715 and inputs the output to the microcomputer 709 through the data bus 708 for use in detecting malfunctions in the relay or TR, output interface, etc.; and a fuse return unit 718 for detecting a state of the fuse unit 713 and inputting detection results to the microcomputer 709 through the data bus 708 for use in detecting malfunctions in various devices. Connected to the microcomputer 709 are a pulse output unit 719 for controlling various devices according to control by the microcomputer 709 and a communications port 720 for transmitting various data results to the central controller 100, the pulse output unit 719 performing control using a pulse control method.

The sensor input A/D converter 702 includes a variable sensor interface 702a for converting the operational values of the variable sensors and switch sensors input to the variable sensor input unit 701; an A/D converter 702b for receiving output of the variable sensor interface 702a and converting the output to digital code, the output of the variable sensor interface 702a having been converted into a readable format for the A/D converter 702b; and a variable sensor port 702c for holding digital values converted by the A/D converter 702b then transmitting the data to the microcomputer 709 through the data bus 708 every predetermined time interval when requested by a program.

The pulse counter 704 includes a pulse sensor interface 704a for standardizing pulses input through the pulse sensor input unit 703 and converting the input to digital input, a pulse counter device 704b for counting an interval established by the pulse sensor interface 704a, and a pulse sensor port 704c for transmitting a count result of the pulse counter device 704b to the microcomputer 709 via the data bus 708.

The reception code converter 706 includes a switch interface 706a for standardizing switch pulses input from the control code receiver 705, a code converter 706b for converting to a digital code an output of the switch interface 706a, and a switch port 706c for transmitting an output of the code converter 706b to the microcomputer 709 through the data bus 708.

The self-diagnostic unit 707 includes a self-diagnostic interface 707a connected to the variable sensor interface 702a, the pulse sensor interface 704a, and the switch interface 706a; and a self-diagnostic port 707b connected to the self-diagnostic interface 707a and also to the microcomputer 709 through the data bus 708.

The output controller 715 includes an output port 715a having a latch function and a read/write function of various control data input from the microcomputer 709 through the data bus 708, and an output port interface 715b for ensuring a current corresponding to output of the output port 715a to operate the relay/TR output unit 714.

The current voltage detector 716 includes a device current voltage detector 716a for detecting, when the relay or TR of the relay/TR output unit 714 is controlled to on, a drop in voltage supplied through a conducting resistor of the relay/TR output, or for detecting a current detected by a current detecting sensor and voltage of each portion (i.e., battery voltage, generator output voltage, generator F output voltage, etc.); an A/D converter 716b for converting output of the device current voltage detector 716a into a digital code; and a device current voltage detecting port 716c for transmitting output of the A/D converter 716b to the microcomputer 709 through the data bus 708.

The output return unit 717 includes an output return interface 717a and an output return port 717b for monitoring a state of the output port interface 715b and transmitting a detected state to the microcomputer 709 through the data bus 708. The fuse return unit 718 includes a fuse return interface 718a and a fuse return port 718b for monitoring a state of the fuse unit 713 and transmitting a detected state to the microcomputer 709 through the data bus 708. The pulse output unit 719 includes a pulse output port 719a and a pulse interface 719b for controlling various devices according to control by the microcomputer 709, the control being performed using a pulse control method. Since sensors are also read by variable sensor ports in the present invention, a short or disconnection in wires is able to be detected. Also, the different types of sensors are variable sensors, pulse sensors and switch sensors. In the present invention, all input of the three types of sensors is converted to a digital format.

Further, the sensors connected to the auxiliary controllers 700A–700H comprise a main sensor and an auxiliary sensor, with the same type of sensor being used for both. Since the values of the sensors are converted into a digital format, the use of an identical type of sensor is not done in order to have a sensor for operating an instrument and a sensor for operating a warning lamp as with the conventional vehicle sensors, but in order to have a back-up sensor in case one malfunctions.

The operation of the auxiliary controllers 700A–700H described above will now be described.

The operational values of the variable sensors and switch sensors input to the variable sensor input unit 701 are converted to readable values by the variable sensor interface 702a and input to the A/D converter 702b. The A/D converter. 702b converts the input values into a digital code, after which the converted values remain in stand-by at the variable sensor port 702c. Next, at predetermined intervals the microcomputer 709 reads the sensor port 702c (of each auxiliary controller) and stores/renews the values in the RAM 711 to enable referencing using an internal method (a method in which conversion is to a characteristic value of divisions and renewal are performed).

The pulses input to the pulse sensor input unit 703 are standardized by the pulse sensor interface 704a then input to the pulse counter device 704b. The pulse counter device 704b counts the input pulses for a predetermined interval then performs output to the pulse sensor port 704c. The interrupter generator 709a enables the microcomputer 709 to read the pulse sensor port 704c. Accordingly, the microcomputer 709 reads the pulse sensor port 704c then renews the data in the RAM 711 to enable referencing in an internal method.

The control code receiver 705 reads all switch input and after conversion to a digital code by the reception code converter 706, the input is transmitted to the switch port 706c. The interrupter generator 709a enables the microcomputer 709 to read the switch port 706c. Accordingly, the microcomputer 709 reads the switch port 706c to decipher switch instructions, after which a sub-routine corresponding to the instructions is performed.

The self-diagnostic interface 707a performs a self-diagnostic method of each input/output device of FIG. 2. The microcomputer 709 controls the self-diagnostic interface 707a through the self-diagnostic port 707b to detect irregularities in each interface and port. A self-diagnostic result value is read through each corresponding input port to determine the presence of malfunctions or if normal operation is occurring.

If the microcomputer 709 outputs a control output to the output port 715a through the data bus 708, each bit of the output port 715a ensures a current to enable operation of a relay in the output port interface 715b and controls the relay/TR output unit 714. Since the output of the relay/TR output unit 714 is directly connected to output elements of the vehicle, if the division is controlled, the output port 715a is then controlled such that control of the output elements of the vehicle is realized.

The current voltage detector 716 detects through the device current voltage detector 716a and when the relay or TR of the relay/TR output unit 714 is controlled to on, a drop in voltage supplied through the conducting resistor of the relay/TR output unit 714 or a current value by a current detecting sensor and present voltages such as the battery voltage, generator output voltage, and generator F output voltage. After conversion of the output of the device current voltage detector 716a by the A/D converter 716b, the device current voltage detecting port 716c transmits the output of the A/D converter 716b to the microcomputer 709 through the data bus 708. The microcomputer 709 reads the input, calculates utilization current values and voltage drop values, then records/renews the RAM 711 to enable referencing in an internal method.

The output return interface 717a of the output return unit 717 records the state of the output port interface 715b in the output return port 717b. This is read by the microcomputer 709 to enable use in an output device monitoring routine for the detection of a malfunction such as a relay or TR malfunction and an output interface malfunction. The fuse return interface 718a of the fuse return unit 718 records the state of the fuse unit 713 in the fuse return port 718b. This is read by the microcomputer 709 to enable use in the output device monitoring routine for the detection of a fuse malfunction, relay or TR malfunction, output interface malfunction, and device malfunction.

The microcomputer 709 controls various pulse control method devices through the pulse output port 719a and pulse interface 719b. Communications between each controller are transmitted and received through the communications port and each controller renews integrated code data corresponding to received values.

An example of an overall program structure (input initial setting, output initial setting, initial operation, input data renewal by the timer interrupter, input sensor malfunction detection, current input supplied to output elements connected to output ports, internal state input, output system malfunction detection, motor malfunction detection, motor position control, internal method operation and control, switch or other interrupter routines) output of the auxiliary controllers 700A–700H will now be described. Although there are a variety of methods for managing each routine of the auxiliary controllers 700A–700H, the following is a basic method.

Initial operation is realized as follows.
(a) Detection of an interface malfunction for each auxiliary controller 700A–700H and the central controller 100 is performed. (b) Communications initialization of each auxiliary controller 700A–700H and the central controller 100 is performed.

Figure 4:
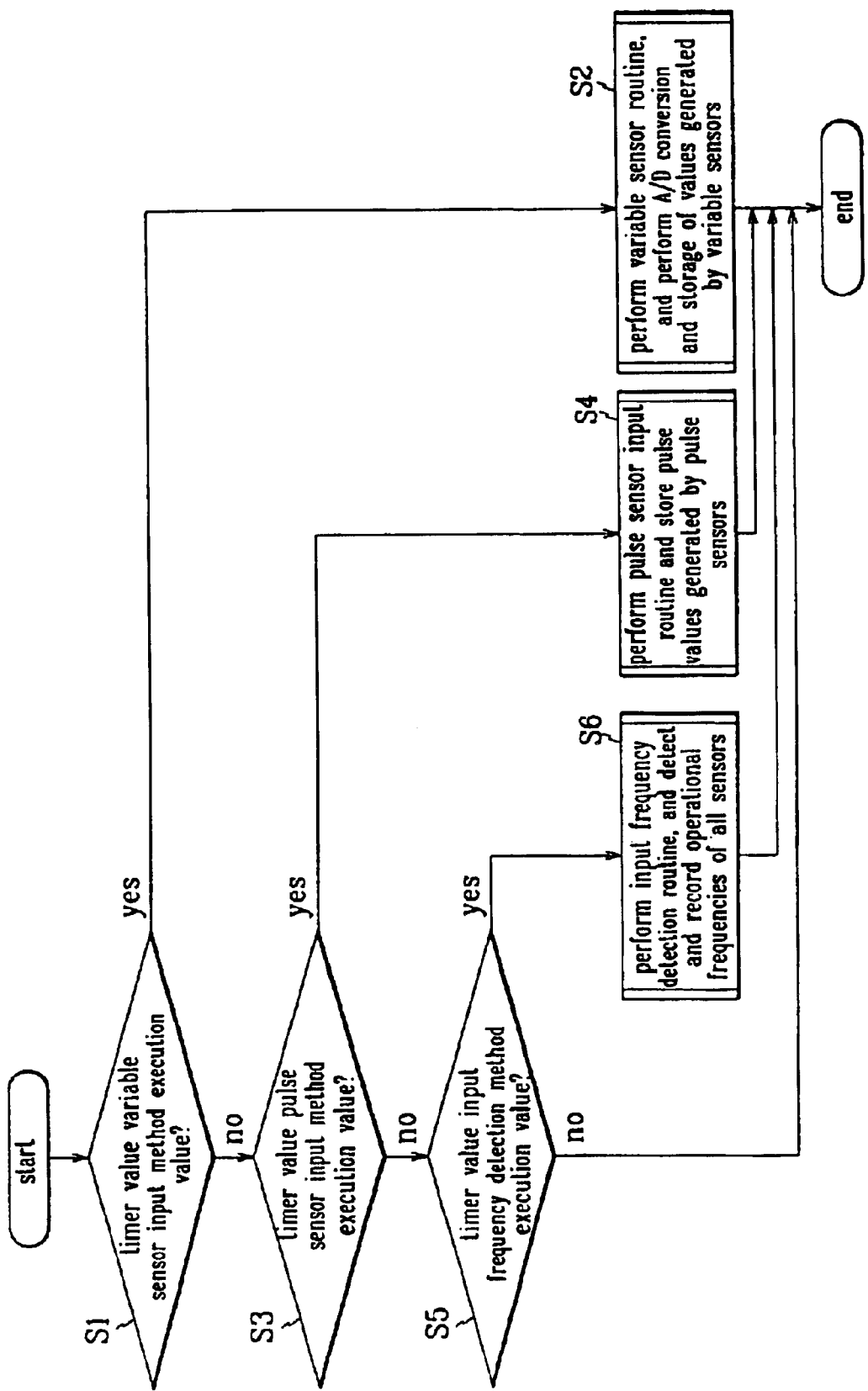
FIG. 4 is a flow chart of an input processing routine of auxiliary controllers of FIG. 2.

Next, input data renewal realized through a timer will be described with reference to the flow chart of FIG. 4. It is to be assumed that the following is one of a plurality of methods for simultaneously managing the timer.

First, it is determined if a timer value is a variable sensor input method execution value in step S1. If it is, values generated by the variable sensors connected to input ports of one or more corresponding auxiliary controller undergo A/D conversion and properties of corresponding divisions are renewed and stored, thereby enabling referencing of the internal method or the present state of the vehicle in the central controller 100 and the auxiliary controllers 700A–700H in step S2.

If the timer value is not a variable sensor input method operational value in step S1, it is determined if the timer value is a pulse sensor input method execution value in step S3. If it is, pulse values generated over a predetermined interval by the pulse sensors connected to input ports of one or more corresponding auxiliary controller undergo A/D conversion and properties of corresponding divisions are renewed and stored, thereby enabling referencing of the internal method or the present state of the vehicle in the central controller 100 and the auxiliary controllers 700A–700H in step S4.

If the timer value is not a pulse sensor input method operational value in step S3, it is determined if the timer value is an input frequency detection method execution value in step S5. If it is, sensor input data of the corresponding auxiliary controllers 700A–700H are compared with operational established values to determine then store the moment when they exceed the established values, then properties of corresponding divisions are renewed, thereby enabling referencing of the internal method or the operational frequencies of the sensors in the central controller 100 and the auxiliary controllers 700A–700H in step S6.

Figure 5:
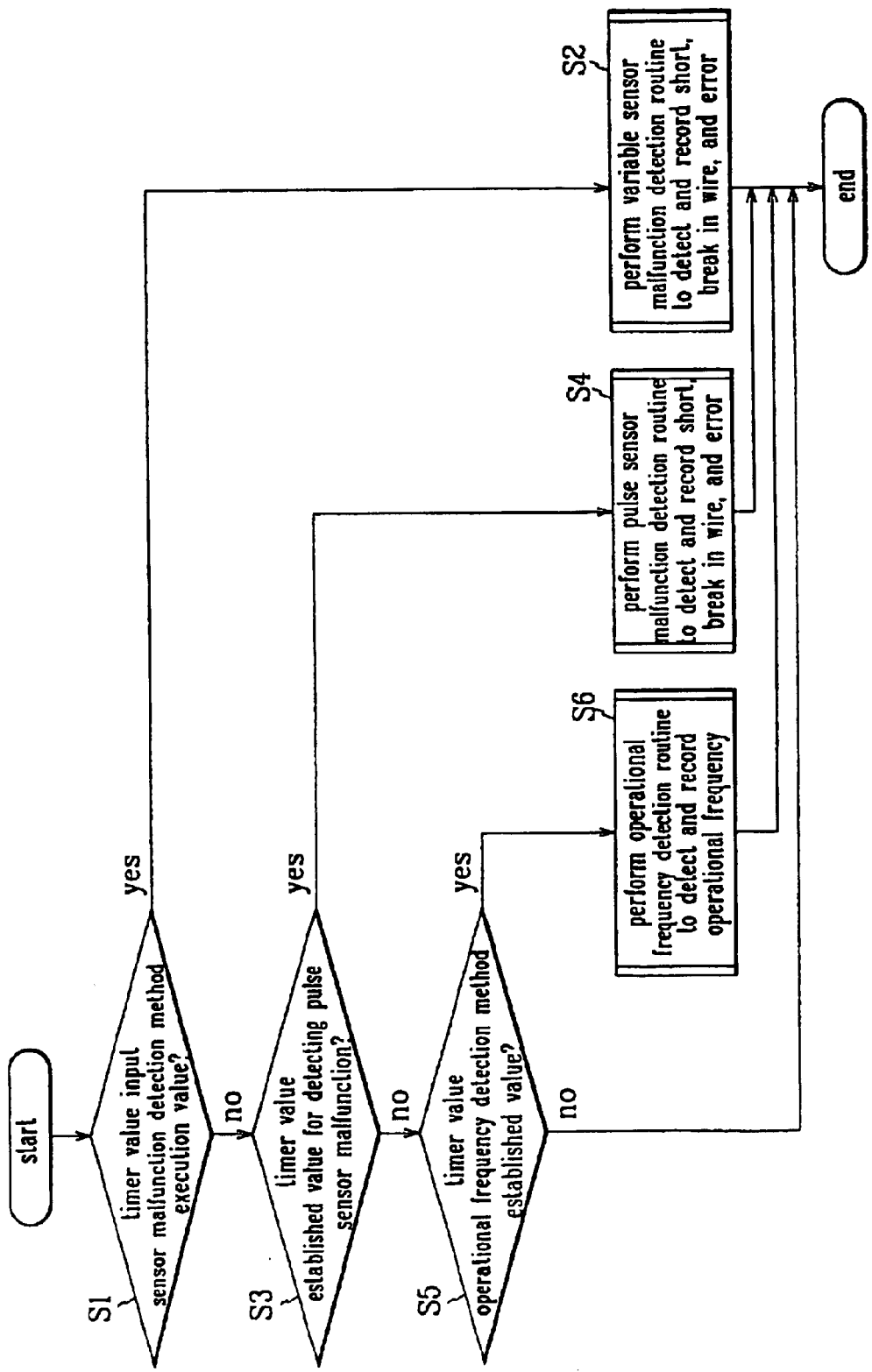
FIG. 5 is a flow chart of a sensor malfunction detection routine of auxiliary controllers of FIG. 2.

FIG. 5 shows a flow chart of a sensor malfunction detection routine of the auxiliary controllers 700A–700H.

It is first determined if the timer value is an input sensor malfunction detection method execution value in step S1. If it is, conversion data (corresponding divisions) of all variable sensors connected to input ports of corresponding auxiliary controllers 700A–700H are referenced to detect a disconnection in wires (FIG. 12), a short (FIG. 11), and an error (FIG. 13), then properties of divisions corresponding to the malfunction are renewed, thereby enabling referencing of the internal method or sensor states in the central controller 100 and the auxiliary controllers 700A–700H in step S2.

Next, if the timer value is not an input sensor malfunction detection method operational value in step S1, it is determined if the timer value is an established value for detecting a pulse sensor malfunction in step S3. If it is, conversion data (corresponding divisions) of all variable sensors connected to input ports of corresponding auxiliary controllers 700A–700H are referenced to detect a disconnection in wires (FIG. 12), a short (FIG. 11), and an error (FIG. 13), then properties of divisions corresponding to the malfunction are renewed, thereby enabling referencing of the internal method or sensor states in the central controller 100 and the auxiliary controllers 700A–700H in step S4.

If the timer value is not an established value for detecting a pulse sensor malfunction in step S3, it is determined if the timer value is an operational frequency detection method established value in step S5. If it is, an operational frequency detection method is performed and recorded, and properties of corresponding divisions are renewed to enable referencing in the internal method or the auxiliary controllers 700A–700H and the central controller 100 in step S6.

Figure 6:
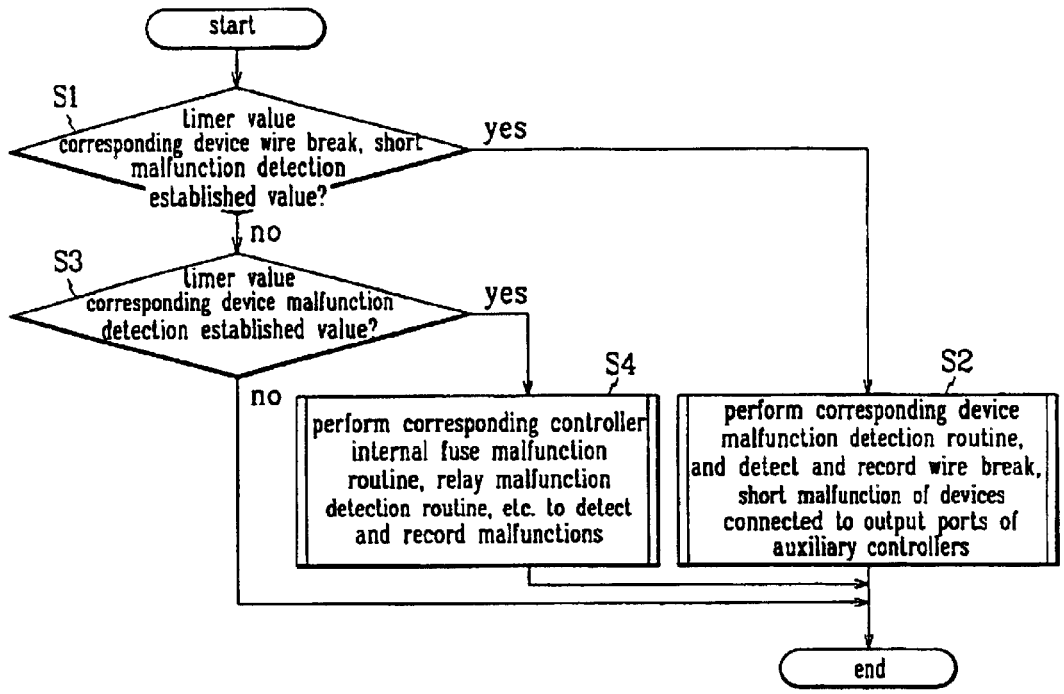
FIG. 6 is a flow chart of a device malfunction detection routine of auxiliary controllers of FIG. 2.

FIG. 6 shows a flow chart of a device malfunction detection routine of the auxiliary controllers 700A–700H. It is determined if the timer value is a state output system malfunction detection execution value, and if it is, malfunction detection of an output interface in corresponding auxiliary controllers 700A–700H, relay or TR malfunction detection, and a detection method of a disconnected wire or short in output devices connected to output ports are performed, and properties of corresponding divisions are renewed, thereby enabling referencing in the internal method or the auxiliary controllers 700A–700H and the central controller 100 (steps S1–S4).

Figure 7:
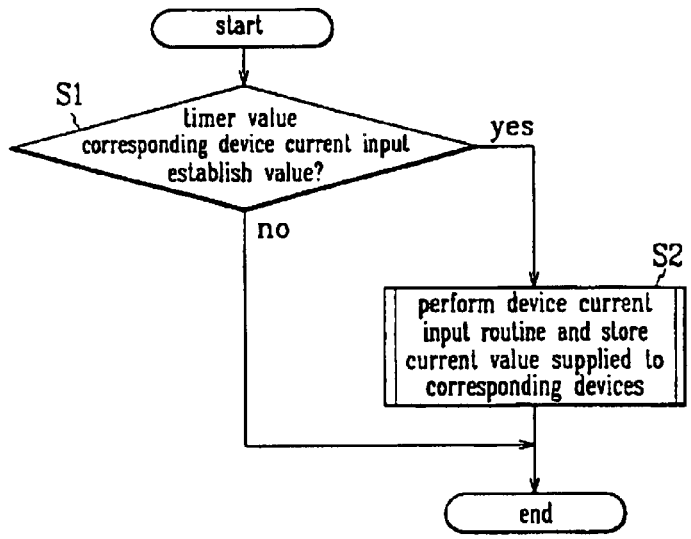
FIG. 7 is a flow chart of a current input routine of devices connected to output ports of auxiliary controllers of FIG. 2

FIG. 7 shows a flow chart of a current input routine of devices connected to output ports of the auxiliary controllers 700A–700H. It is determined if the timer value is an output current input method execution value, and if it is, current flowing to output elements connected to output ports of corresponding auxiliary controllers 700A–700H is detected, and properties of corresponding divisions are renewed, thereby enabling referencing in the internal method or the auxiliary controllers 700A–700H and the central controller 100 (steps S1 and S2).

Figure 8:
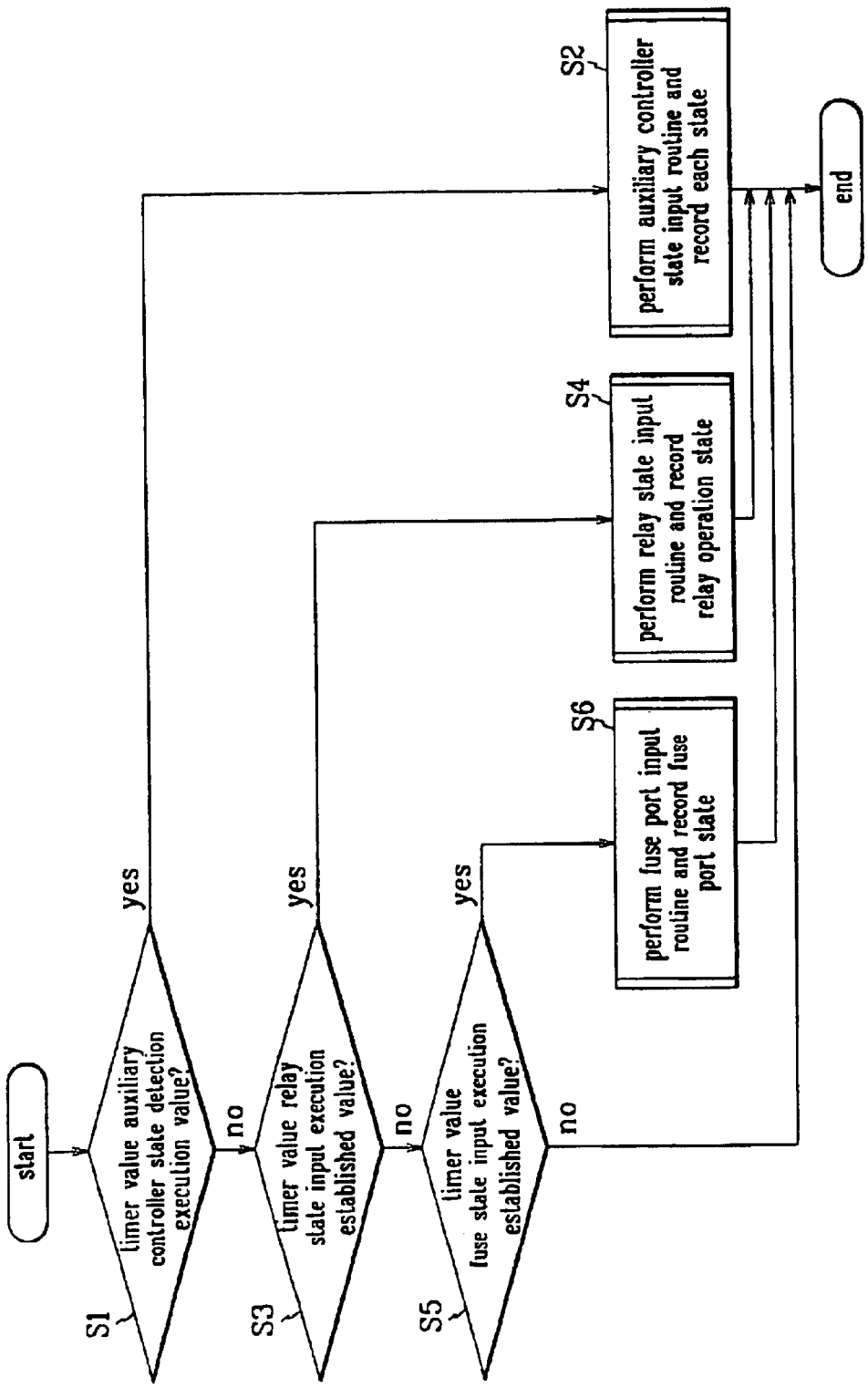
FIG. 8 is a flow chart of a state input routine of auxiliary controllers of FIG. 2.

FIG. 8 shows a flow chart of a state input routine of the auxiliary controllers 700A–700H. It is determined if the timer value is a state input method execution value, and if it is, a fuse state and a relay state within corresponding auxiliary controllers 700A–700H are renewed and stored, thereby enabling referencing of states in the internal method or the auxiliary controllers 700A–700H and the central controller 100 (steps S1–S6).

Figure 9:
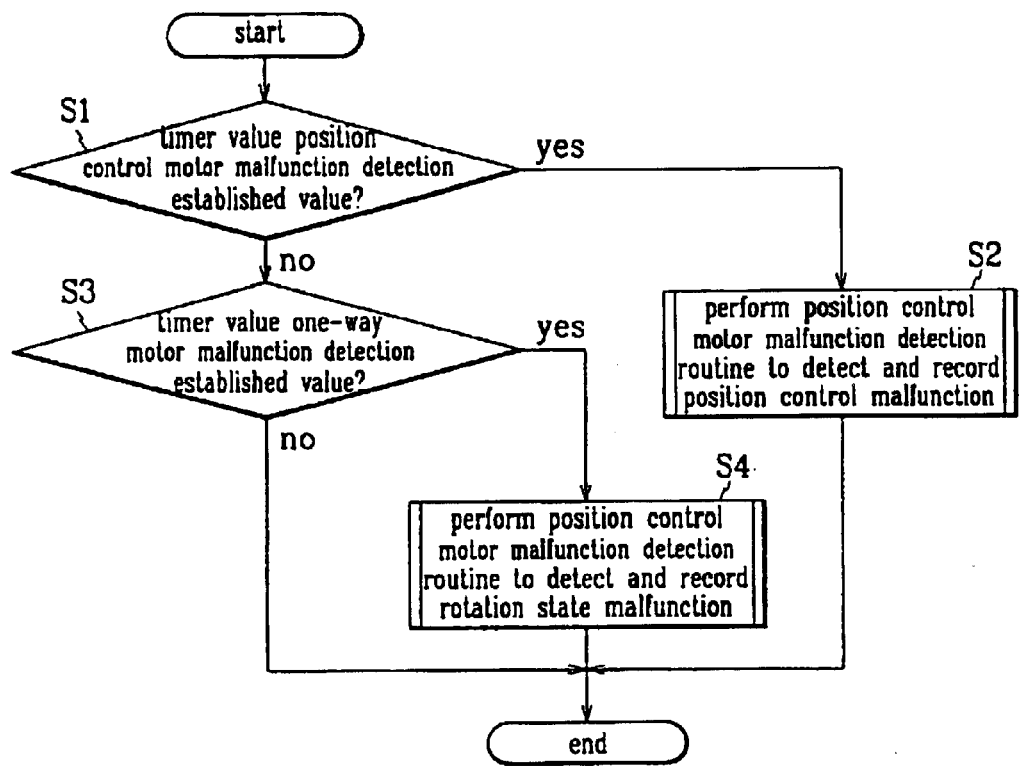
FIG. 9 is a flow chart of a position control motor malfunction detection routine of auxiliary controllers of FIG. 2.

FIG. 9 shows a flow chart of a position control motor malfunction detection routine of the auxiliary controllers 700A–700H. It is determined if the timer value is a motor malfunction detection execution value, and if it is, malfunction detection of motors connected to corresponding auxiliary controllers 700A–700H is performed and malfunctions are recorded, thereby enabling referencing of states in the internal method or the auxiliary controllers 700A–700H and the central controller 100 (steps S1–S4).

That is, in steps S1–S4, if the timer value is a corresponding position control motor malfunction detection established value, a position control motor malfunction detection routine is performed (to be described hereinafter with reference to FIG. 31) to detect and record a position control malfunction. However, if the timer value is not a corresponding position control motor malfunction detection established value, it is determined if the timer value is a corresponding one-way motor malfunction detection established value. If it is, a position control motor malfunction detection method is performed to detect and record a malfunction in a rotation state.

Figure 10:
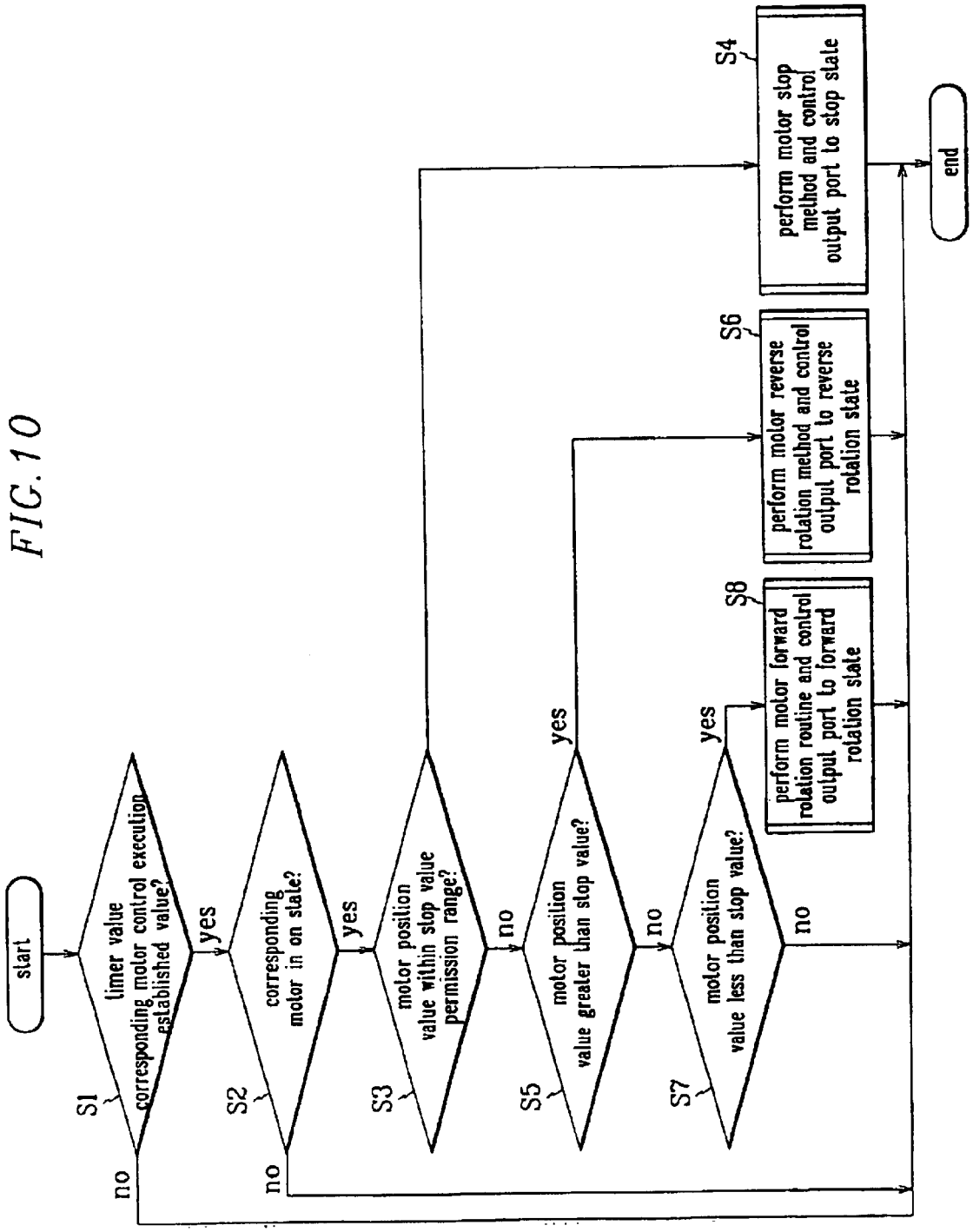
FIG. 10 is a flow chart of a motor position control routine of auxiliary controllers of FIG. 2.

FIG. 10 shows a flow chart of a motor position control routine of the auxiliary controllers 700A–700H.

First, it is determined if the timer value is a corresponding motor control execution established value in step S1. If it is, it is then determined if a corresponding motor is in an on state in step S2. If a corresponding motor is in an on state, it is determined if a motor position value is within a stop value permission range in step S3. If the motor position value is within the stop value permission range, a motor stop method is performed and an output port is controlled to a stop state in step S4.

In step S3, if the motor position value is not within the stop value permission range, it is determined if the motor position value is greater than the stop value in step S5. If it is, a motor reverse rotation method is performed and the output port is controlled to a reverse rotation state in step S6. However, if the motor position value is not greater than the stop value, it is determined in step S7 if the motor position value is less than the stop value in step S7. If it is, a motor forward rotation routine is performed and the output port is controlled to a forward rotation state in step S8. In step S7, if the motor position value is not less than the stop value, the process is ended.

Regarding the execution and control of the internal method, if the timer value is an internal method control execution value, corresponding control data recorded in the auxiliary controllers 700A–700H are referenced to execute and control each method (e.g., methods for motor control and to control a voltage regulator, a speed controller and an automatic grease lubricator). Further, with respect to switch or remaining interrupter methods, methods directly assigned to external interrupters such as switches and communications are set to be processed first to enable output port control or calling and stopping of internal methods.

Input and output for the auxiliary controllers 700A–700H will now be described.

[Input]

Input of the auxiliary controllers 700A–700H of FIG. 3 is separated into pulse input, switch input (operated by on/off control), and variable input. Each input element corresponds to a single input port such that independent input elements are used as corresponding input of the auxiliary controllers (i.e., wiring and connectors are not used). Further, an input value of each element is analyzed to realize an imaginary input division in a memory space.

That is, all input of the vehicle is categorized as pulse input, switch input, or variable input, which acts as an abstract model of the input elements. The model has attributes and behaviors, and is referred to as input divisions. Attributes (variables) of the divisions are renewed in real-time using a method to be described hereinafter, and by the generation, revision, and movement of the divisions, and changes in division variables, method calling, and joining, the integrated control of the vehicle according to the divisions is realized.

In a vehicle, a single system (a single completed device) is realized by sensors (input elements) provided at each area and output parts being directly connected through a wiring circuit. Giving an engine hydraulic pressure gauge device as an example, a hydraulic pressure sensor and a hydraulic pressure gauge are interconnected through wiring and many connectors. If a short develops in the wire used for sensor input, all elements (corresponding wiring, sensor, hydraulic pressure gauge, etc.) are connected to the sensor input wire malfunction. Accordingly, it is difficult to determine the source of the malfunction, that is, from where the short originates.

However, if each element is independently provided, with a maximum value and a minimum value set as a utilization region, and by establishing a wire disconnection if below the minimum value and a short if over the maximum value, the occurrence of a wire disconnection malfunction and a short malfunction for each element can be determined.

For example, in the case of an engine hydraulic pressure sensor, even when the hydraulic pressure is 0 bar, a resistance of the hydraulic pressure sensor is not at 0 but has a characteristic resistance value. This characteristic resistance value is set within a minimum utilization range, and if the hydraulic pressure can be used up to a maximum of 20 bar, a 20 bar resistance value is set as a maximum utilization range. In the case of a short, it is determined that a short has occurred when the sensor value becomes less than the characteristic resistance, and a disconnection is considered to have occurred when the value is above the maximum utilization range.

A method of detecting malfunctions using input values of the elements connected to inputs of the auxiliary controllers 700A–700H will now be described.

Figure 11:
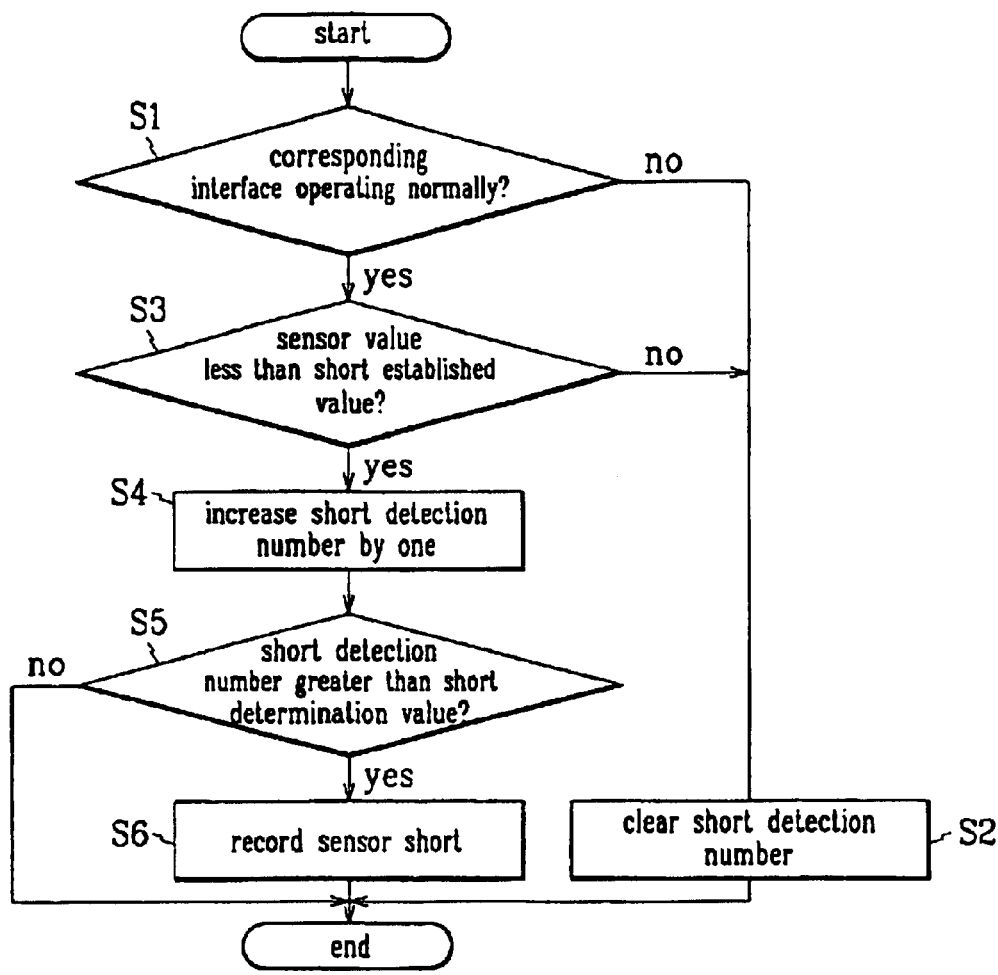
FIG. 11 is a flow chart of a sensor short detection process according to a preferred embodiment of the present invention.

FIG. 11 shows a flow chart of a sensor short detection process according to a preferred embodiment of the present invention. The microcomputer 709 determines if a corresponding interface is operating normally in step S1. If the interface is not operating normally, a short detection number is cleared in step S2. If there is no malfunction, it is determined if a sensor value is less than a short established value in step S3.

Next, if the sensor value is greater than the short established value, the short detection number is cleared in step S2. However, if the sensor value is less than the short established value, the short detection number is increased by one in step S4. It is then determined if the short detection number is greater than a predetermined short determination value in step S5. If the short detection number is less than the short determination value, the process is ended. However, if the short detection number is greater than the short determination value, it is determined that there is a sensor short and the sensor short is recorded in step S6.

Figure 12:
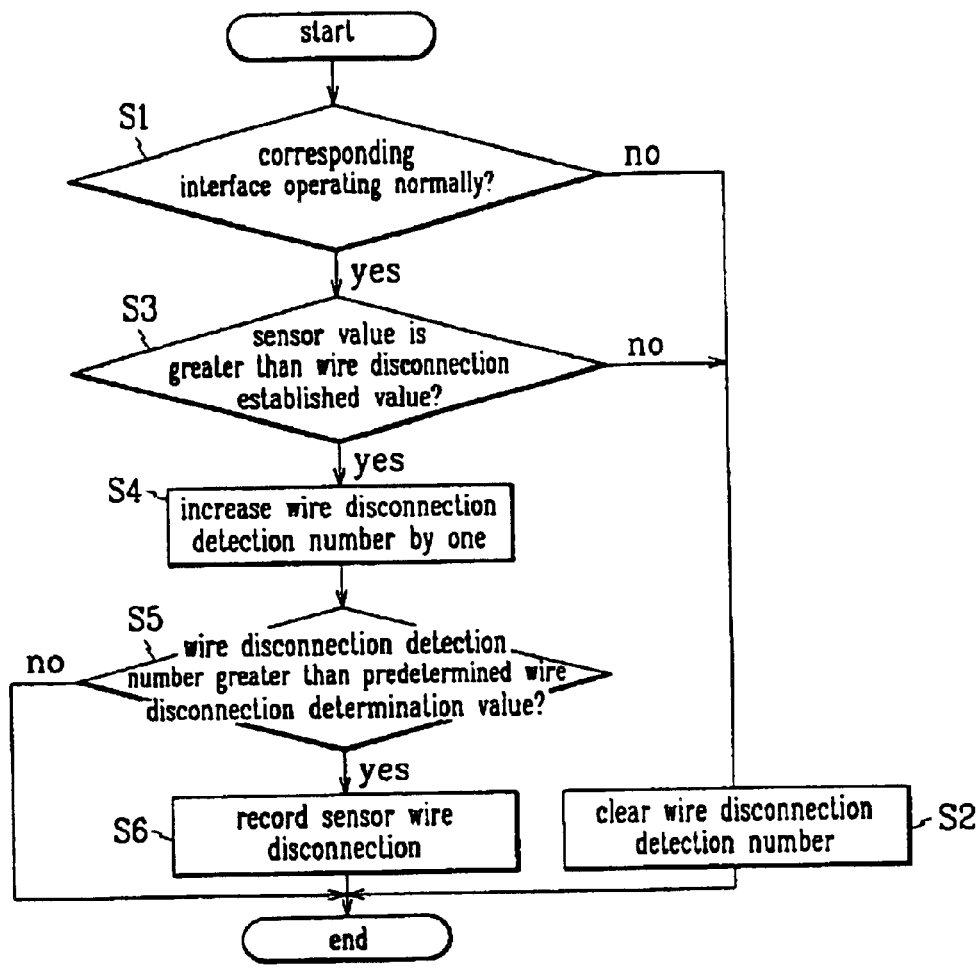
FIG. 12 is a flow chart of a sensor wire disconnection detection process according to a preferred embodiment of the present invention.

FIG. 12 shows a flow chart of a sensor wire disconnection detection process according to a preferred embodiment of the present invention. The microcomputer 709 determines if a corresponding interface is operating normally in step S1. If the interface is not operating normally, a wire disconnection detection number is cleared in step S2. If there is no malfunction, it is determined if a sensor value is greater than a wire disconnection established value in step S3.

Next, if the sensor value is less than the wire disconnection established value, the short detection number is cleared in step S2. However, if the sensor value is greater than the wire disconnection established value, the wire disconnection detection number is increased by one in step S4. It is then determined if the wire disconnection detection number is greater than a predetermined wire disconnection determination value in step S5. If the wire disconnection detection number is less than the wire disconnection determination value, the process is ended. However, if the wire disconnection detection number is greater than the wire disconnection determination value, it is determined that there is a sensor wire disconnection and the sensor wire disconnection is recorded in step S6.

Figure 13:
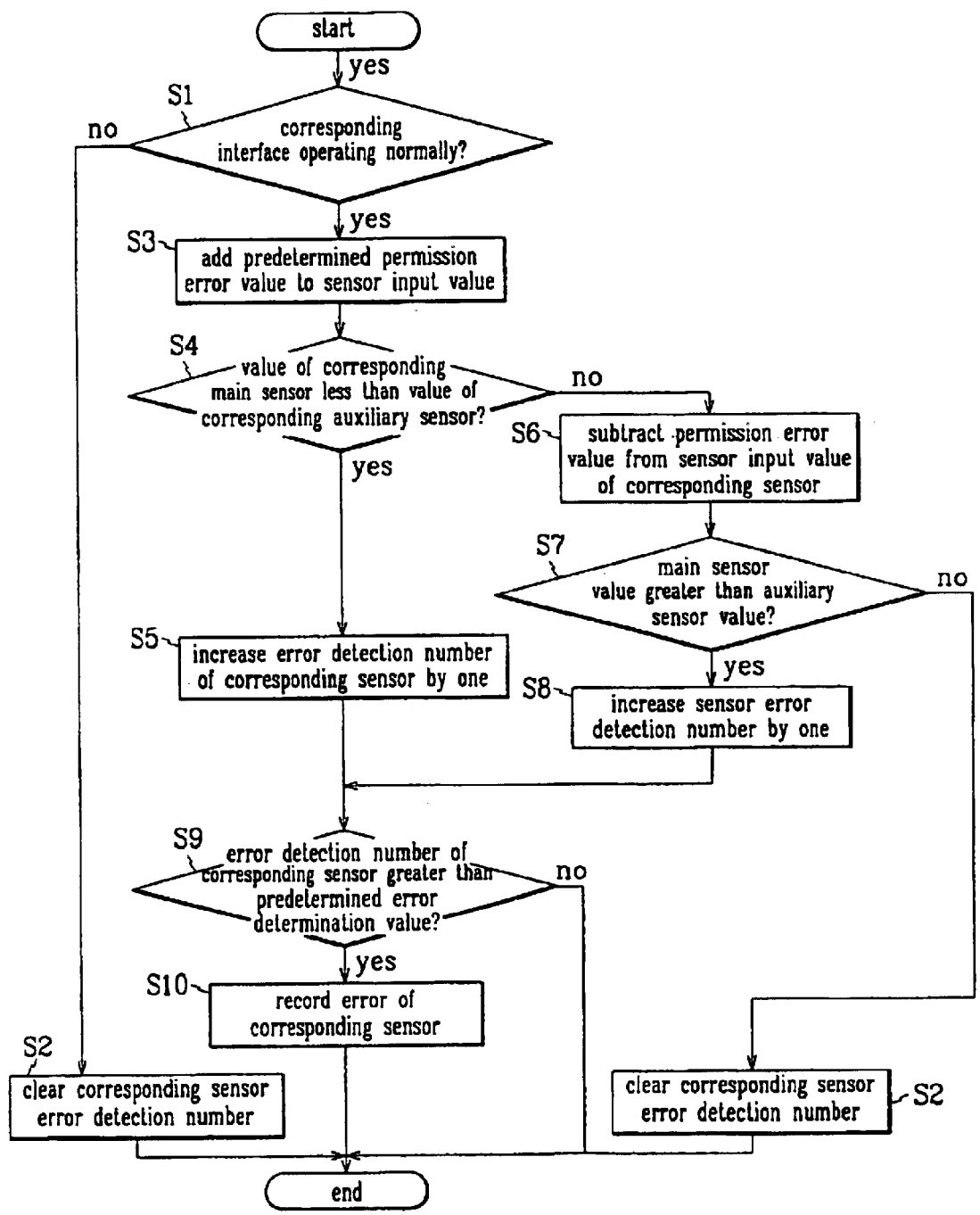
FIG. 13 is a flow chart of a sensor error detection process according to a preferred embodiment of the present invention.

FIG. 13 shows a flow chart of a sensor error detection process according to a preferred embodiment of the present invention. Since identical sensors are used for a main sensor and an auxiliary sensor, and a value converted to a digital format is used, it is possible to detect errors by comparing a value of the main sensors and a value of the auxiliary sensors in a malfunction detection method. For example, values of an RPM main sensor and auxiliary sensor are compared, and if an error is greater than a permissible level, it is determined that there is an error malfunction. If an rpm reference value in a km sensor value is referenced, it is possible to determine if the malfunctioning sensor is the main sensor or the auxiliary sensor.

First, the microcomputer 709 determines if a corresponding interface is operating normally in step S1. If the interface is not operating normally, a corresponding sensor error detection number is cleared in step S2. If there is no malfunction, a predetermined permission error value is added to a sensor input value of the corresponding sensor in step S3.

Next, it is determined if a value of a corresponding main sensor is less than a value of a corresponding auxiliary sensor in step S4. If it is, an error detection number of the corresponding sensor is increased by one in step S5. However, if the main sensor value is not less than the auxiliary sensor value, the permission error value is subtracted from the sensor input value of the corresponding sensor in step S6. Following step S6, it is determined if the main sensor value is greater than the auxiliary sensor value in step S7, and if it is, the sensor error detection number is increased by one in step S8. However, if the main sensor value is not greater than the auxiliary sensor value, the sensor error detection number is cleared in step S2.

After either step S5 or S8, it is determined if the error detection number of the corresponding sensor is greater than a predetermined error determination value in step S9. If it is, the error of the corresponding sensor is recorded in step S10.

Detection of the frequency of sensor operation will now be described. In the case of sensors and switches that operate only when an event occurs, it is necessary to check for normal operation. An example of such an element is a brake light switch that operates only if the driver engages a brake pedal.

Accordingly, in a method of determining an operation state of the microcomputer 709, data of each sensor are compared to count an operational number and store the same in a corresponding division.

Figure 14:
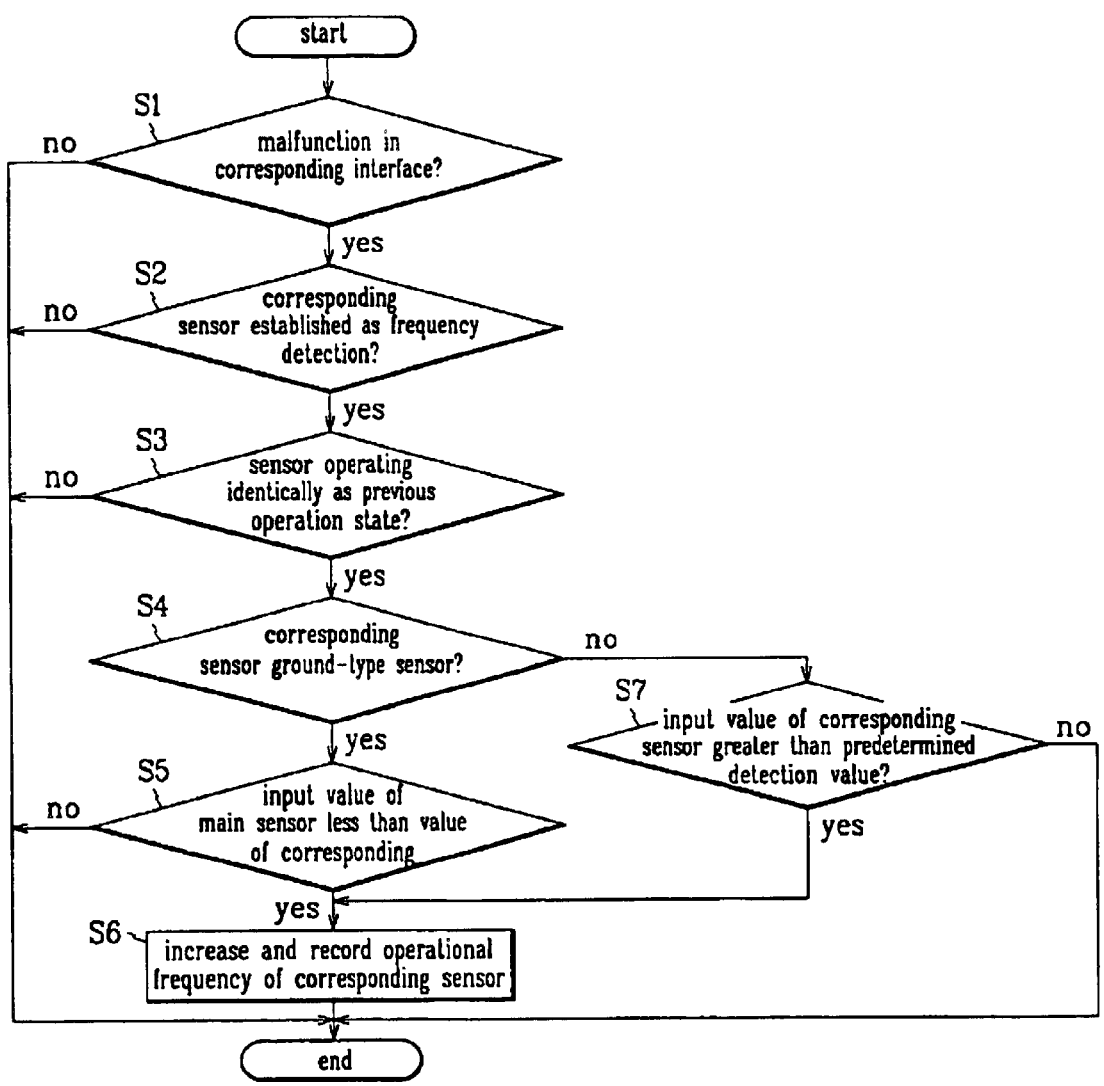
FIG. 14 is a flow chart of a sensor operational frequency detection process according to a preferred embodiment of the present invention.

FIG. 14 shows a flow chart of a sensor operational frequency detection process according to a preferred embodiment of the present invention.

The microcomputer 709 determines if there is a malfunction in a corresponding interface in step S1. If there is a malfunction, it is determined if a corresponding sensor is established as a frequency detection sensor in step S2.

If the corresponding sensor is established as a frequency detection sensor, it is determined if the sensor is operating identically as a previous operation state in step S3. If it is, it is then determined if the corresponding sensor is a ground-type sensor in step S4. If the corresponding sensor is a ground-type sensor, it is determined if an input value of the corresponding sensor is less than a predetermined detection value in step S5. If the input value is less than the detection value, an operational frequency of the corresponding sensor is increased and recorded in step S6.

In step S4, if the corresponding sensor is not a ground-type sensor, it is determined if the input value of the corresponding sensor is greater than the predetermined detection value in step S7. If the input value is greater than the detection value, step S6 is performed, and if it is not greater than the detection value, the process is ended. In steps S1, S2, and S3, if the result of any one of the determinations is "no", then the process is ended.

When it is detected that an input variable value has increased to greater than a reference value, it is possible to apply the wire disconnection frequency and the short frequency, and after the input variable detection method is executed, it is determined if the input variable frequency of a corresponding sensor is greater than a predetermined determination value. If it is larger, an input variation is recorded in a corresponding sensor division, and if it is not larger, the process is ended.

[Output]

Methods of vehicles that are interconnected and controlled do not sufficiently satisfy conditions of electronic control methods or digital control methods. For example, if a defect occurs in a ground wire of a particular region of a device, malfunctions arise in devices that are completely unrelated to the device in which the ground defect has occurred. There are many reasons for this phenomenon. Also, its main cause cannot be linked to the control methods. Instead, this is because for particular reasons (increase in frame wiring, etc.), most elements do not operate on an on (=battery+power) and off (=battery−power) configuration, but an on (=battery+power) and off (=no range) configuration.

Further, devices are controlled by an on (=battery+power) and off (=battery−power) configuration.

Each output port of the auxiliary controllers assigned to logic regions corresponds to each output division (parts controlled by vehicle power with wiring and connectors omitted). By enabling utilization current of corresponding elements to be read, each output element is divided.

With regard to improvements made in a device of the vehicle, if theory is applied without its affect on other devices, results can vary significantly from those anticipated.

Although resistance in a disconnected wire is 0 Ω theoretically, in the case of wiring for a vehicle, it is very possible for different values to result since wires often branch and leakage occurs. This results from humidity, corrosion, contact deficiencies, etc. of the wires used.

In order to repair the malfunctioning portion, utilization currents of the main wires are checked or a utilization current of a corresponding output element is checked to determine the cause of the malfunction. For example, a technician may operate select devices and by viewing an ampere meter, can determine the cause of the malfunction.

This is possible because much information can be obtained by checking the state of the utilization current of elements. For example, large variations in the state of current for a generator F coil is indicative of brush or slip ring wear. Also, no current flow indicates a wire disconnection in the F coil and a larger flow of current than normal suggests damage to the coil. If the utilization currents of other output elements are checked and used together, malfunction detection can be more precisely performed.

Accordingly, each output port of the auxiliary controllers corresponds to one output element, and the utilization current and voltage of the corresponding elements are able to be read in real-time such that the malfunction and potential malfunctions of corresponding output elements can be detected. As a result, in a voltage detection method used together with the current detection method, a voltage of each portion is monitored to enable the realization of a method that can automatically act as a countermeasure to malfunctions.

Referring again to FIG. 3, the output port 715a of the output controller 715 is controlled by the microcomputer 709, and has a latch function and a read/write function. If the microcomputer 709 sets a corresponding bit of the output port 715a, a current that can operate the corresponding relay/TR output unit 714 can be ensured in the output port interface 715b, and the relay or the TR in the relay/TR output unit 714 is controlled to on. Accordingly, the output element connected to the relay or the TR output is operated.

Figure 15:
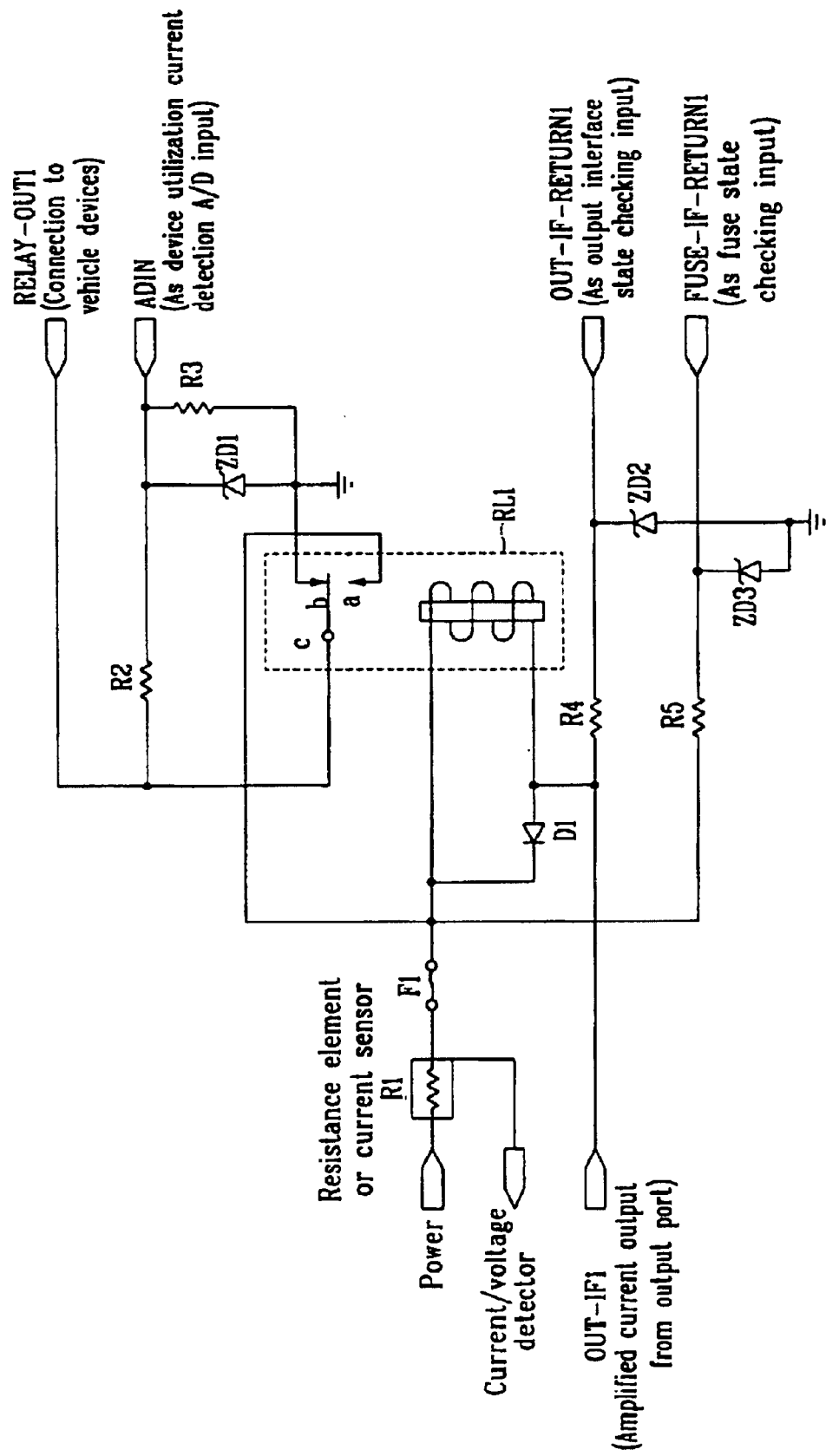
FIG. 15 is a detailed circuit diagram of a relay/TR output unit of FIG. 3.

FIG. 15 shows a detailed circuit diagram of the relay/TR output unit 714. The relay/TR output unit 714 includes a reference resistor R1 connected to a battery supply and which reads a voltage drop that flows as a load; a relay RL1 having a relay coil connected to the resistor R1 through a fuse F1 for protecting an output device, an "a" contact point connected to a protection resistor R5 of a fuse state check input connected to one end of the fuse F1, a "c" contact point connected to both an output terminal RELAY-OUT1, which is connected to vehicle devices, and a current detection input terminal ADIN (i.e., an input terminal of the current voltage detector 716), and a "b" contact point grounded at a battery supply; a diode D1 connected to both ends of the relay coil of the relay RL1 and which absorbs a surge voltage generated by the relay coil; a zener diode ZD1 for protecting the current voltage detector 716 from excess voltage flowing to the current detection input terminal ADIN; and resistors R2 and R3 for output element utilization current detection input protection.

The relay/TR output unit 714 further includes a resistor R4, one end of which is connected between an anode terminal of the diode D1 and the relay coil, and connected also to an output terminal OUT-IF1 of the output port interface 715b, with it's other end connected to an interface diagnosis port OUT-IF-RETURN1 (the input terminal of the output return interface 717a) for the self-diagnosis of the output return interface 717a; a zener diode ZD2, an anode terminal of which is grounded and a cathode terminal of which is connected to the resistor R4 and the interface diagnosis port OUT-IF-RETURN1 to protect the output return interface 717a from excess voltage;

and a zener diode ZD3, an anode terminal of which is grounded and a cathode terminal of which is connected between the fuse F1 and the relay coil through the resistor R5, and, at the same time, to a fuse diagnosis port FUSE-IF-RETURN1 (the input terminal of the fuse return interface 718a) for the self-diagnosis of the fuse return interface 718a to protect the fuse return interface from excess voltage.

The reference resistor R1 reads the voltage drop flowing as a load and compares the same to a present voltage to detect a current. A low metallic resistor can be used for the reference resistor R1, and it is also possible to use a current sensor that can detect a current.

The relay RL1 basically uses a three-contact-point method, but when a corresponding bit of the output port is 0 the relay has an output of battery−voltage (0V), and when a corresponding bit of the output port is 1 the relay has an output of battery+voltage (12V or 24V), and includes a device utilization current detector, output interface detector, and fuse state detector input.

Malfunctions in the output system that frequently occur are those in fuse wiring, the relay, and wiring and connectors. In the present invention, since the relay/TR output unit 714 and a method in which fuse state input and output port state input can be read are used, the detection of interface malfunctions, relay malfunctions, fuse states, and power state malfunctions will be examined.

First, when the bit of the corresponding output port 715a is 1, the output terminal OUT-IF1 of the output port interface 715b is 0, and the interface diagnosis port OUT-IF-1 is 0, if a battery+voltage is generated in the current detection input terminal ADIN, this is considered a normal state. When the bit of the corresponding output port 715a is 0, the output terminal OUT-IF1 of the output port interface 715b is 1, and the interface diagnosis port OUT-IF-RETURN1 is 1, if a battery−voltage is generated in the current detection input terminal ADIN, this is considered a normal state.

However, when the bit of the corresponding output port 715a is 1, the output terminal OUT-IF1 of the output port interface 715b is 1, and the interface diagnosis port OUT-IF-RETURN1 is 1, it is determined that there is an output port interface malfunction. The detected malfunction is recorded in a corresponding division.

Further, when a bit of a relay contact point fusing is 0, a corresponding bit of the output port interface 715b is 1, and a battery+voltage is generated in the corresponding current detection input terminal ADIN, it is determined that there is a relay contact point fusing malfunction. The detected malfunction is recorded in a corresponding division.

When a bit of the corresponding output port 715a is 1, the output terminal OUT-IF1 is 0, the fuse diagnosis port FUSE-IF-RETURN1 is 1, and a battery+voltage is not generated in the corresponding current detection input terminal ADIN, it is determined that there is a relay malfunction. If the fuse diagnosis port FUSE-IF-RETURN1 is 0, the fuse is malfunctioning. The detected malfunction is recorded in a corresponding division.

Disconnection and short detection of devices connected to the relay/TR output unit 714 will now be described.

Output elements connected to the relay/TR output unit 714 are ultimately controlled by battery power. The malfunctions of electrical devices operated by battery power can be divided into two basic types: disconnections (no utilization current) and shorts (utilization current at maximum). In more detail, there are intermittent disconnections (a disconnection state results then rectifies itself and the pattern repeats), intermittent shorts (a short state results then rectifies itself and the pattern repeats), and a region short (a state in which a utilization current is greater than a reference current).

A current value (it is possible to also directly use a voltage drop value) converted in the current voltage detector 716 is established with a utilization range between a maximum value and a minimum value of a current that can be used in a corresponding device. When below the minimum value the current value is in a disconnection range, and when above the maximum value it is in a short range. Accordingly, a disconnection malfunction and a short malfunction are able to be detected. Further, referencing a utilization current of a corresponding division, a method is used to detect an intermittent disconnection, intermittent short, and region short.

In the present invention, this method is performed through the detection of disconnections and shorts of all electrical devices connected to the relay/TR output unit 714, and the detected malfunction is recorded in a corresponding division.

Figure 16:
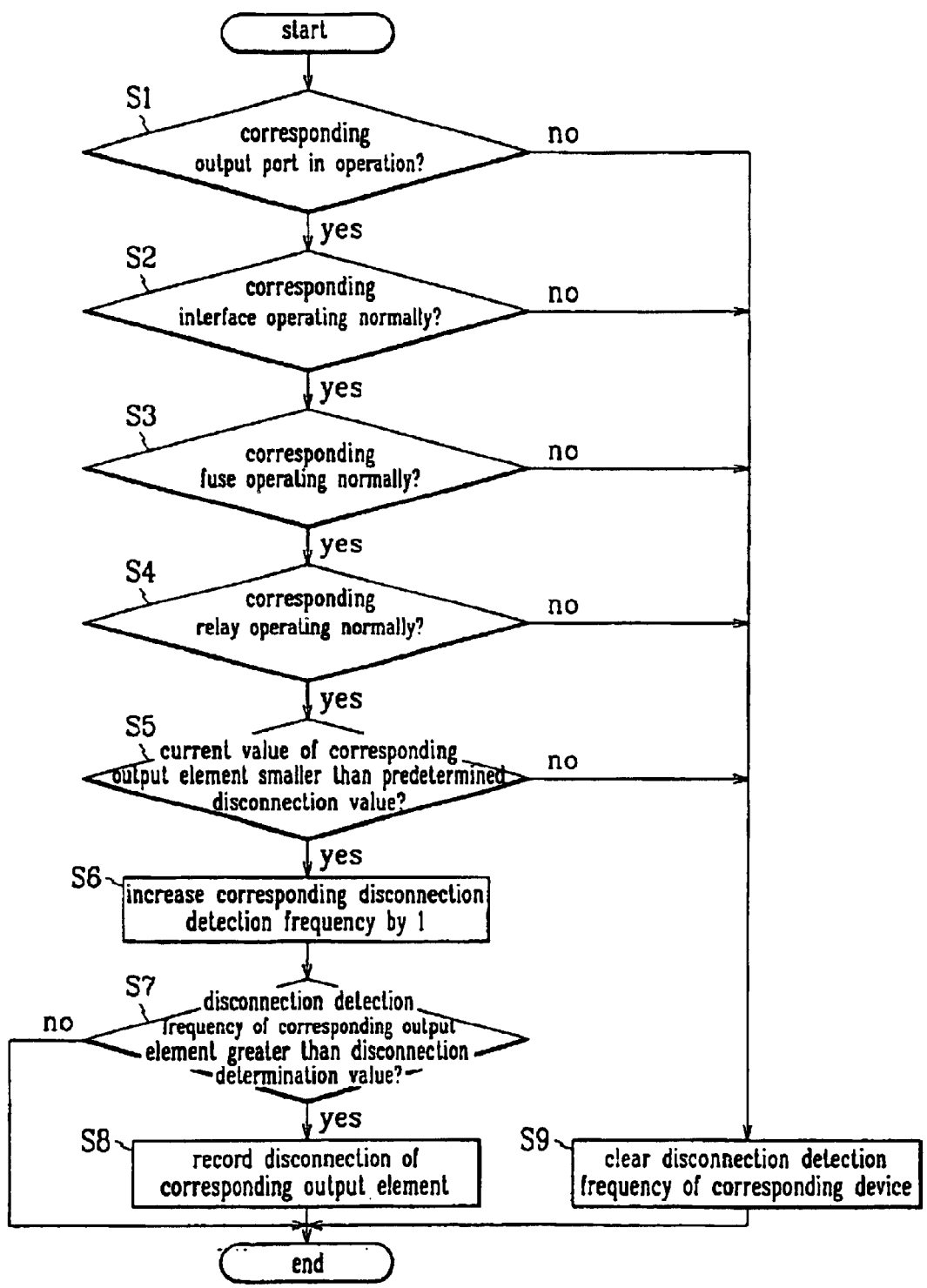
FIG. 16 is a flow chart of a process for detecting a disconnection in devices operated by an output port according to a preferred embodiment of the present invention.

FIG. 16 shows a flow chart of a process for detecting a disconnection in devices operated by an output port.

First, it is determined if a corresponding output port is in operation in step S1. If the corresponding output port is in operation, it is determined if a corresponding interface is operating normally in step S2. If the corresponding interface is operating normally, it is determined if a corresponding fuse is operating normally in step S3. If the corresponding fuse is operating normally, it is determined if a corresponding relay is operating normally in step S4.

Next, if the corresponding relay is operating normally, it is determined if a current value of a corresponding output element is smaller than a predetermined disconnection value in step n5. If the current value is smaller than the disconnection value, a corresponding disconnection detection frequency is increased by 1 in step S6. It is then determined if the disconnection detection frequency of the corresponding output element is greater than a disconnection determination value in step S7. If it is, a disconnection of the corresponding output element is recorded in step S8.

If the determination result of any of the steps S1–S5 is negative, the disconnection detection frequency of the corresponding device is cleared in step S9, after which the process is ended. Also, in step S7, if the disconnection detection frequency of the corresponding output element is not greater than the disconnection determination value, the process is ended.

Figure 17:
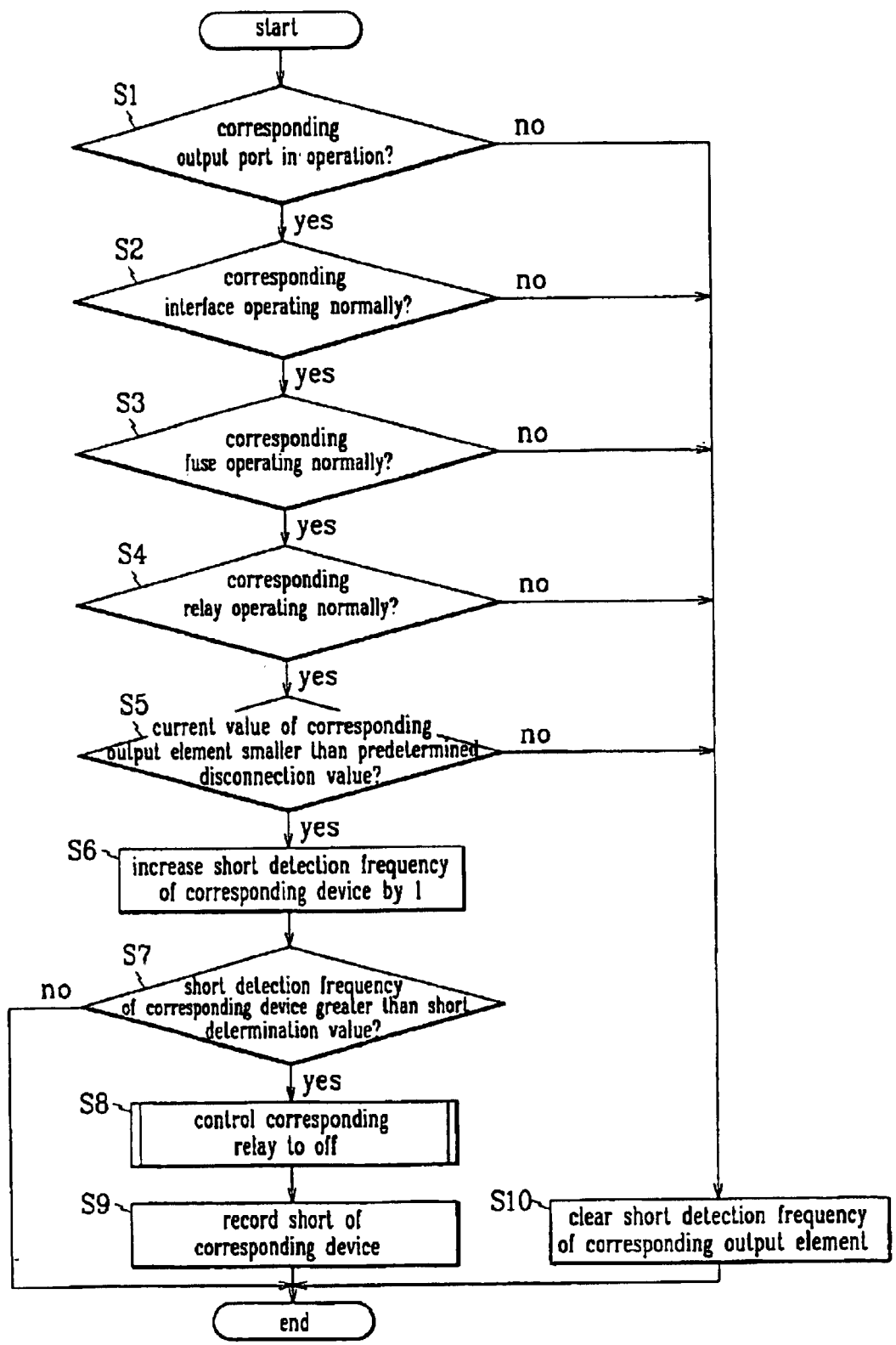
FIG. 17 is a flow chart of a process for detecting a short in devices operated by an output port according to a preferred embodiment of the present invention.

FIG. 17 shows a flow chart of a process for detecting a short in devices operated by an output port.

In step S1, it is determined if a corresponding output port is in operation. If the corresponding output port is operating, it is determined if a corresponding interface is operating normally in step S2. If the corresponding interface is operating normally, it is determined if a corresponding fuse is operating normally in step S3. If the corresponding fuse is operating normally, it is determined if a corresponding relay is operating normally in step S4.

Next, if the corresponding relay is operating normally, it is determined if a current value of a corresponding device is greater than a predetermined short value in step S5. If the current value is greater than the short value, a short detection frequency of the corresponding device is increased by 1 in step S6. It is then determined if the short detection frequency of the corresponding device is greater than a short determination value in step S7. If it is, a corresponding relay is controlled to off in step S8. Subsequently, the short of the corresponding device is recorded in step S9.

If the determination result of the steps S1–S5 is negative, the short detection frequency of the corresponding output element, is cleared in step S10, after which the process is ended. Also, in step S7, if the short detection frequency of the corresponding device is not greater than the short determination value, the process is ended.

FIG. 18 is a chart used to describe how normal, disconnection, and short states are determined according to a preferred embodiment of the present invention.

If the present value is within a predetermined normal value range, this is indicative of a normal state; if the present value is within a predetermined disconnection value range, this is indicative of a disconnection state; and if the present value is within a predetermined short value range, this is indicative of a short state.

Next, the point at which an output variable value (intermittent disconnection, intermittent short) varies to above a reference value is detected. The disconnection detection frequency and the short detection frequency can be used, and after a current variation method is executed, it is determined if a utilization current variation frequency of a corresponding output element is greater than a predetermined determination value. If it is greater, the utilization current variation is recorded in a corresponding output element division, and if it is not greater the process is ended.

The detection of malfunctions in devices rotated by an engine will now be described.

In the conventional vehicle, automatic detection of rotational devices is only possible with the use of complicated equipment.

In the present invention, if a pulse sensor is provided at a corresponding device, the detection of such malfunctions is possible together with the referencing of joint data. For example, if monitoring of an engine water pump, which is driven by a belt, is desired, a sensor and a pulse ring are mounted on a drive shaft of the water pump and connected to a pulse sensor port. By checking a ratio of engine rpm to water pump rpm in a monitoring routine, a rotational state and a belt state of the water pump can be monitored.

Figure 19:
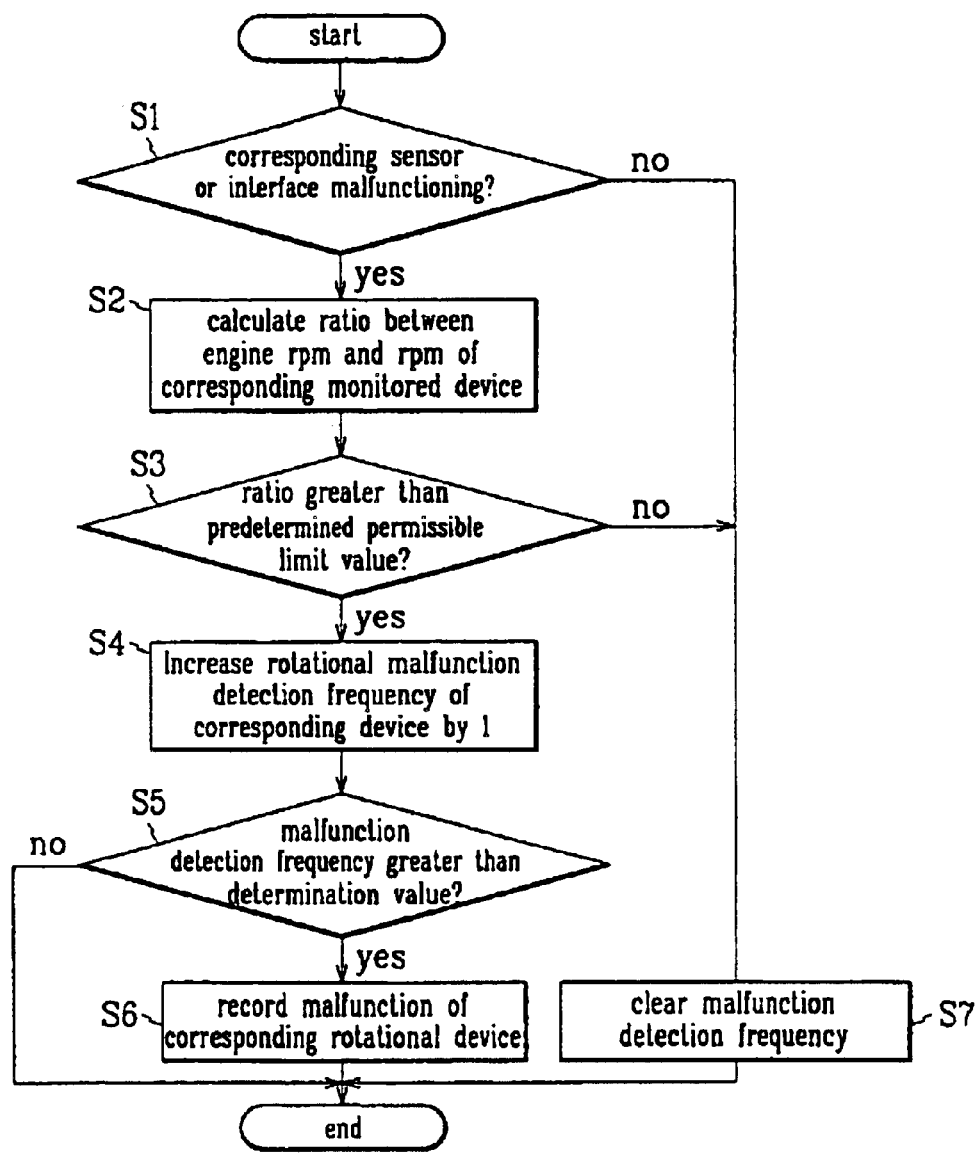
FIG. 19 is a flow chart of a process for determining a rotational state of devices rotated by an engine according to a preferred embodiment of the present invention.

FIG. 19 shows a flow chart of a process for determining a rotational state of devices rotated by an engine according to a preferred embodiment of the present invention.

First, it is determined if a corresponding sensor or interface is malfunctioning in step S1. If there is a malfunction in the corresponding sensor or interface, a ratio between engine rpm and rpm of a corresponding monitored device is calculated in step S2. Next, it is determined if the ratio is greater than a predetermined permissible limit value provided in the microcomputer 709 in step S3. If the ratio is greater than the permissible limit value, a rotational malfunction detection frequency of the corresponding device is increased by 1 in step S4.

Subsequently, it is determined if the malfunction detection frequency is greater than a determination value provided in the microcomputer 709 in step S5. If it is, a malfunction of the corresponding rotational device is recorded in step S6. In step S1 or 53, if the determination result is negative, step S7 is performed in which the malfunction detection frequency is cleared. Also, if the determination result of S5 is negative, and following steps S6 and 57, the process is ended.

Next, the reading of voltage for each portion of the vehicle to generate a corresponding division in the current voltage detector 716 of the auxiliary controllers 700A–700H will now be described.

In a method of detecting a battery connection defect to automatically control the voltage regulator, a battery connection defect in a high output generator can cause serious malfunctions in all electrical devices.

M power is directly connected to the vehicle battery so that when vehicle power goes to off, power is not cut off. B power is connected to generator output such that when the battery is precisely connected, B power and M power are identical if a voltage drop caused by a cable is neglected.

However, if the battery and generator are not connected, a charge voltage becomes unstable and the difference between the battery voltage and generator charge voltage increases as the generator output increases. If such a state develops, the generator output voltage must be reduced to below a charge voltage reference value, and also, the device must be protected and the driver alerted.

Such a control method is difficult to realize in the conventional vehicle. However, in the present invention, since voltages of each area are divided, this control is possible by referencing corresponding divisions of integrated code data.

Further, if a battery connection defect is detected, this can be referenced in other locations such that intelligent automatic control is possible.

Figure 20:
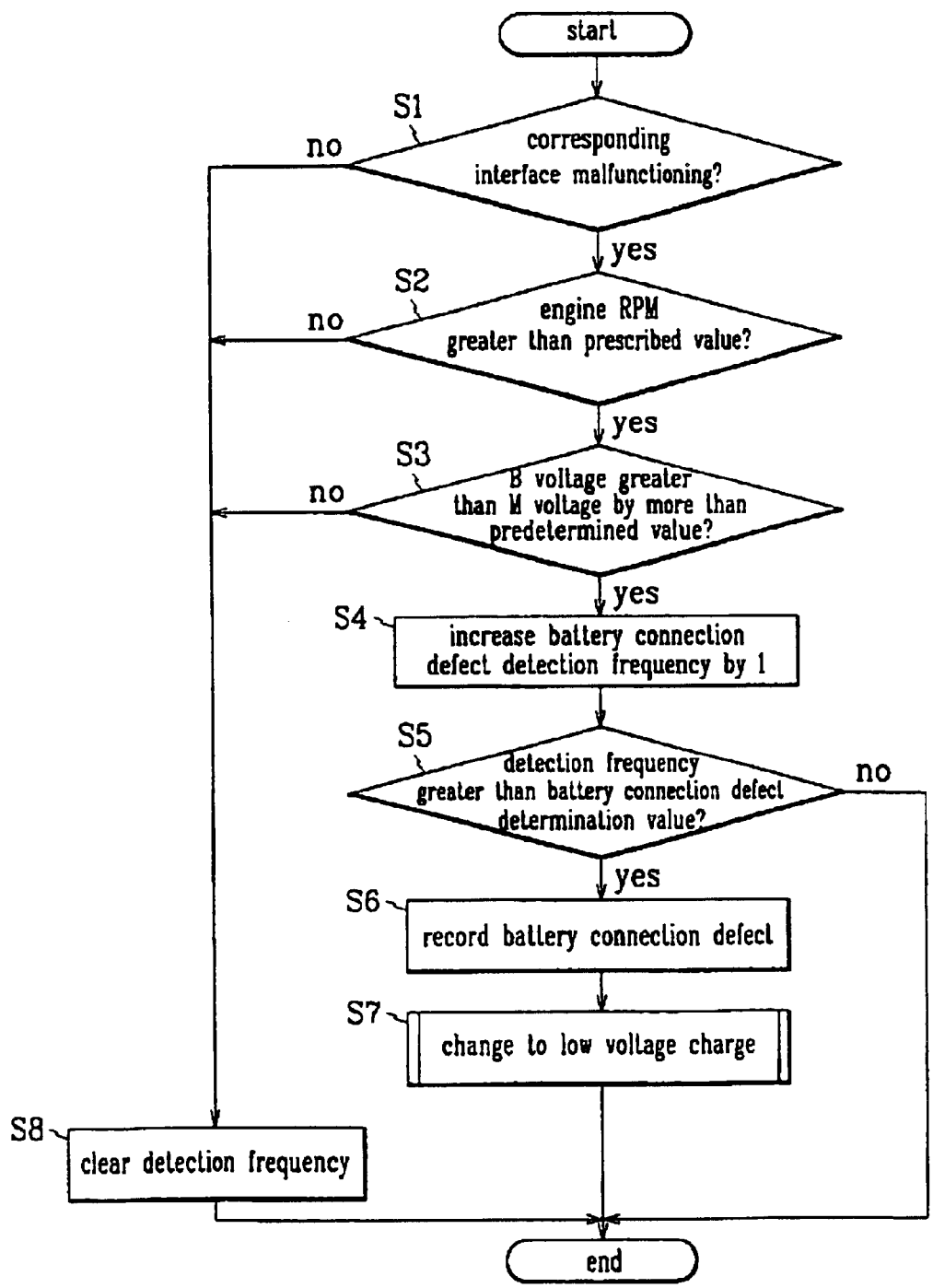
FIG. 20 is a flow chart of a process for detecting a battery connection defect and automatically controlling a voltage regulator according to a preferred embodiment of the present invention.

FIG. 20 shows a flow chart of a process for detecting a battery connection defect and automatically controlling a voltage regulator according to a preferred embodiment of the present invention.

In step S1, it is determined if a corresponding interface (division) is malfunctioning. If the corresponding interface is malfunctioning, it is determined if engine RPM is greater than a prescribed value in step S2. If the engine RPM is greater than the prescribed value, it is determined if a B voltage is greater than an M voltage by more than a predetermined value in step S3. If it is, a battery connection defect detection frequency is increased by 1 in step S4.

Next, it is determined if the detection frequency is greater than a battery connection defect determination value provided in the microcomputer in step S5. If it is, a battery connection defect is recorded in step S6, then changed to a low voltage charge in step S7. In steps S1–S3, if any one of the determination results is negative, the detection frequency is cleared in step SB. Also, if the determination result of step S5 is negative, or after step S7 or S8 is completed, the process is ended.

However, with a voltage regulator, when an IG power, B power, or N power is greater or less than a reference voltage, since F output is controlled there are many limitations to such a method.

The automotive (bus) generator is increasingly able to supply more output. In a high output generator, if there is a disconnection or contact defect in an output wire, a voltage regulator determines only that a battery voltage is low and continues to supply power to an F wire. This results in an internal voltage of the generator becoming extremely high —several hundreds of volts. Accordingly, an output of an N voltage, to which devices are directly connected, also becomes several hundreds of volts such that the devices are damaged.

Further, when the generator output line contact defect is again connected, it is possible for a high voltage to be abruptly generated. The cause of this malfunction is difficult to rectify through an electric device method.

Figure 21:
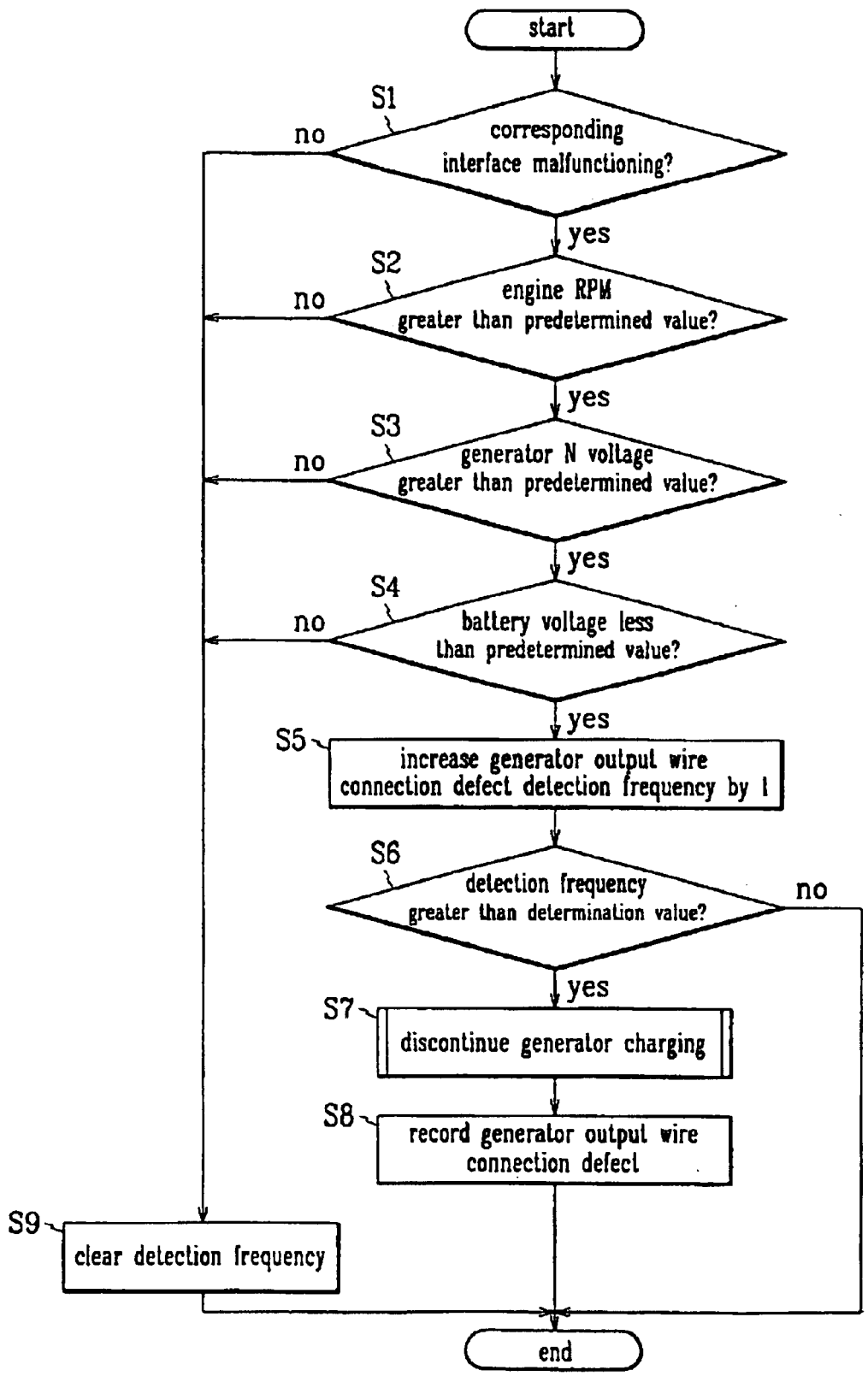
FIG. 21 is a flow chart of a process for detecting a generator output wire connection defect and controlling a voltage regulator according to a preferred embodiment of the present invention.

FIG. 21 shows a flow chart of a process for detecting a generator output wire connection defect and controlling a voltage regulator according to a preferred embodiment of the present invention. In the process, an interface malfunction is checked and it is determined if a generator is operating.

Since an output wire is in a disconnection state, the B power maintains a battery voltage, and since a generator N voltage is generated above a reference value, a generator control voltage is controlled to 0V to cut off charging and a malfunction state is displayed.

That is, it is determined if a corresponding interface is operating normally in step S1. If the interface is operating normally, it is determined if engine RPM is greater than a predetermined value in step S2. If the engine RPM is greater than the predetermined value, it is determined if a generator N voltage is greater than a predetermined value in step S3. If it is, it is determined if a battery voltage is less than a predetermined value in step S4. If the battery voltage is less than the predetermined value, a generator output wire connection defect detection frequency is increased by one in step S5.

Next, it is determined if the detection frequency is greater than a determination value provided in the microcomputer in step S6. If it is, generator charging is discontinued in step S7, then a generator output wire connection defect is recorded in step S8. If any one of the determination results in steps S1–S4 is negative, the detection frequency is cleared in step S9. Also, if the determination result of step S5 is negative, or after step S9 or S8, the process is ended.

Here, a generator F wire disconnection, short, output wire connection defect, generator output defect, generator belt slippage, interface malfunction, output TR malfunction, fuse short, etc. can be displayed, and symptoms for potential malfunctions can be detected.

If the engine is operating at roughly 1000 RPM or more, generator charge current should be greater than the current used by the vehicle. If the charge voltage falls below a reference value of about 13.8V or 27.6V, the voltage regulator supplies electricity to the F coil to increase the amount of electricity generation. If the charge voltage is less than the reference voltage and power is not supplied to the F coil, the voltage generator is malfunctioning, and if power is supplied but charge voltage does not increase, the generator is internally malfunctioning. A generator malfunction can be precisely detected by referencing records of a generator output wire malfunction, generator belt malfunction, charge cut-off, etc.

Since there are always symptoms for a variety of malfunctions before they actually occur, malfunctions can be prevented by performing real-time detection of each division in order to detect such symptoms.

Figure 22:
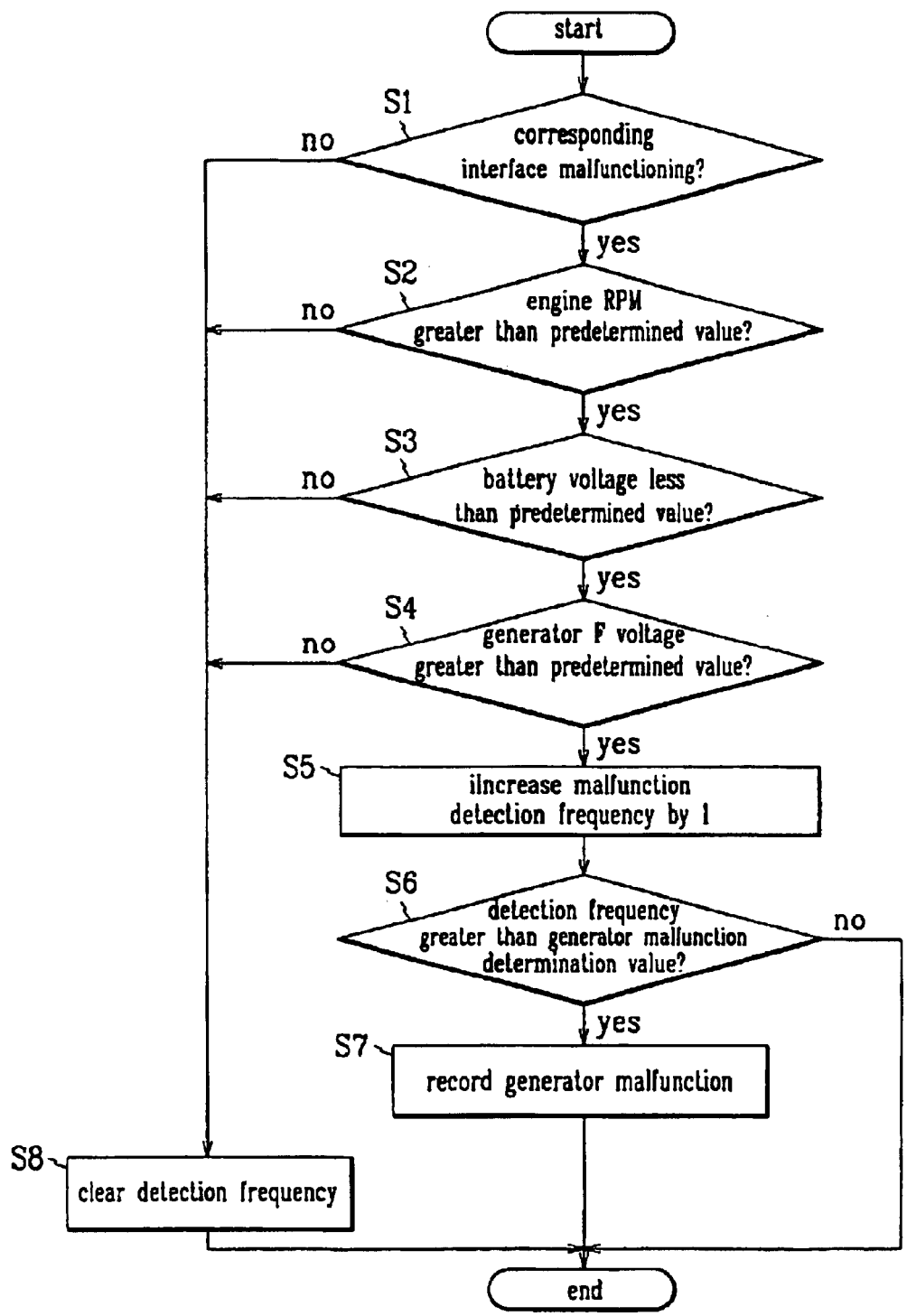
FIG. 22 is a flow chart of a process for detecting a generator malfunction according to a preferred embodiment of the present invention.

FIG. 22 shows a flow chart of a process for detecting a generator malfunction according to a preferred embodiment of the present invention.

First, it is determined if a corresponding interface is operating normally in step S1. If it is, it is determined if engine RPM is greater than a predetermined value in step S2. If engine RPM is greater than the predetermined value, it is determined if a battery voltage is less than a predetermined value in step S3. If the battery voltage is less than the predetermined value, it is determined if a generator F voltage is greater than a predetermined value in step S4.

If the battery F voltage is greater than the predetermined value, a malfunction detection frequency is increased by 1 in step S5. Next, it is determined if the detection frequency is greater than a generator malfunction determination value provided in the microcomputer 709 in step S6. If it is, a generator malfunction is recorded in step S7. In steps S1–S4, if any one of the determination results is negative, the detection frequency is cleared in step 58. Also, if the determination result of step S6 is negative, or after step S8 or S7, the process is ended.

Figure 23:
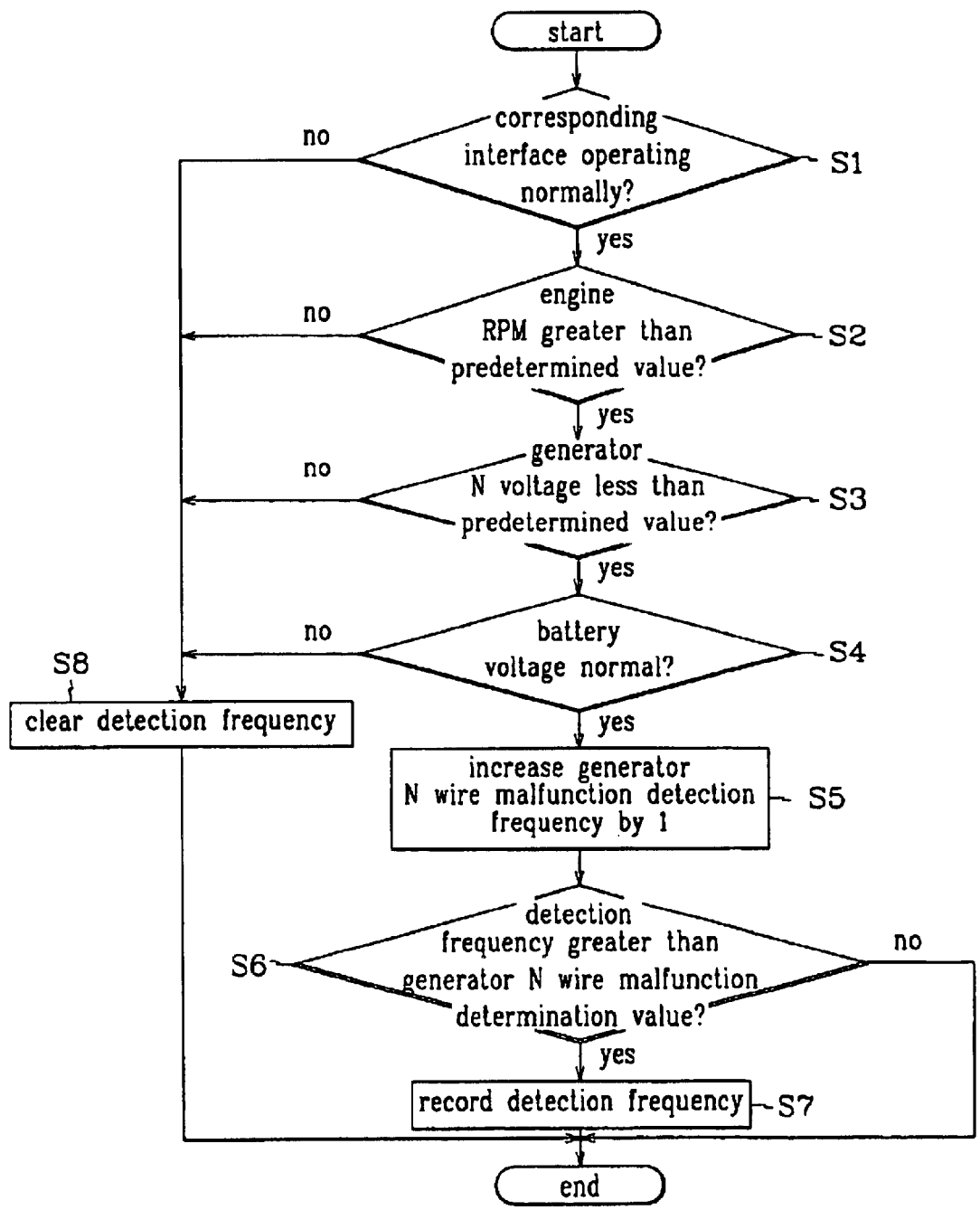
FIG. 23 is a flow chart of a process for detecting a malfunction in a generator N wire according to a preferred embodiment of the present invention.

FIG. 23 shows a flow chart of a process for detecting a malfunction in a generator N wire according to a preferred embodiment of the present invention.

It is determined in step S1 if a corresponding interface is operating normally. If it is, it is determined if engine RPM is greater than a predetermined value in step S2. If engine RPM is greater than the predetermined value, it is determined if a generator N voltage is less than a predetermined value in step S3. If the generator N voltage is less than the predetermined value, it is determined if a battery voltage is normal in step S4.

If the battery voltage is normal, a generator N wire malfunction detection frequency is increased by 1 in step S5. Next, it is determined if the detection frequency is greater than a generator N wire malfunction determination value provided in the microcomputer 709 in step S6. If it is, a generator N wire malfunction is recorded in step S7. In steps S1–S4, if any one of the determination results is negative, the detection frequency is cleared in step S8. Also, if the determination result of step S6 is negative, or after step Se or S7, the process is ended.

Figure 24:
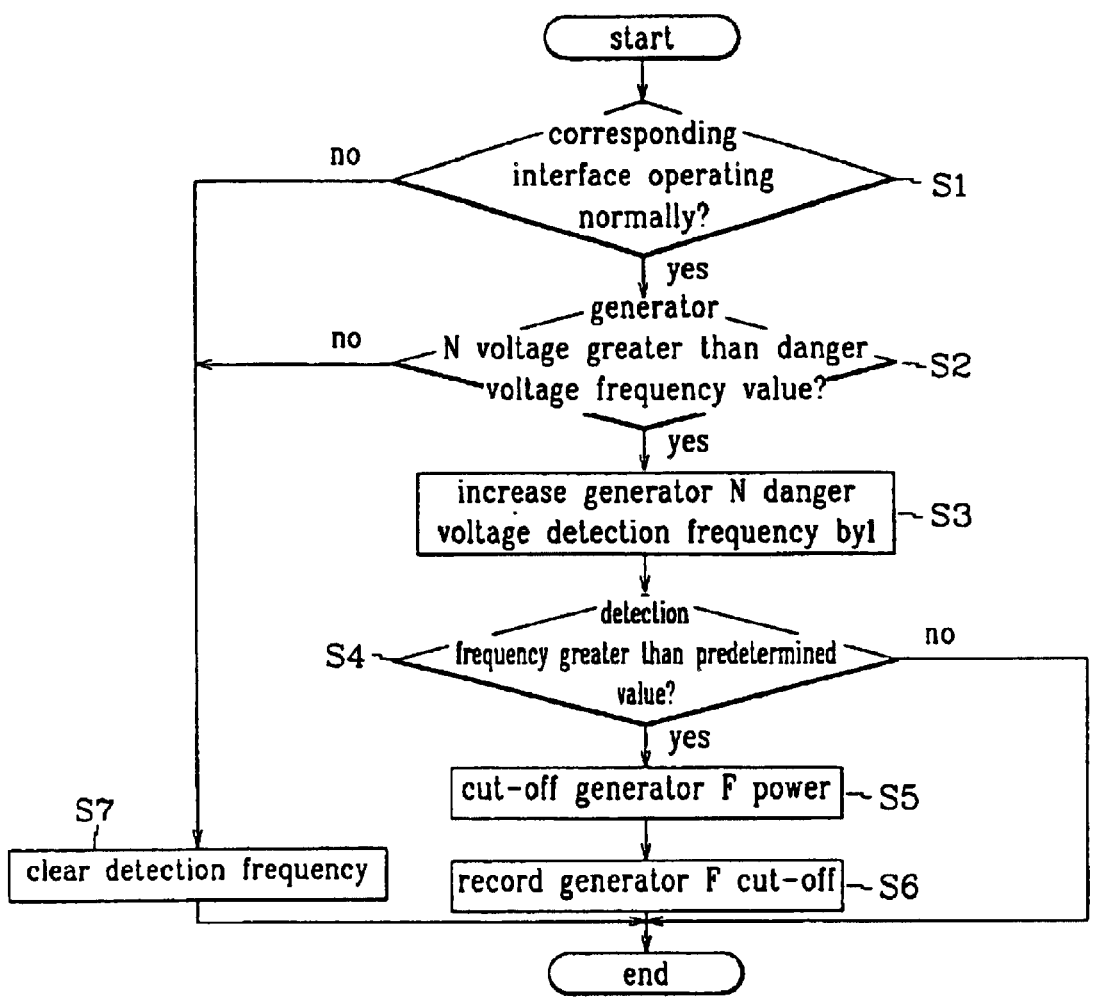
FIG. 24 is a flow chart of a detection and control process for a generator N danger voltage according to a preferred embodiment of the present invention.

FIG. 24 shows a flow chart of a detection and control process for a generator N danger voltage according to a preferred embodiment of the present invention.

It is determined if a corresponding interface is operating normally in step S1. If it is, it is determined if a generator N voltage is greater than a danger voltage regulation value in step S2. If the generator N voltage is greater than the danger voltage regulation value, a generator N danger voltage detection frequency is increased by 1 in step S3.

Next, it is determined if the detection frequency is greater than the generator N danger voltage determination value in step S4. If it is, a generator F power is cut-off in step S5 then the generator F cut-off is recorded in step S6. If any one of the determination results of step S1 and S2 is negative, the detection frequency is cleared in step S7. Also, if the determination result of step S4 is negative, or after step S6 or S7, the process is ended.

Figure 25:
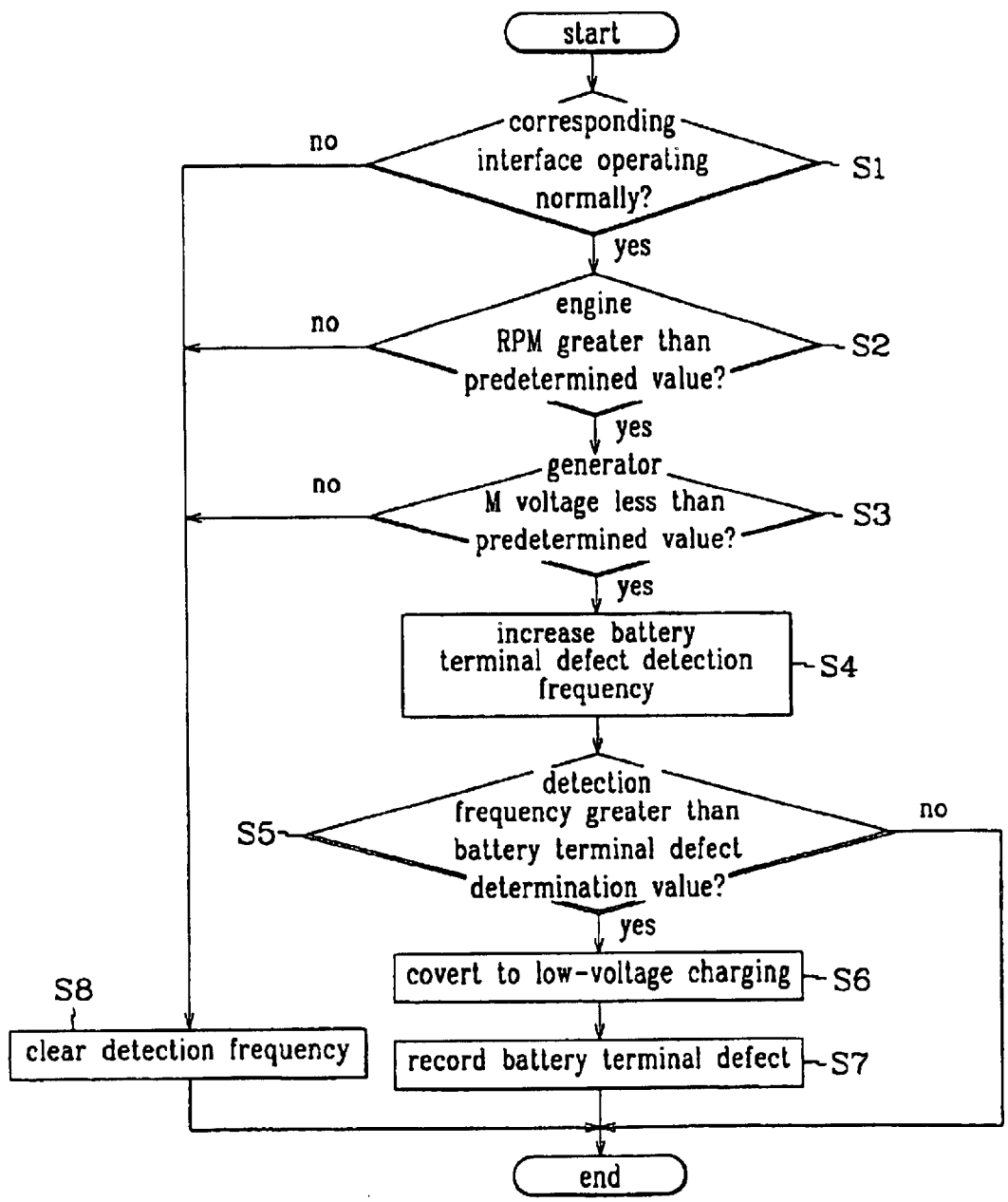
FIG. 25 is a flow chart of a detection and control process for a battery terminal defect according to a preferred embodiment of the present invention.

FIG. 25 shows a flow chart of a detection and control process for a battery terminal defect according to a preferred embodiment of the present invention.

It is determined if a corresponding interface is operating normally in step S1. If it is, itis determined if engine RPM is greater than a predetermined value in step S2. If the engine RPM is greater than the predetermined value, it is determined if a generator M voltage is less than a predetermined value in step S3. If the generator M voltage is less than the predetermined value, a battery terminal defect detection frequency is increased by 1 in step S4.

Next, it is determined if the detection frequency is greater than a battery terminal defect determination value provided in the microcomputer 709 in step S6. If it is, conversion to low-voltage charging is performed in step S6, then a battery terminal defect is recorded in step S7. In steps S1–S3, if any one of the determination results is negative, the detection frequency is cleared in step S8. Also, if the determination result of step S5 is negative, or after step S8 or 57, the process is ended.

Figure 26:
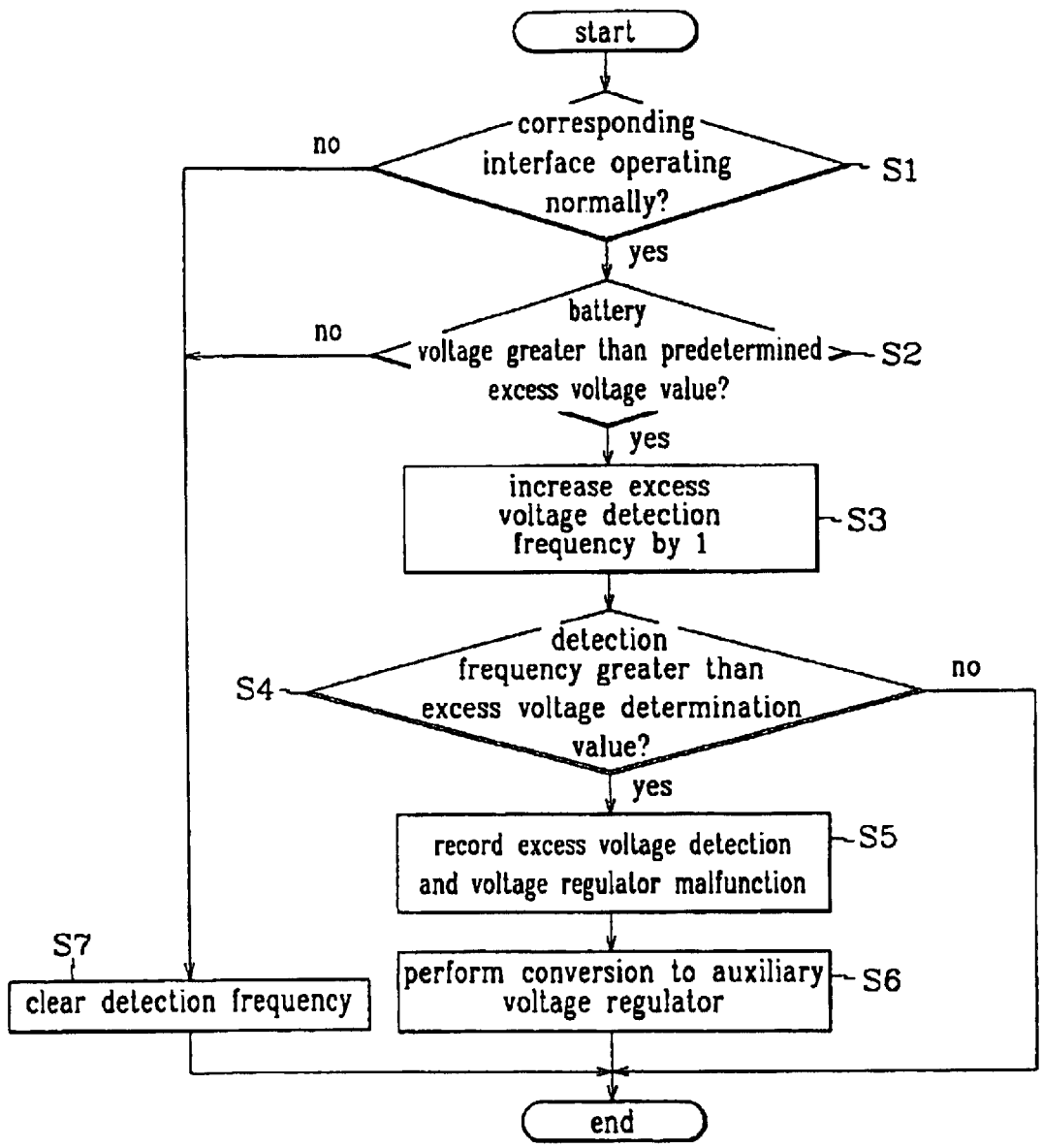
FIG. 26 is a flow chart of a detection and control process for an excess voltage according to a preferred embodiment of the present invention.

FIG. 26 shows a flow chart of a detection and control process for an excess voltage according to a preferred embodiment of the present invention.

First, it is determined if a corresponding interface is operating normally in step S1. If it is, it is determined if a battery voltage is greater than a predetermined excess voltage value in step S2. If the battery voltage is greater than the excess voltage value, an excess voltage detection frequency is increased by 1 in step S3.

Subsequently, it is determined if the detection frequency is greater than an excess voltage determination value in step S4. If it is, both an excess voltage detection and a voltage regulator malfunction are recorded in step S5. Next, conversion to an auxiliary voltage regulator is performed in step S6. If any one of the determination results of steps S1 and 52 is negative, the detection frequency is cleared in step S7. Also, if the determination result of step 54 is negative, or after step S6 or S7, the process is ended.

Figure 27:
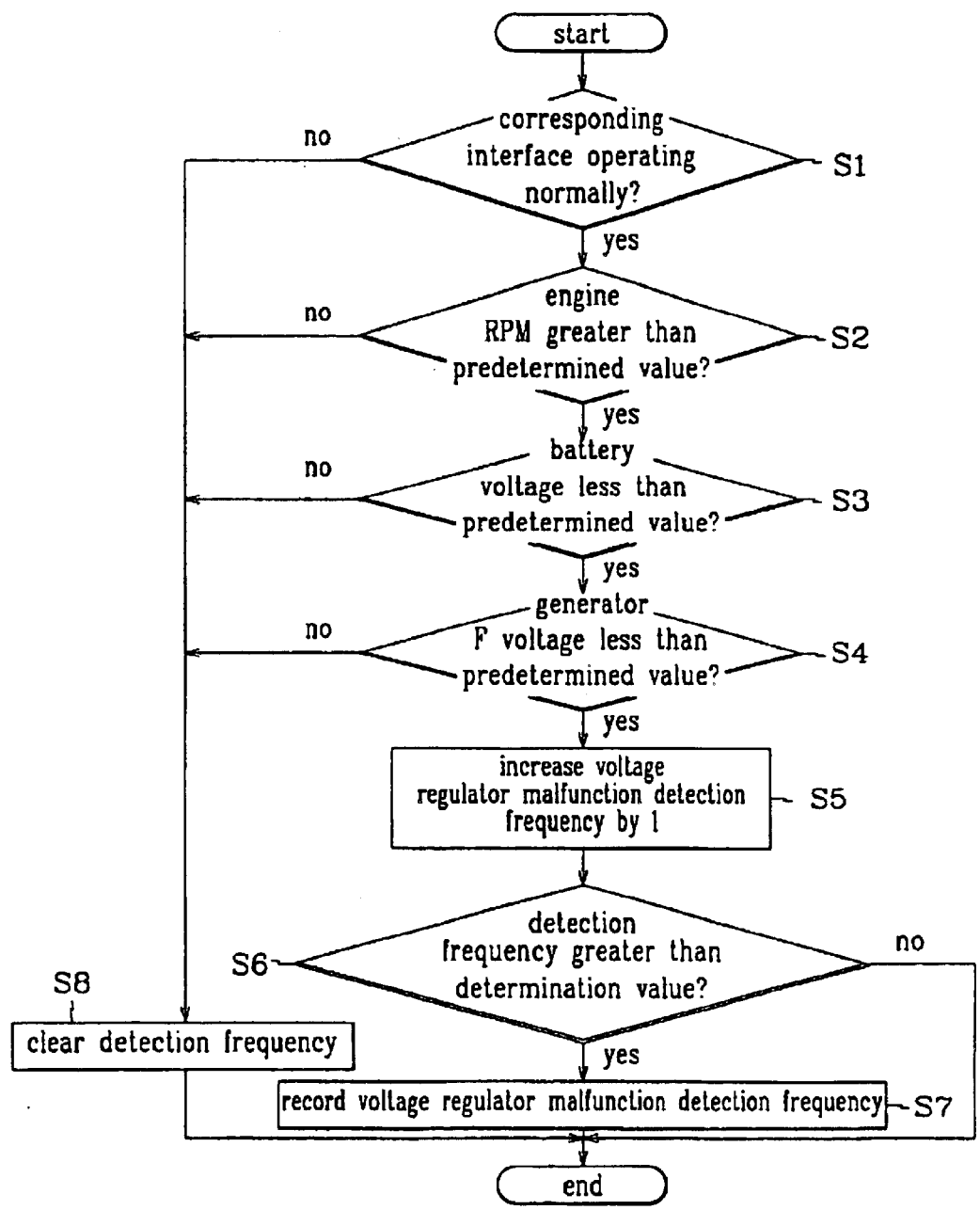
FIG. 27 is a flow chart of a detection process for a voltage regulator malfunction according to a preferred embodiment of the present invention.

FIG. 27 shows a flow chart of a detection process for a voltage regulator malfunction according to a preferred embodiment of the present invention.

First, it is determined if a corresponding interface is operating normally in step S1. If it is, it is determined if engine RPM is greater than a predetermined value, which is established for the detection of a voltage regulator malfunction, in step S2. If the engine RPM is greater than the predetermined value, it is determined if a battery voltage is less than a predetermined value in step S3. If the battery voltage is less than the predetermined value, it is determined if a generator F voltage is less than a predetermined value, which is established for the detection of a voltage regulator malfunction, in step S4.

If the generator F voltage is less than the predetermined value, a voltage regulator malfunction detection frequency is increased by 1 in step S5. Next, it is determined if the detection frequency is greater than a determination value for determining if there is a malfunction in the voltage regulator in step S6. If the detection frequency is greater than the determination value, a voltage regulator malfunction is recorded in step S7. In steps S1–S4, if any one of the determination results is negative, the detection frequency is cleared in step S8. Also, if the determination result of step S6 is negative, or after step S7 or S8, the process is ended.

Figure 28:
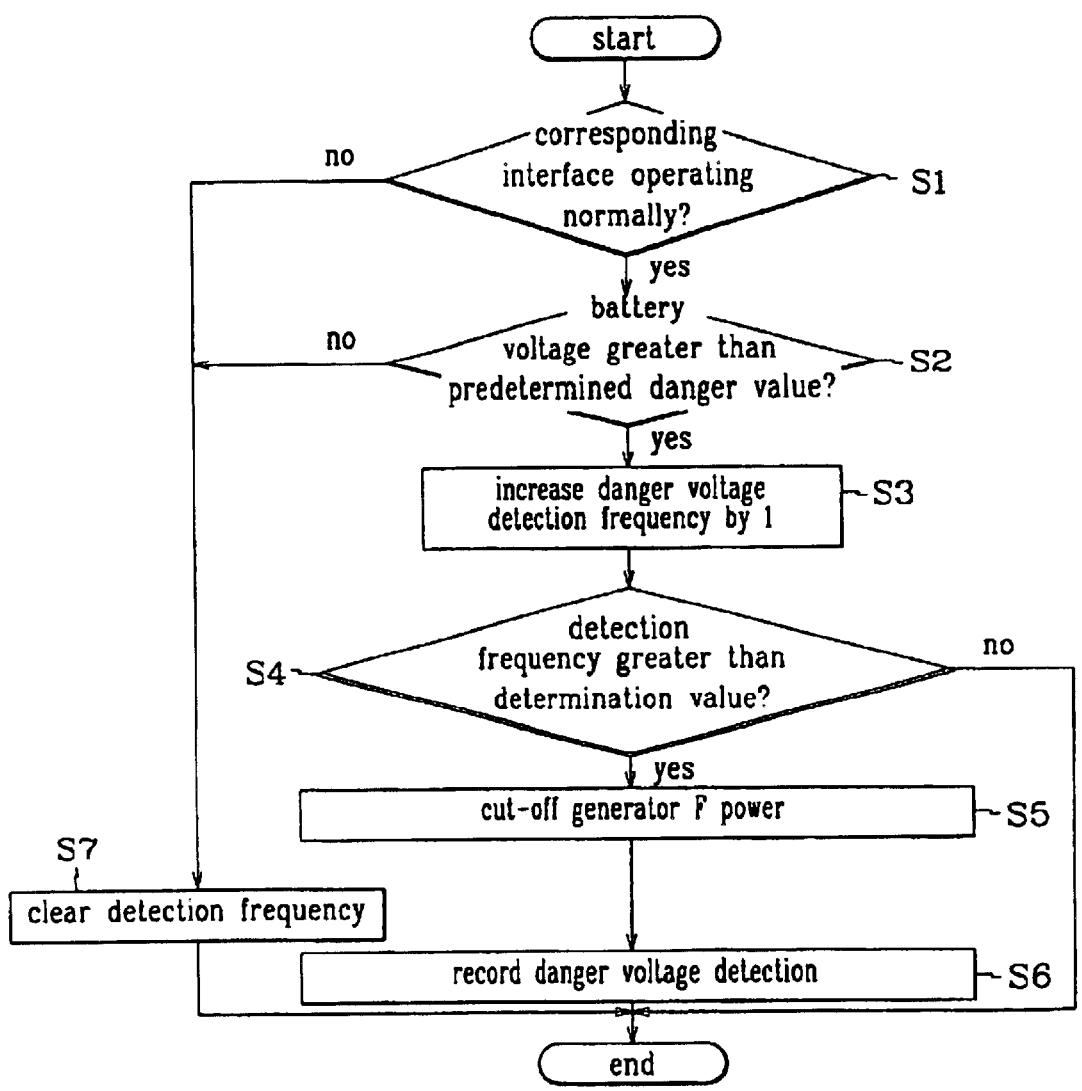
FIG. 28 is a flow chart of a detection and control process for a danger voltage according to a preferred embodiment of the present invention.

FIG. 28 shows a flow chart of a detection and control process for a danger voltage according to a preferred embodiment of the present invention.

It is first determined if a corresponding interface is operating normally in step S1. If it is, it is determined if a battery voltage is greater than a predetermined danger voltage value in step S2. If the battery voltage is greater than the danger voltage, a danger voltage detection frequency is increased by 1 in step S3.

Next, it is determined if the detection frequency is greater than a danger voltage determination value in step S4. If it is, a generator F power is cut-off in step S5, then a danger voltage detection is recorded in step S6. If any one of the determination results of steps S1 and S2 is negative, the detection frequency is cleared in step S7. Also, if the determination result of step S4 is negative, or after step S6 or S7, the process is ended.

In the methods described with reference to FIGS. 19 through 28, malfunctions are automatically processed similarly to the methods of malfunction detection used by an automotive technician.

A motor applied to the present invention will now be described.

The detection of most malfunctions in the motor can be performed using the current voltage detection method of the auxiliary controllers 700A–700H. For example, if a utilization current value of a corresponding motor division is greater than a reference value, this may be indicative of motor sticking (bearing sticking, damaged coil). If the utilization current value of the corresponding motor division changes to be greater than the reference value, this may be indicative of brush wear.

Further, by referencing a rotational value and a current value of a corresponding motor, more precise malfunction detection is possible. For example, a problem in a rotation connection device is known to be occurring if the rotational value is greater than a reference rotational value and the current value is low. Since there is motor sticking if the current value is greater than the reference current value and there is no rotation, the motor is known to have stopped (there is the risk of fire if the DC motor is sticking and current is continuously supplied thereto).

Therefore, by enabling the reading of the utilization current and rotation of the motor, motor malfunctions and symptoms indicating potential malfunctions can be detected using software such that intelligent control according to state is possible. Accordingly, information on states of pulse sensor divisions corresponding to motor divisions is read, and position control and speed control malfunction detection using a method is realized. An example of such motor position control is described hereinafter. In the example, a position value is a present position value of the motor, a stop position value is a predetermined value at which the motor stops, and a malfunction is a value at which stopping is permitted if within a malfunction permission range when not at the stop position.

*when requiring forward rotation position code>subtracting malfunction from stop code= forward rotation

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
|   |   |   |   |   | Position |  | Malfunction– | Stop | Malfunction+ |  |  |  |  |  |  |

Figure 29:
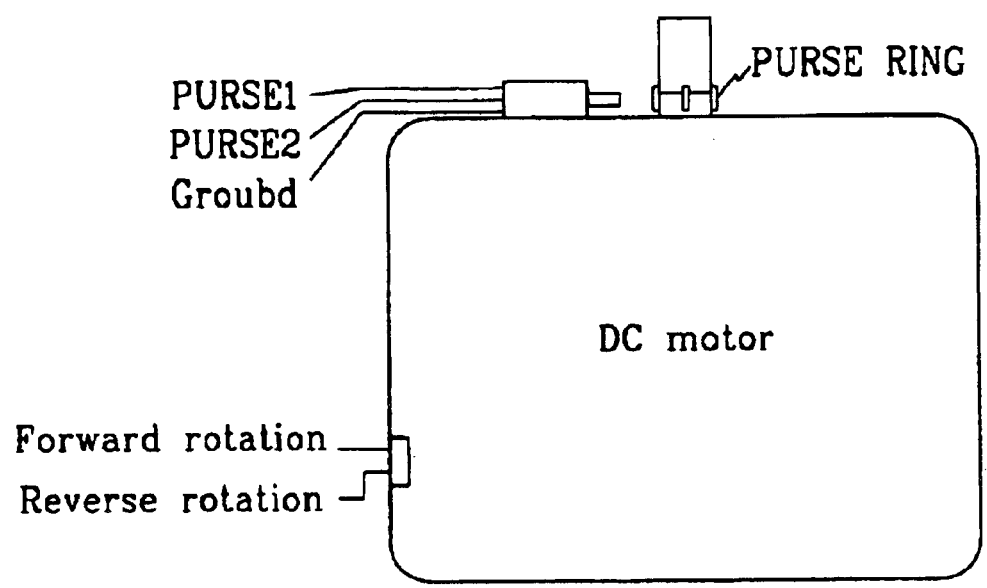
FIG. 29 is a schematic view of a motor connected to a relay/TR output unit of the auxiliary controllers of FIG. 3.

FIG. 29 shows a schematic view of a motor connected to the relay/TR output unit 714 of the auxiliary controllers 700A–700H.

The motor is a DC motor enabling the generation of a substantial torque. Mounted on a rotating shaft of the motor is a pulse-ring for detecting motor RPM, and a main pulse sensor PULSE1 and an auxiliary pulse sensor PULSE2 are provided to enable reading of a motor rotational state by the pulse sensor input unit 703. Non-contact pulse sensors are used for the main and auxiliary pulse sensors PULSE1 and PULSE2 in order to increase the durability of these elements. Also, two pulse sensors are provided so that detection can be performed even if one pulse sensor malfunctions.

Even if the malfunction is subtracted from the stop code, when the present position of the motor is small, forward rotation must take place.

*when requiring reverse rotation position code<adding malfunction to stop code=reverse rotation

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
|   |   |   |   |   |   |   | Malfunction– | Stop | Malfunction+ |  | Position |  |  |  |  |

Even if the malfunction is added to the stop code, when the present position of the motor is large, reverse rotation must take place.

*when requiring stopping when not requiring forward or reverse rotation

Automatic detection of a start position of the position control motor will now be described.

When the motor undergoes reverse rotation, data of a corresponding pulse sensor are checked. If the motor can no longer rotate so that there is no input pulse or the motor is rotating below a permissible limit, the motor is stopped and that position is set as the start position (devices connected to the motor shaft are unable to continue operation when reaching a maximum position and minimum position).

When the motor undergoes forward rotation, input pulses are counted and data of a corresponding pulse sensor are checked. If the motor can no longer rotate so that there is no input pulse or the motor is rotating below a permissible limit, the motor is stopped and that position is set as the end position.

Further, with regard to initialization of the motor, after motor stop position data are cleared, motor end position data are also cleared if needed. Also, an input data address of a reserved sensor is recorded, and after determining if a reserved output port is malfunctioning (power, output interface, relay or 7R), it is determined if a reserved sensor is malfunctioning (sensor, sensor interface).

Next, a start position automatic recordal routine is performed if a motor start position is needed, and an end position automatic recordal routine is performed if a motor end position is needed. When operated using a direct switch, the end position is recorded in advance (used when controlling a predetermined angle as with stopping of the engine). Subsequently, when controlling the motor in an applications program, recordal in control data of a corresponding motor is performed.

Calling of a motor control procedure will now be described.

A procedure is connected to a switch to be operated when the switch is operated, and is registered in an interrupt such that operation begins simultaneously with booting. When the procedure connected to the switch is called, a number motor control procedure connected to a motor switch is called if the switch is controlled to on, and if controlled to off, the number motor control procedure connected to the motor switch is stopped.

Further, a motor control procedure registered in a timer interrupt initiates the operation of a initialization procedure during booting, and a motor control procedure is sequentially called when the interrupt is a corresponding motor control interrupt, thereby operating the motor such that the stop position value equals the present position value.

The motor control method is realized through the following process.

Every time the timer interrupt is stuck, inspection control is performed, and the motor control procedure is called at the same rate as the pulse input speed. The change from forward rotation to reverse rotation is not immediate, and instead is performed by first stopping for a predetermined interval then rotating the motor in the reverse direction. The reverse rotation and forward rotation states of the motor are recorded in a counter to minimize rotational position error caused by inertia.

Also, from the stopped state, a delay of a predetermined time is generated during a stop delay counter, and a time the stopped state is not generated during a predetermined time is recorded in a rotational effective counter to check for motor malfunctions.

The position control motor is determined to be malfunctioning if it has not reached the stop position after a predetermined interval following its rotation in one direction. In this case, the motor is stopped to protect the motor.

If motor RPM can be read in real-time, DC motor position control; speed control, malfunction detection, etc. can be performed without the use of additional devices.

Figure 30:
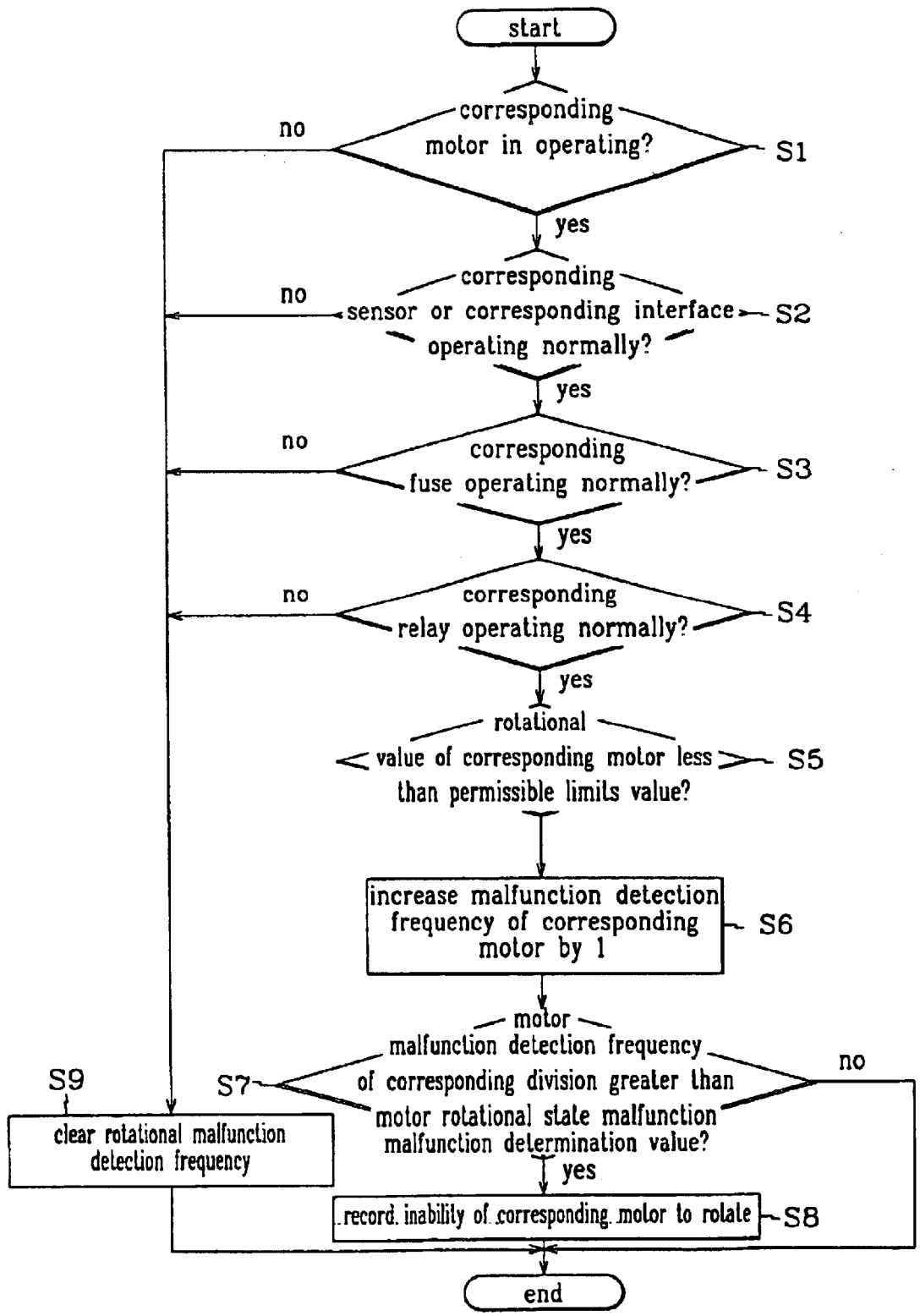
FIG. 30 is a flow chart of a process for detecting a malfunction in a motor rotation state according to a preferred embodiment of the present invention.

FIG. 30 shows a flow chart of a process for detecting a malfunction in a motor rotation state according to a preferred embodiment of the present invention.

First, it is determined if a corresponding motor is in operation in step S1. If the motor is operating, it is determined if a corresponding sensor or a corresponding interface is operating normally by reading state information of a corresponding division in step S2. Next, if the corresponding sensor or corresponding interface is operating normally, it is determined if a corresponding fuse is operating normally in step S3. If it is, it is then determined if a corresponding relay is operating normally in step S4.

If the corresponding relay is operating normally, it is determined if a rotational value of the corresponding motor is less than a permissible limit value in step S5. If the rotational value is less than the permissible limit value, a malfunction detection frequency of the corresponding motor is increased by 1 in step S6. Next, it is determined if the motor malfunction detection frequency of a corresponding division is greater than a motor rotational state malfunction determination value in step S7. If it is, recordal of the inability of the corresponding motor to rotate is recorded in the corresponding division in step S8.

In any one of steps S–S5, if the determination result is negative, the rotational malfunction detection frequency of the corresponding motor is cleared in step S9. Also, if the determination result of step S7 is negative, or after step S8 or S9, the process is ended.

Figure 31:
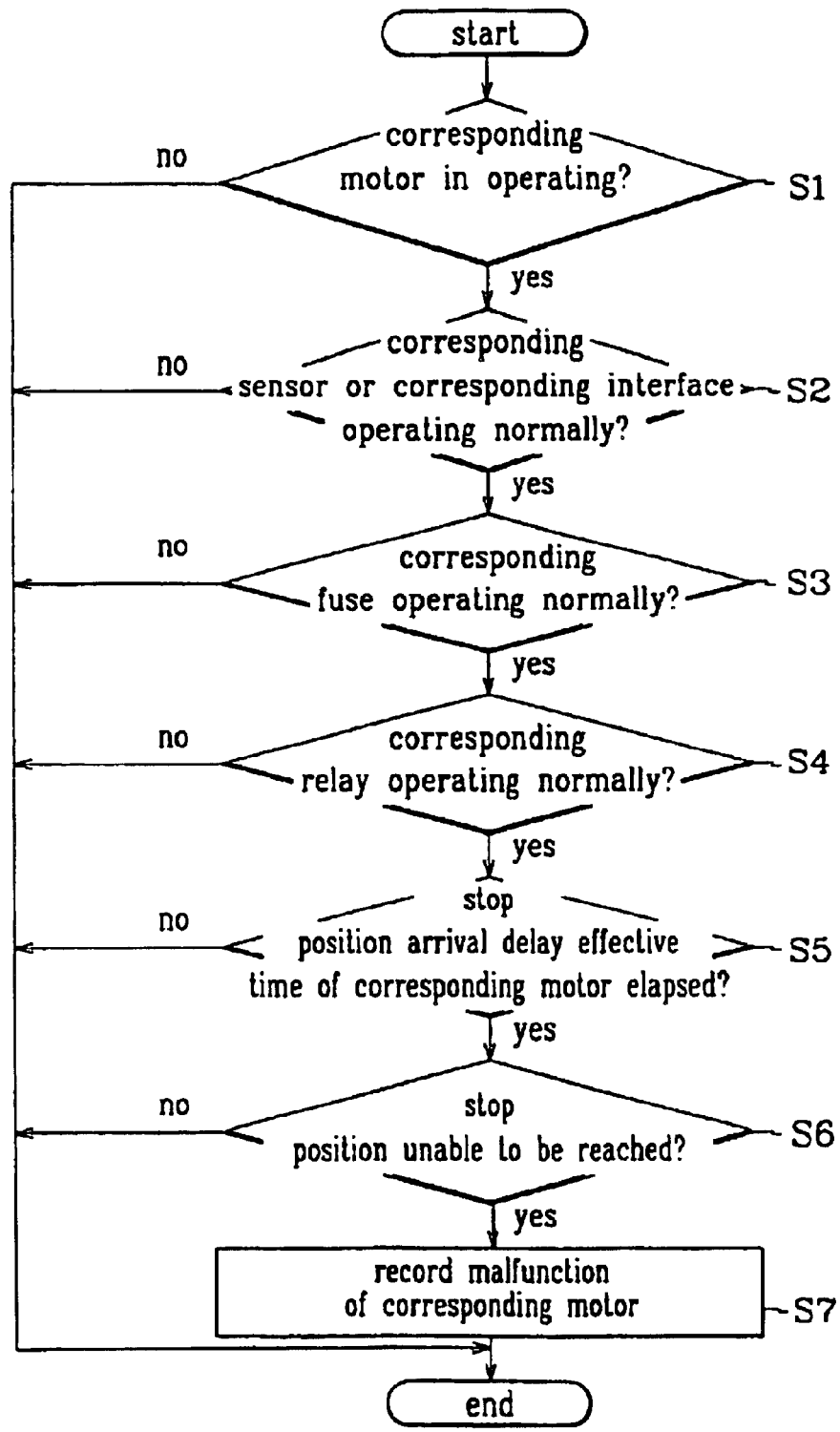
FIG. 31 is a flow chart of process for detecting a malfunction in a position control motor according to a preferred embodiment of the present invention.

FIG. 31 shows a flow chart of a process for detecting a malfunction in a position control motor according to a preferred embodiment of the present invention. Here, the position control motor is determined to be malfunctioning if it has not reached the stop position after a predetermined interval following its rotation in one direction.

First, it is determined if a corresponding motor is in operation in step S1. If the motor is operating, it is determined if a corresponding sensor or a corresponding interface is operating normally. Next, if the corresponding sensor or corresponding interface is operating normally, it is determined if a corresponding fuse is operating normally in step S3. If it is, it is then determined if a corresponding relay is operating normally in step S4. If the corresponding relay is operating normally, it is determined if a stop position arrival delay effective time of the corresponding motor has elapsed in step S5.

If the time has elapsed, it is determined if the stop position was unable to be reached in step S6. If the stop position was unable to be reached, malfunction of the corresponding motor is recorded in step S7. In any one of steps S1–S6, if the determination result is negative, the process is ended. The process is ended also after step S7.

[Switch Control]

Switching control in the present invention will now be described.

Methods for controlling electrical devices in vehicles include methods performed by electronic control devices and methods directly controlled by the driver. However, much wiring is required with both methods. This is particularly true for the direct control method where control switches are used, which is additionally problematic as a result of the complicated switch contact points.

Describing a lighting switch as an example of the switch direct control method, the lighting switch includes an off, first stage, and high beam and low beam changeover switch.

Control conditions for the headlight switch include only the first stage being on, both the first stage and second stage being on in a second stage position, the high beam and low beam being on only in the second stage position, and being operated in all states of the first and second stages including the off of a passing high beam.

In order to realize such a method, most lighting switches use internal contact points and a mechanical integrated method (realization through an electronic control device must be converted again in the vehicle such that it is not efficient). Further, switches with this complicated mechanical structure are used for control in many control areas of the vehicle.

In the present invention, if a switch is controlled, only a digital control code indicating the pressing of a corresponding switch is transmitted to all the controllers and the realization of all actions of switches of the vehicle is a method of a corresponding region. The correspondence to mechanical switch contact points is realized in a variable (memory space) of a corresponding switch such that a simple switch structure is possible.

With reference to FIG. 2, if control values generated in the switch controller 600 are transmitted to the auxiliary controller of a corresponding region and to the central controller 100 through communications cables, each corresponding controller analyzes a control code to process the same in a corresponding region using a method. Accordingly, wires of the control switches and complicated contact points are not required.

Further, control by the control codes enables any applications program to be easily connected, starting with sound control.

FIG. 32 shows a schematic view of the panel switch 300.

The panel switch 300 includes S2 switches, S1 switches and P switches. Functions of the S1 switches and P switches are varied into corresponding functions according to the state of the S2 switches. Corresponding states are displayed on a switch monitor and by LEDs, and control codes corresponding to activated switches are generated.

In an S2 mode, the S1 switches are not affected by other switches and can be individually controlled to on and off. Also, the corresponding states of the S1 switches are displayed on the switch monitor and through the LEDs, and control codes of the activated switch are generated. In an S1 mode, the P switches are program switches that are able to be controlled as a single switch after several switches are registered in the S2 mode. Here also, the corresponding states of the S2 switches are displayed on the switch monitor and through LEDs, and control codes of the activated switch are generated.

There is an LED in each switch so that the activation of the switches can be displayed. This also enables switch operational states to be checked when the switch monitor is used for an instrument simulation, etc.

FIG. 33 shows a schematic view of the remote switch 400.

The remote switch 400 can be used as an auxiliary switch of the panel switch 300. The remote switch 400 separately has specific S2 switches, and the S2 switches and P switches can be disconnected and placed at required locations for remote control.

That is, each remote switch can have a separate S2 initialization value, and an S2 initialization value can be temporarily varied. Also, the P switches can be increased and decreased, and on/off controlled.

Included are P increase switches structured so that only controlled to on are panel P switches, which are increased by as many "on" times the P increase switches of the remote switch are controlled to on (depressed P switches are controlled to on and other P switches remain off); P reduction switches structured so that only controlled to on are the panel P switches, which are reduced by as many "on" times the P reduction switches of the remote switch are controlled to on; S2 temporary increase switches structured so that only controlled to on are panel S2 switches, which are increased by as many "on" times of the S2 temporary increase switches of the remote switch; and check/cancel switches for providing permission or canceling when a control check request is made in the automatic control applications program.

S2 position variations of the remote switch are temporarily effective only during a delay time, and if there is no switch input such that the delay time elapses, automatic initialization to a specific S2 position, established in the corresponding remote switch, is performed.

The remote switch 400 makes it so that a remote S2 increase start S2 position is always started from an S2-1 first switch when the specific S2 value included in each remote switch is varied, and the S2 position can be inferred even if the S2 position is not checked on the screen.

Figure 34:
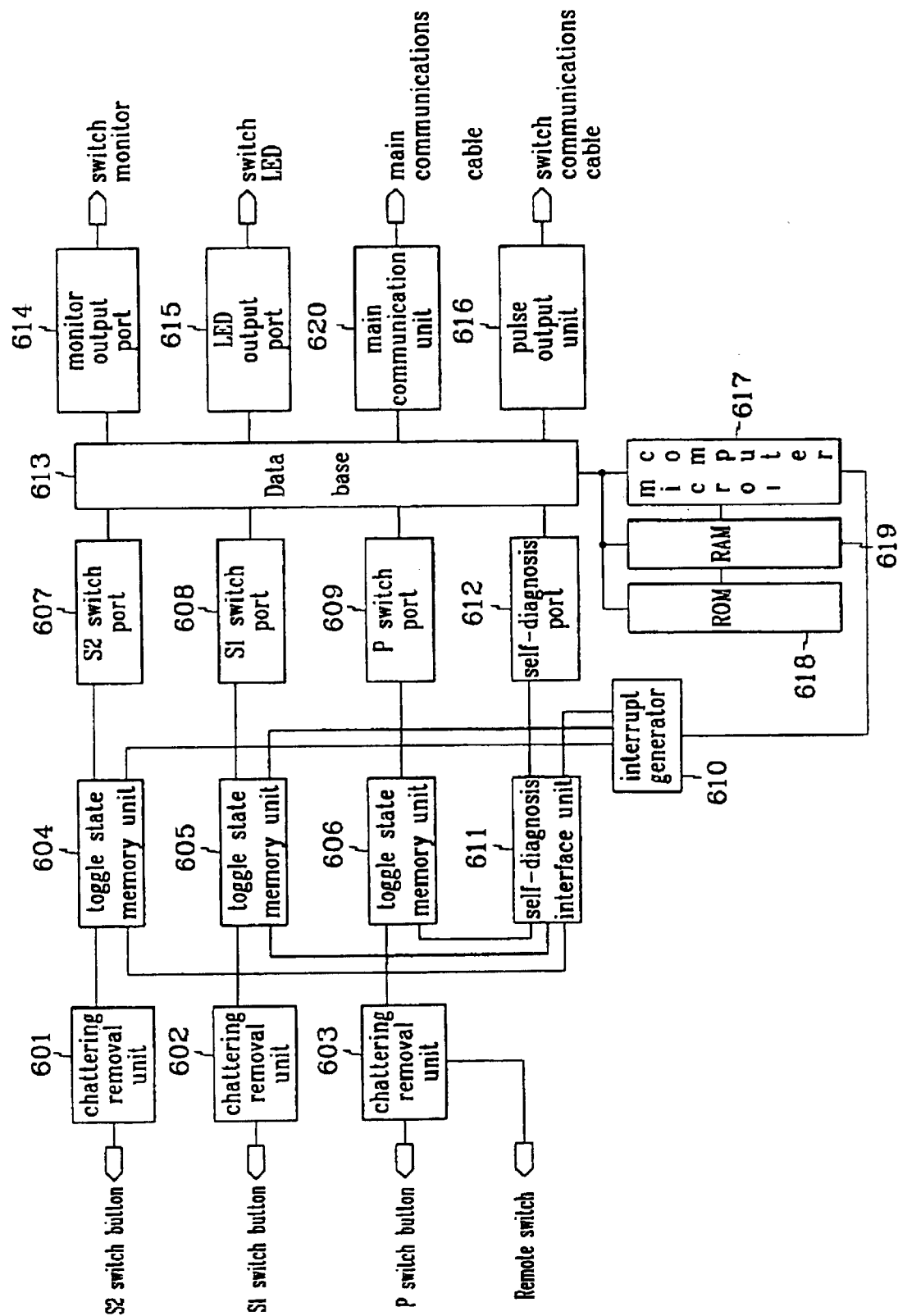
FIG. 34 is a detailed block diagram of a switch controller of FIG. 3.

FIG. 34 shows a detailed block diagram of the switch controller 600.

The switch controller 600 includes chattering removal units 601, 602 and 603 for removing chattering which is generated at switch contact points during switch input of the panel switch 300 and the remote switch 400; toggle state memory units 604, 605 and 606 for separating odd operational frequencies and even operational frequencies from output of the chattering removal units 601–603; S2, S1 and P switch ports 607, 608 and 609 connected to the toggle state memory units 604–606 and which enable reading of a presently pressed switch button by a microcomputer 617; an interrupt generator 610 for enabling the microcomputer 617 to read a port generated by switches when the switches are depressed; a self-diagnosis interface unit 611 and a self-diagnosis port 612 for performing a self-diagnosis of switch devices; and a data bus 613 connected to each of the ports 607, 608, 609 and 612 for sending control output values according to the various input.

Also included are a monitor output port 614 for controlling the monitor 500 through the data bus 613; an LED output port 615 for controlling the switch LEDs through the data bus 613; a pulse output unit 616 for transmitting pulse values corresponding to each switch input to the switch input unit 705 of the auxiliary controllers 700a–700H, the pulse output unit 616 having a pulse output port 616a and a pulse interface 616b; the microcomputer 617 for outputting corresponding control values and pulse values according to each switch input to the monitor output port 614, the LED output port 615 and the pulse output unit 616; a ROM 618 for storing a system operation program; and a RAM 619, which is a memory for data processing.

The chattering removal units 601–603 remove the chattering generated at the switch contact points during switch input of the remote switch 400 and the S2, S1 and P switches. Output of the chattering removal units 601–603 is input to the toggle state memory units 604–606, and the toggle state memory units 604–606 separate odd operational frequencies and even operational frequencies of the switches and records the same in the S2, Sp and P switch ports 607–609 such that on and off states of switches can be displayed. The switch ports 607–609 enable reading of a currently pressed switch button by the microcomputer 617.

The interrupt generator 610 enables the microcomputer 617 to read a port generated by the switches when the switches are depressed. The self-diagnosis interface unit 611 and self-diagnosis port 612 perform a self-diagnosis of switch devices, and transmit the results to the microcomputer 617 through the data bus 613. The monitor output port 614 controls the monitor 500 according to control data of the microcomputer 617 and enables display according to switch states. The LED output port 615 illuminates LEDs of switches controlled to on. The pulse output unit 616 generates control codes corresponding to depressed switches according to control by the microcomputer 617.

Codes generated in the switch controller of the present invention are simultaneously transmitted to the auxiliary controllers 700 and the central controller, which reference predetermined switch data in the integrated code data to reserve calling of a method corresponding to the received code in the integrated code data. The reserved value checks states in the method and calls the method.

When an S21-S1 (S2-1 switch is on and S1 switch is depressed) control code is generated, the switch control method references an S21-S1 switch division property value, and in a chart below as an example of a method for controlling an output port of the corresponding controller, controls an output port corresponding to a predetermined value in a corresponding switch division property.

Further, the pulse output port 616a generates a pulse corresponding to the presently depressed switch according to control by the microcomputer 617, the pulse interface unit 616b performs an interface function to ensure stability of pulses, which are output through the pulse output port 616a, up to the switch input unit 705 of the auxiliary controllers 700A–700H.

In the switch unit of the present invention, if there are eight S2 switches, eight 51 switches, and eight P switches, it is possible to have 24 buttons on the panel switch 300. However, in the switch routine of the switch controller 600, there comes to be as many switch routine established tables as needed and a total of 128 switches is effectively realized.

For example, if an output port control table established in a first switch is set up as 1, 3, 5, if the first switch is on the 1, 3, 5 ports are set, and the relay or TR are on such that the device connected to the corresponding port is operated.

If the first switch is off, the 1, 3, 5 ports are cleared and the device connected to the corresponding port is off. If the output control table is processed, a routine connected to the first switch is inspected and connected routines are stopped in order.

Figure 35:
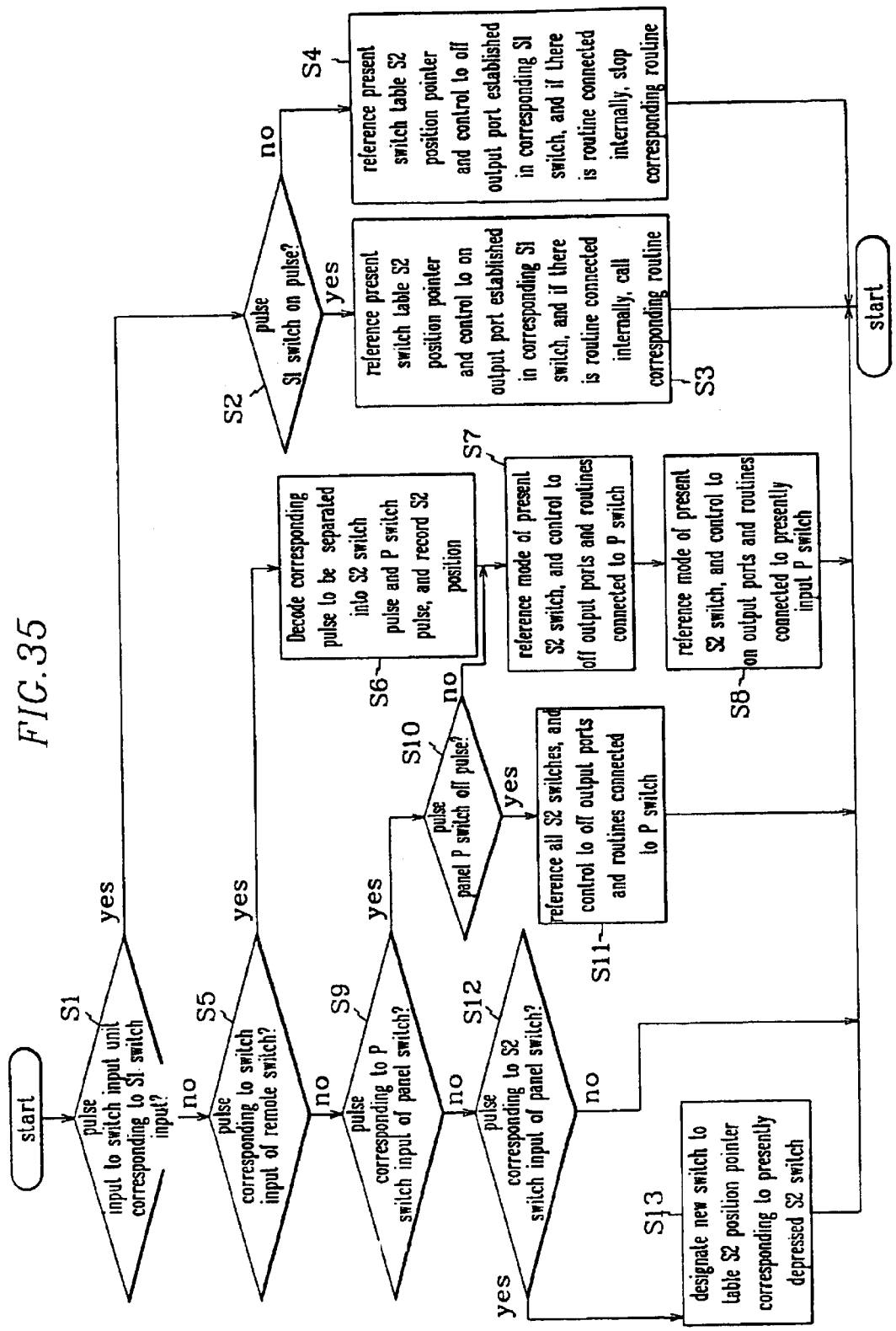
FIG. 35 is a flow chart of a switch input processing operation of the auxiliary controllers of FIG. 3.

FIG. 35 shows a flow chart of a switch input processing operation of the auxiliary controllers 700A–700H.

It is first determined if the pulse input to the switch input unit 705 corresponds to S1 switch input in step S1. If it does, it is determined if the pulse is an S1 switch on pulse in step S2. If the pulse is an S1 switch on pulse, a present switch table S2 position pointer is referenced and an output port established in a corresponding S1 switch is controlled to on, and if there is a routine connected internally a corresponding routine is called in step S3. However, if the pulse is an S1 switch off pulse in step S2, the present switch table S2 position pointer is referenced and an output port established in a corresponding S1 switch is controlled to off, and if there is a routine connected internally a corresponding routine is stopped in step S4, after which the process is ended.

In step S1, if the pulse input to the switch input unit 705 does not correspond to S1 switch input, it is determined if the pulse corresponds to switch input of the remote switch 400 in step S5. If the pulse corresponds to switch input of the remote switch 400 (since the remote switch 400 has an S2 characteristic value, transmission is performed through a single pulse code including the S2 position value and P switch position value), a corresponding pulse is decoded to be separated into an S2 switch pulse and a P switch pulse, and an S2 position is recorded in step S6.

Following step S6, a mode of a present S2 switch is referenced and output ports and routines connected to the P switch, which is in an on state, are controlled to off in step S7. Next, the mode of the present S2 switch is referenced and output ports and routines connected to the presently input P switch are controlled to on in step S8, after which the process is ended.

In step S5, if the pulse does not correspond to switch input of the remote switch 400, it is determined if the pulse corresponds to P switch input of the panel switch 300 in step S9. If the pulse corresponds to P switch input of the panel switch 300, it is determined if the pulse is a panel P switch off pulse in step S10.

If the pulse is not a panel P switch off pulse and instead is a panel P switch on pulse, steps S7 then S8 are performed. However, if the pulse is a panel P switch off pulse (since all P switches of the present S2 position are off), all S2 switches are referenced and output ports and routines connected to P switch, which is in an on state, are controlled to off in step S11, after which the process is ended.

In step S9, if the pulse does not correspond to the P switch input of the panel switch 300, it is determined if the pulse corresponds to S2 switch input of the panel switch 300 in step S12. If the pulse corresponds to S2 switch input, a new switch table S2 position pointer corresponding to the presently depressed S2 switch is designated in step S13. However, if in step S12 the pulse does not correspond to S2 switch input of the panel switch 300, the process is ended.

Figure 36A:
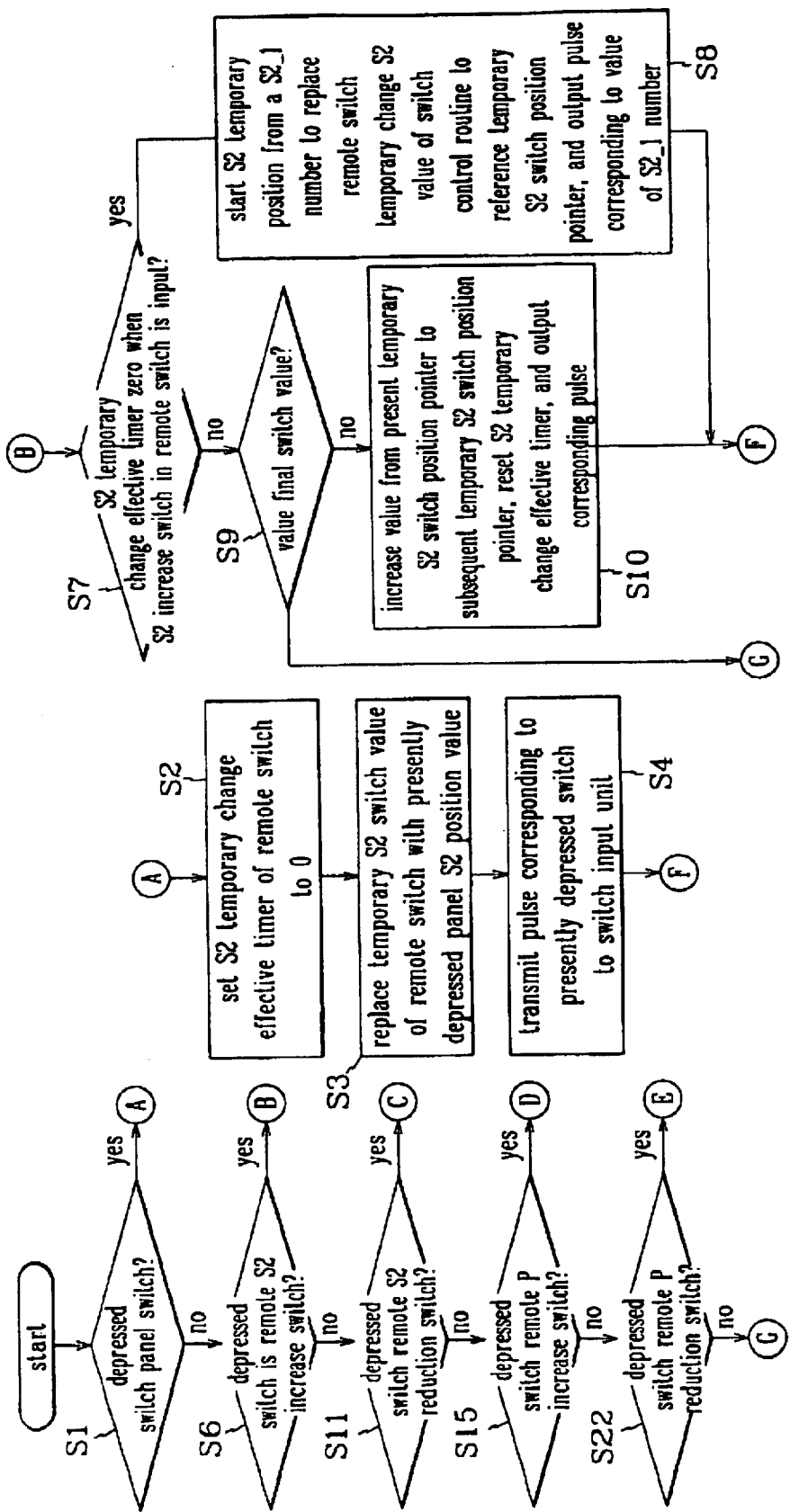
Figure 36B:
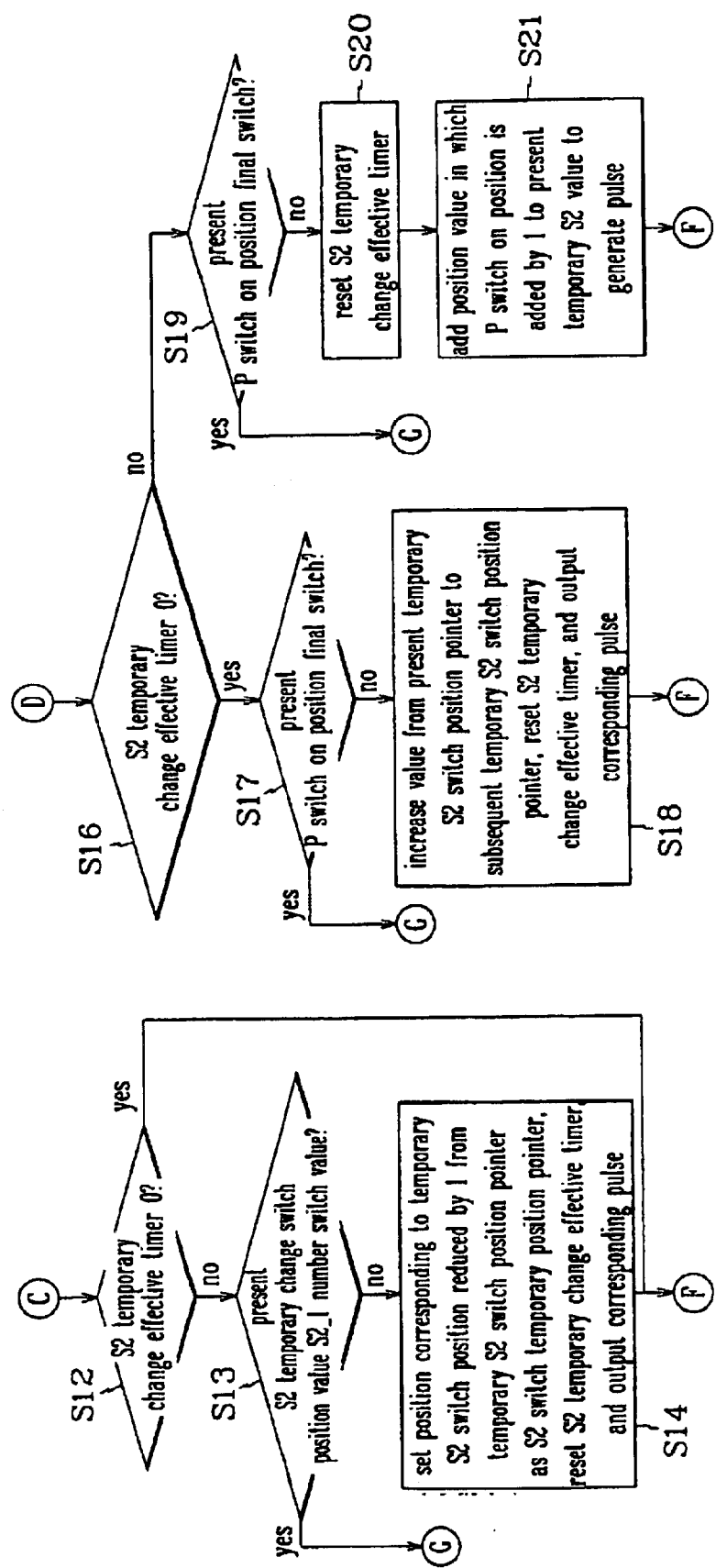

FIGS. 36a–36c show flow charts of a switch input process of the switch controller 600.

First, it is determined if a depressed switch is a panel switch, that is, an S2 switch, an S1 switch, or a P switch in step S1. If the depressed switch is an S2 switch, an S2 temporary change effective timer of the remote switch 400 is set to 0 in step S2. Next, a temprary S2 switch value of the remote switch 400 is replaced with a presently depressed panel S2 position value in step S3, after which a pulse corresponding to the presently depressed switch is transmitted to the switch input unit 705. Following this step, a switch LED and a screen of a switch monitor are refreshed in step S5, after which the process is ended.

In step S1, if the depressed switch is not a panel switch, it is determined if the depressed switch is a remote S2 increase switch in step S6. If the depressed switch is a remote S2 increase switch, it is determined if the S2 temporary change effective timer is zero when an S2 increase switch in the remote switch 400 is input in step S7. If it is, since change from a remote switch S2 characteristic position is taking place for the first time, an S2 temporary position is started from an S2__1 number to replace a remote switch temporary change S2 value of the switch controller 600 with the S2__1 number, the S2 temporary change effective timer is reset to enable a switch control routine to reference a temporary S2 switch position pointer, and a pulse corresponding to a value of the S2__1 number is output in step S8.

However, in step S7, if the S2 temporary change effective timer is not zero, since a present S2 temporary change switch position value is effective, it is determined if the value is a final switch value in step S9. If it is the final switch value, the process is ended (since movement to a subsequent position is not possible). If it is not the final switch value, the value is increased from a present temporary S2 switch position pointer to a subsequent temporary S2 switch position pointer, the S2 temporary change effective timer is reset, and a corresponding pulse is output in step S10. Following step S8 or S10, step S5 is performed then the process is ended.

In step S6, if the depressed switch is not a remote S2 increase switch, it is determined if the depressed switch is a remote S2 reduction switch in step S1. If it is, it is determined if the S2 temporary change effective timer is 0 in step S12. If it is, step S5 is performed then the process is ended. However, if the S2 temporary change effective timer is not 0, it is determined if a present S2 temporary change switch position value is an S2_1 number switch value in step S13. If it is, the process is ended since no further reduction is possible. However, if is not, a position corresponding to a temporary S2 switch position reduced by 1 from the temporary S2 switch position pointer is set as the S2 switch temporary position pointer, the S2 temporary change effective timer is reset, and a corresponding pulse is output in step S14. Step S5 is then performed and the process is ended.

In step S11, if the depressed switch is not a remote S2 reduction switch, it is determined if the depressed switch is a remote P increase switch in step S15. If it is, it is determined if the S2 temporary change effective timer is 0 in step S16. If the S2 temporary change effective timer is 0, it is then determined if a present P switch on position is a final switch in step S17. If the present P switch on position is a final switch, the process is ended. However, if the present P switch on position is not a final switch, the S2 switch position pointer is renewed to a characteristic S2 switch position pointer position established in the corresponding remote switch 400, a value increased by one from the present P switch on position is added to the S2 value, and a pulse is generated in step S18.

In step S16, if the S2 temporary change effective timer is not 0, it is determined if the present P switch on position is a final switch in step S19. If the present P switch on position is a final switch, the process is ended since no further increase is possible. However, if the present P switch on position is not a final switch, the S2 temporary change effective timer is reset in step S20. Next, a position value in which a P switch on position is increased by 1 is added to the present temporary S2 value to generate a pulse in step S21, after which step S5 is performed then the process is ended.

In step S15, if the depressed switch is not a remote P increase switch, it is determined if the depressed switch is a remote P reduction switch in step S22. If it is not, the process is ended. However, if the depressed switch is a remote P reduction switch, it is determined if the S2 temporary change effective timer is 0 in step S23. If it is, it is then determined if the present P switch on position is a first switch in step S24. If it is the first switch, since no further reduction is possible, the process is ended. However, if the present P switch on position is not the first switch, the S2 switch position pointer is renewed to a characteristic S2 switch position pointer position established in the corresponding remote switch 400, a value decreased by one from a present P switch on position is added to the S2 value, and a pulse is generated in step S25. Following this step, step S5 is performed then the process is ended.

In step S23, if the S2 temporary change effective timer is not 0, it is determined if the present P switch on position is a first switch in step S26. If it is the first switch, the process is ended. However, if the present P switch on position is not the first switch, the S2 temporary change effective timer is reset in step S27. Next, a position value in which a P switch on position is subtracted by 1 is added to the present temporary S2 value to generate a pulse in step S28, after which step S5 is performed then the process is ended.

In the above, the screen state of the switch monitor 500 is varied according to the temporary S2 position state of the remote switch 400 and the S2 position state of the panel switch 300. Selection of the temporary S2 position and S2 position is determined by the S2 temporary change effective timer. At the instant the value of the S2 temporary change effective timer becomes 0, an internal interrupt is generated and the screen is transposed from a temporary S2 position value to a corresponding remote switch characteristic S2 position value, and also the screen of the switch monitor 500 changes to a screen corresponding to the S2 position value.

Next, an explanation is given to help in the understanding of the remote switch 400. Here, it is assumed that a remote switch 1 characteristic S2 position is established at an external lighting device, a wide light, taillight and license plate light are connected to an external lighting device P1 switch, and the wide light, taillight and license plate light are connected to a P2 switch. If a P increase switch of the remote switch 1 is depressed once, the wide light, taillight and license plate light at the P1 switch are controlled to on, and if the P increase switch of the remote switch 1 is again depressed, the same lights are controlled to off and the wide light, taillight, and license plate light connected to the P2 switch are controlled to on.

In the above remote switch state, if the S2 increase switch is depressed twice, change is made to an internal lighting device registered in S2_2 and the switch state of the presently operating internal lighting device is displayed on the monitor and LED. If there is no input of the remote switch 1 for a predetermined interval, conversion back to the remote switch 1 characteristic S2 position is performed, and the monitor 500 and LED are refreshed.

To help in understanding the auxiliary controllers 700A–700H and the switch processing of the switch controller 600, a table is structured in which there are established four panel switches, an S2 switch position pointer in the table stores a panel S2 switch position or a remote switch characteristic S2 position, a remote temporary S2 switch position pointer stores an S2 position temporarily changed in the remote switch, and an S2 effective delay timer stores an effective time of a lastly depressed remote switch in a state where the S2 position is in a state temporarily changed in the remote switch.

| Mode Switch | Individual switch | Program Table | Switch controller table |
|---|---|---|---|
| S2-1 | S1-1 | S2-1 S1-1 connection routine | S2 switch position pointer |
|  | S1-2 | S2-1 S1-2 connection routine |  |
|  | S1-3 | S2-1 S1-3 connection routine |  |
|  | S1-4 | S2-1 S1-4 connection routine |  |
|  | P-1 | S2-1 P-1 connection routine |  |
|  | P-2 | S2-1 P-2 connection routine |  |
|  | P-3 | S2-1 P-3 connection routine | Remote S2 switch position pointer |
|  | P-4 | S2-1 P-4 connection routine | S2 effective delay timer |
| S2-1 |  | S2-2 S1-1 connection routine |  |
| S2-2 |  | S2-2 S1-2 |  |

| Mode Switch | Individual switch | Program Table | Switch controller table |
|---|---|---|---|
| | S2-3 | S2-2 S1-3 connection routine | |
| | S2-4 | S2-2 S1-4 connection routine | |
| | P-1 | S2-2 P-1 connection routine | |
| | P-2 | S2-2 P-2 connection routine | |
| | P-3 | S2-2 P-3 connection routine | |
| | P-4 | S2-2 P-4 connection routine | |

Further, in the booting program, the switch establish table uses data of the ROM 710 of the auxiliary controllers 700A–700H by copying the data in the RAM 711, and it is able to re-establish a connection routine. The present invention does not operate through switches, and is restored when the switch establish table is stored and re-established for use in order to occupy output ports in the applications programs at the time when output ports in applications programs of the central controller 100 and auxiliary controllers 700A–700H are controlled, and when and the applications program is ended.

Next, software processing of controllers will be described.

Figure 37:
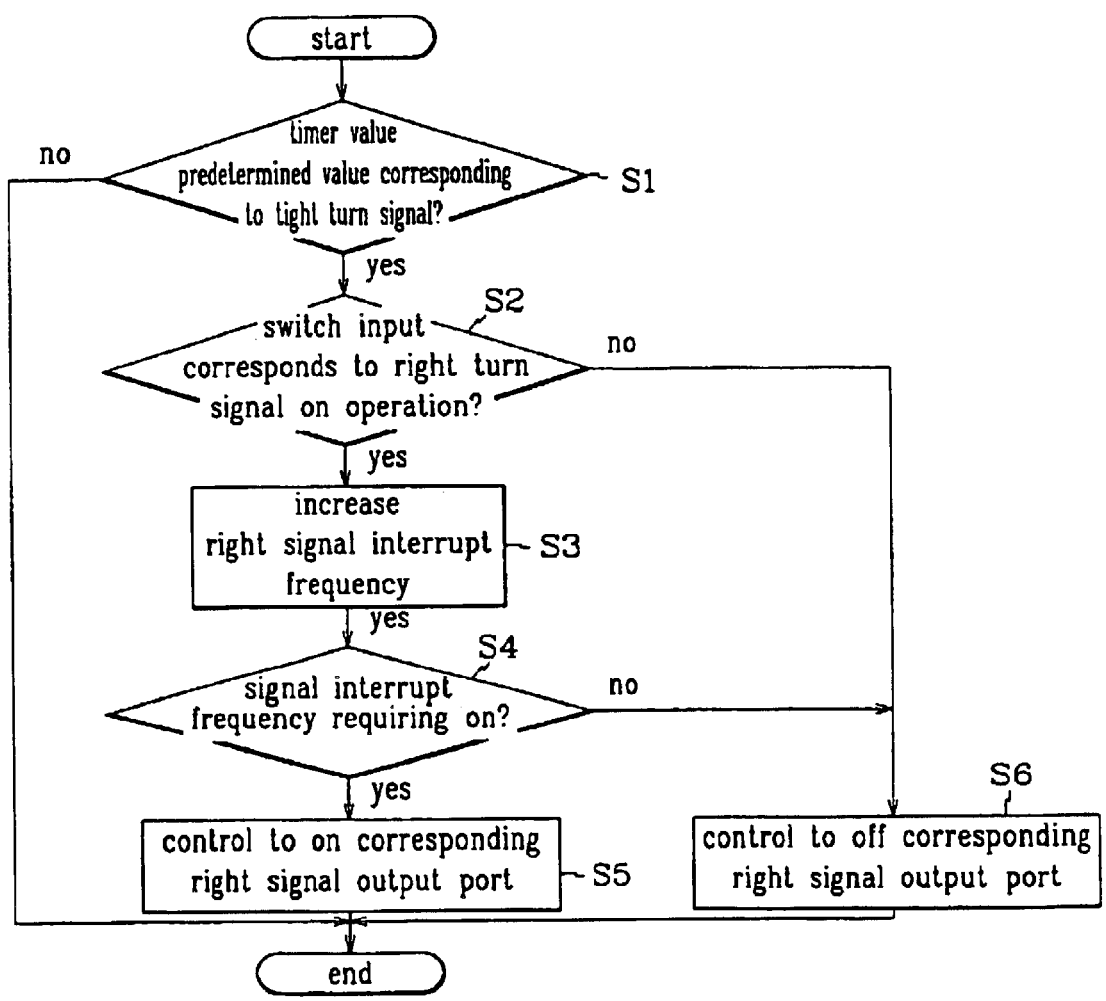
FIG. 37 is a flow chart of a turn signal controller routine realized through software.

FIG. 37 shows a flow chart of a turn signal controller routine realized through software. State information of the division to be used is first read, and output element divisions in a short malfunction state take measures against the inability to supply power, etc., then a method as in the following is called.

That is, it is first determined if a timer value is a predetermined value corresponding to a right turn signal in step S1. If it is, it is determined if switch input corresponds to a right turn signal "on" operation in step S2. If the switch input corresponds to a right turn signal on operation, a right signal interrupt frequency is increased in step S3, after which it is determined if the signal interrupt frequency is a frequency requiring "on" in step S4. If it is, a corresponding right signal output port is controlled to on in step S5.

In step S2 or step S4, if the determination result is negative, the corresponding right signal output port is controlled to off in step S6. Also, after step S6 or S5, the process is ended.

Figure 38:
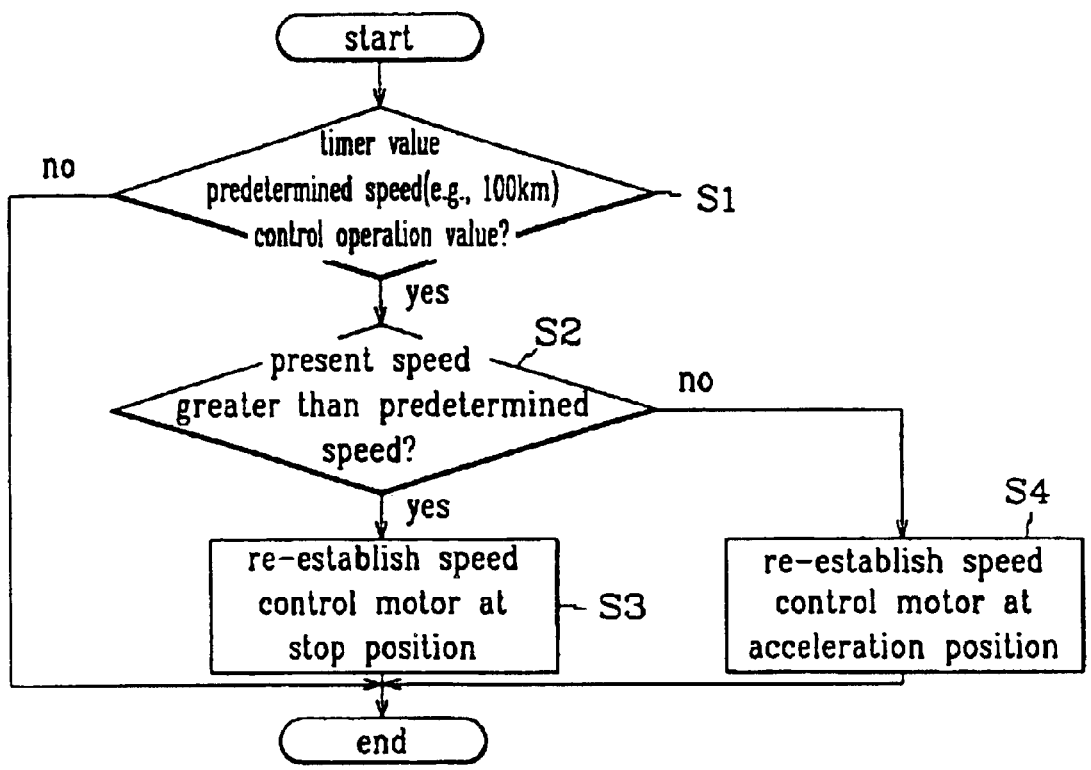
FIG. 38 is a flow chart of a speed control controller routine realized through software.

FIG. 38 shows a flow chart of a speed control controller routine realized through software.

First, it is determined if a timer value is a predetermined speed (e.g., 100 km) control operation value in step S1. If the timer value is the predetermined speed control operation value, it is determined if a present speed is greater than the predetermined speed in step S2. If the present speed is greater than the predetermined speed, a speed control motor is re-established at a stop position in step S3. However, if the present speed is not greater than the predetermined speed, the speed control motor is re-established at an acceleration position in step S4. The process is ended after step S3 or S4, or if the result of the determination of step S1 is negative.

Figure 39:
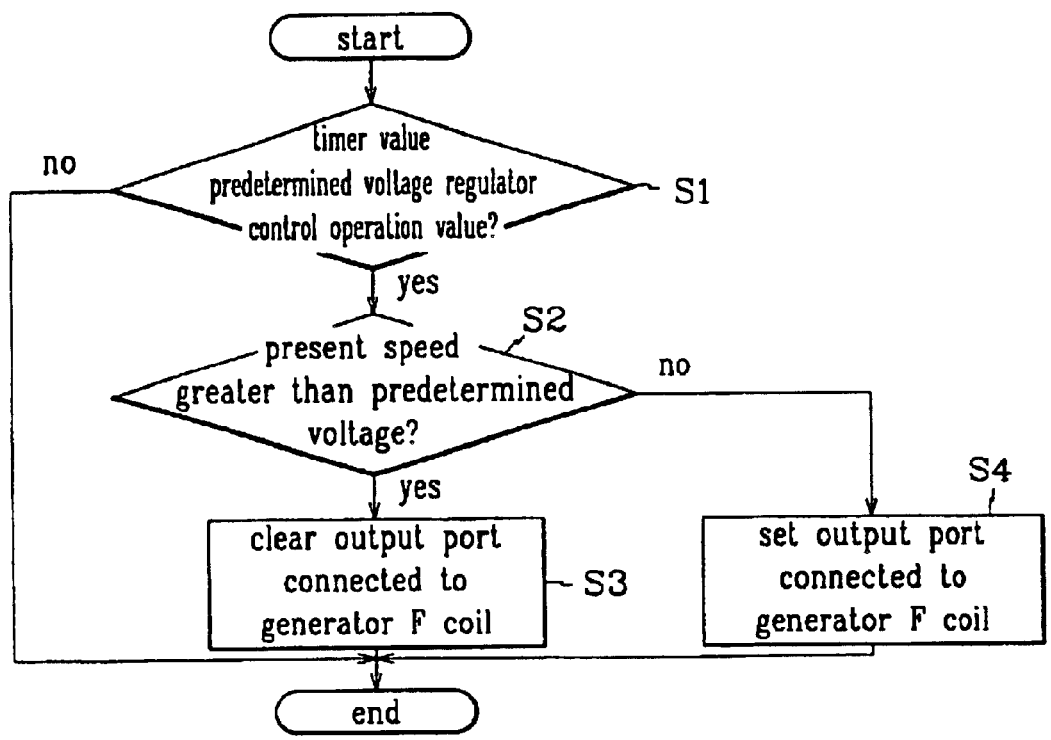
FIG. 39 is a flow chart of a voltage regulator routine realized through software.

FIG. 39 shows a flow chart of a voltage regulator routine realized through software.

In step S1, it is determined if a timer value is a predetermined voltage regulator control operation value in step S1. If the timer value is the predetermined voltage regulator control operation value, it is determined if a present voltage is greater than a predetermined voltage (e.g., 27.8V) in step S2. If the present voltage is greater than the predetermined voltage, an output port connected to a generator F coil is cleared in step S3. However, if the present voltage is not greater than the predetermined voltage, the output port connected to the generator F coil is set in step S4. The process is ended after step S3 or S4, or if the determination result of step S1 is negative.

As described above, required divisions are renewed and revised through the integrated code data, division variables are altered, and methods can be called and combined. Accordingly, the programmer can consider only division control methods (divisions and parts maintain identical characteristics), and those not well versed in the usage of hardware can perform the control of overall control devices through software.

The following tables show processing methods of each device in the present invention. The "monitor" refers to the switch monitor 500 of FIG. 2.

| Part | Classification | Device Classification | Distinguishing Means | Process method |
|---|---|---|---|---|
| Digital clock | Misc. devices | Clock circuit | Transmission means | Simulation in monitor by central controller |
| Auto grease injection indication light | Instrument device | Instrument circuit | Transmission means | Simulation in monitor by central controller |
| Pre-heater indication light | Instrument device | Instrument circuit | Transmission means | Simulation in monitor by central controller |
| Voltage gauge | Instrument device | Instrument circuit | Indicator (gauge) | Simulation in monitor by central controller |
| Differential lock indication light | Instrument device | Instrument circuit | Transmission means | Simulation in monitor by central controller |
| PTO operation indication light | Instrument device | Instrument circuit | Transmission means | Simulation in monitor by central controller |
| Direction indication light (right) | Instrument device | Instrument circuit | Transmission means | Simulation in monitor by central controller |
| Direction indication light (left) | Instrument device | Instrument circuit | Transmission means | Simulation in monitor by central controller |
| High-beam indication light | Instrument device | Instrument circuit | Transmission means | Simulation in monitor by central controller |
| Parking brake indication light | Instrument device | Instrument circuit | Transmission means | Simulation in monitor by central controller |
| Reverse indication light | Instrument device | Instrument circuit | Transmission means | Simulation in monitor by central controller |
| Brake fault indication light | Instrument device | Instrument circuit | Transmission means | Simulation in monitor by central controller |
| Exhaust brake indication | Instrument device | Instrument circuit | Transmission means | Simulation in monitor by central |

| Part | Classification | Device Classification | Distinguishing Means | Process method |
|---|---|---|---|---|
| light | | | | controller |
| Driving record gauge | Instrument device | Drive record gauge | Indicator (gauge) | Simulation in monitor by central controller |
| Coolant temperature gauge | Instrument device | Instrument circuit | Indicator (gauge) | Simulation in monitor by central controller |
| Oil pressure gauge | Instrument device | Instrument circuit | Indicator (gauge) | Simulation in monitor by central controller |
| Speed indication light (left) | Instrument device | Instrument circuit | Transmission means | Simulation in monitor by central controller |
| Fuel gauge | Instrument device | Instrument circuit | Indicator (gauge) | Simulation in monitor by central controller |
| Speed indication light (central) | Instrument device | Drive record gauge | Transmission means | Simulation in monitor by central controller |
| Speed indication light (right) | Instrument device | Drive record gauge | Transmission means | Simulation in monitor by central controller |
| Drive Record Gauge | Instrument device | Instrument circuit | Indicator | Simulation in monitor by central controller |
| Cap lock open indication light | Instrument device | Instrument circuit | Transmission means | Simulation in monitor by central controller |
| Instrument panel light | Instrument device | Instrument circuit | Lamp | Simulation in monitor by central controller |
| Air tank warning light | Instrument device | Instrument circuit | Transmission means | Simulation in monitor by central controller |
| Seat belt indication light | Instrument device | Instrument circuit | Transmission means | Simulation in monitor by central controller |
| Operation indication light | Instrument device | Instrument circuit | Transmission means | Simulation in monitor by central controller |
| Door open warning light | Instrument device | Instrument circuit | Transmission means | Simulation in monitor by central controller |
| Charge warning light | Instrument device | Instrument circuit | Transmission means | Simulation in monitor by central controller |
| Air filter warning light | Instrument device | Instrument circuit | Transmission means | Simulation in monitor by central controller |
| Oil pressure warning light | Instrument device | Instrument circuit | Transmission means | Simulation in monitor by central controller |
| T/M high indication light | Instrument device | Instrument circuit | Transmission means | Simulation in monitor by central controller |
| Door switch (right) | Safety device | Door switch circuit | Switch | Processing in switch controller |
| Air conditioner switch | Air conditioner device | Air conditioner circuit | Switch | Processing in switch controller |
| Door lock device switch | Electrical device | Door lock circuit | Switch | Processing in switch controller |
| Power window switch (right) | Electrical device | Power window | Switch | Processing in switch controller |
| Auto mirror heater switch | Misc. device | Auto mirror circuit | Switch | Processing in switch controller |
| Wiper intermittent control switch | Electrical device | Wiper circuit | Switch | Processing in switch controller |
| Interior light switch 4 | Light device | Interior light circuit | Switch | Processing in switch controller |
| Fan motor switch | Fan device | Fan circuit | Switch | Processing in switch controller |
| Interior light switch 2 | Light device | Interior light circuit | Switch | Processing in switch controller |
| Parking switch | Light device | Parking light circuit | Switch | Processing in switch controller |
| Horn switch | Electrical device | Horn circuit | Switch | Processing in switch controller |
| Exhaust brake switch | Electrical device | Exhaust brake circuit | Switch | Processing in switch controller |
| Cap lock switch | Misc. devices | Cap tilt | Switch | Processing in switch controller |
| Emergency light switch | Light device | Emergency light circuit | Switch | Processing in switch controller |
| Operation light switch | Misc. devices | Operation light circuit | Switch | Processing in switch controller |
| Interior light switch 1 | Light device | Interior light circuit | Switch | Processing in switch controller |
| Differential lock switch | Misc. devices | Differential lock circuit | Switch | Processing in switch controller |
| Light switch | Light device | Light circuit | Switch | Processing in switch controller |
| Interior light switch 3 | Light device | Interior light circuit | Switch | Processing in switch controller |
| Cargo switch | Lighting device | Cargo circuit | Switch | Processing in switch controller |
| Fog light switch | Light device | Fog light circuit | Switch | Processing in switch controller |
| Bed heater switch | Misc. devices | Bed heater device | Switch | Processing in switch controller |
| Direction indicator light switch | Light device | Direction light circuit | Switch | Processing in switch controller |
| Power window switch (left) | Electrical device | Power window | Switch | Processing in switch controller |
| Auto grease | Electrical device | Auto grease | Switch | Processing in switch |

-continued

| Part | Classification | Device Classification | Distinguishing Means | Process method |
|---|---|---|---|---|
| switch | | circuit | | controller |
| Dimmer switch | Light device | Light circuit | Switch | Processing in switch controller |
| Interior switch 5 | Light device | Interior circuit | Switch | Processing in switch controller |
| Interior switch 6 | Light device | Interior circuit | Switch | Processing in switch controller |
| Door switch (left) | Safety device | Door switch circuit | Switch | Processing in switch controller |
| Self-diagnosis switch | Instrument device | Instrument circuit | Switch | Processing in switch controller |
| Fan fresh switch | Fan device | Fan circuit | Switch | Processing in switch controller |
| Wiper switch | Electrical device | Wiper circuit | Switch | Processing in switch controller |
| Ignition switch | Ignition device | Ignition device | Switch | Processing in switch controller |
| Auto mirror switch | Miscellaneous devices | Auto mirror circuit | Switch | Processing in switch controller |
| Chime bell | Service device | Chime bell | Transmission means | Sound processing in central controller |
| Sound processing | Service device | Sound processing device | Controller | Sound processing in central controller |
| Vehicle navigation device | GIS device | Vehicle navigation device | Device | Applications processing in central controller |
| Communications | Communications device | Communications device | Device | Communications processing in central controller |
| Video | Image device | Video device | Device | DVD processing in central controller |
| Radio | Sound device | Cassette circuit | Transmission means | MPEG processing in central controller |
| Door lock device relay | Electrical device | Door lock circuit | Relay | Processing internally by auxiliary controller |
| Generator voltage regulator | Charge device | Charge circuit | Controller | Processing internally by auxiliary controller |
| Pre heater relay | Heater device | Pre heater | Relay | Processing internally by auxiliary controller |
| Cap tilt relay | Miscellaneous devices | Cap tilt | Relay | Processing internally by auxiliary controller |
| Direction indicator relay | Light device | Direction light circuit | Controller | Processing internally by auxiliary controller |
| Headlamp upper left relay | Light device | Light circuit | Relay | Processing internally by auxiliary controller |
| Wiper high speed relay | Electrical device | Wiper circuit | Controller | Processing internally by auxiliary controller |
| Light control driving light relay | Light device | Light circuit | Relay | Processing internally by auxiliary controller |
| Auto grease unit | Electrical device | Auto grease circuit | Controller | Processing internally by auxiliary controller |
| Wiper low speed relay | Electrical device | Wiper circuit | Controller | Processing internally by auxiliary controller |
| Compressor relay | Air conditioner device | Air conditioner circuit | Relay | Processing internally by auxiliary controller |
| Headlamp lower left relay | Light device | Light circuit | Relay | Processing internally by auxiliary controller |
| Speed indicator unit | Instrument device | Drive record instrument | Controller | Internal processing by auxiliary controller |
| Start relay | Ignition device | Ignition device | Relay | Internal processing by auxiliary controller |
| Wiper intermittent relay | Electrical device | Wiper circuit | Controller | Internal processing by auxiliary controller |
| Pre heater unit | Heater device | Pre heater | Controller | Internal processing by auxiliary controller |
| Auto mirror timer | Miscellaneous device | Auto mirror circuit | Relay | Internal processing by auxiliary controller |
| Head lamp lower right relay | Light device | Light circuit | Relay | Internal processing by auxiliary controller |
| Power window one-touch unit (right) | Electrical device | Power window | Controller | Internal processing by auxiliary controller |
| Power window one-touch unit (left) | Electrical device | Power window | Controller | Internal processing by auxiliary controller |
| Head lamp upper right relay | Light device | Light circuit | Relay | Internal processing by auxiliary controller |
| Battery relay | Power device | Power device | Relay | Internal processing by auxiliary controller |
| Exhaust brake accel switch | Electrical device | Exhaust brake circuit | Switch sensor | Input/Processing at auxiliary controller |
| Tacho sensor | Instrument device | Instrument circuit | Pulse sensor | Input/Processing at auxiliary controller |
| Temperature | Heater | Pre heater | Switch | Input/ |

-continued

| Part | Classification | Device Classification | Distinguishing Means | Process method |
|---|---|---|---|---|
| switch | device | | sensor | Processing at auxiliary controller |
| Oil pressure unit | Instrument device | Instrument circuit | Variable sensor | Input/Processing at auxiliary controller |
| Coolant temperature unit | Instrument device | Instrument circuit | Variable sensor | Input/Processing at auxiliary controller |
| Air tank low pressure switch | Instrument device | Instrument circuit | Switch sensor | Input/Processing at auxiliary controller |
| T/M high switch | Instrument device | Instrument circuit | Switch sensor | Input/Processing at auxiliary controller |
| Seat belt switch | Instrument device | Instrument circuit | Switch sensor | Input/Processing at auxiliary controller |
| Neutral switch | Safety device | Ignition device | Switch sensor | Input/Processing at auxiliary controller |
| Fuel unit | Instrument device | Instrument circuit | Variable sensor | Input/Processing at auxiliary controller |
| Hand brake switch | Instrument device | Instrument circuit | Switch sensor | Input/Processing at auxiliary controller |
| Temperature switch | Air conditioner device | Air conditioner circuit | Variable sensor | Input/Processing at auxiliary controller |
| Parking brake switch | Instrument device | Instrument circuit | Switch sensor | Input/Processing at auxiliary controller |
| Exhaust brake clutch switch | Electrical device | Exhaust brake circuit | Switch sensor | Input/Processing at auxiliary controller |
| Speed sensor | Instrument device | Speedometer circuit | Pulse sensor | Input/Processing at auxiliary controller |
| Split knob switch | Electrical device | Split device | Switch sensor | Input/Processing at auxiliary controller |
| Air filter switch | Instrument device | Instrument circuit | Switch sensor | Input/processing at auxiliary controller |
| Start sub switch | Safety device | Ignition device | Switch sensor | Input/processing at auxiliary controller |
| Reverse light switch | Light device | Reverse light circuit | Switch sensor | Input/processing at auxiliary controller |
| Tail lamp (right) | Light device | Tail lamp circuit | Lamp | Control at auxiliary controller |
| Brake light (left) | Light device | Brake light circuit | Lamp | Control at auxiliary controller |
| Brake light relay | Light device | Brake light circuit | Coil | Control at auxiliary controller |
| Reverse light | Light device | Reverse light circuit | Lamp | Control at auxiliary controller |
| Vehicle width light (left) | Light device | Vehicle width light circuit | Lamp | Control at auxiliary controller |
| License plate light 1 | Light device | License plate light circuit | Lamp | Control at auxiliary controller |
| Tail lamp left | Light device | Tail lamp circuit | Lamp | Control at auxiliary controller |
| Operation light | Miscellaneous device | Operation light circuit | Lamp | Control at auxiliary controller |
| Head lamp lower right | Light device | Light circuit | Lamp | Control at auxiliary controller |
| Differential lock magnetic valve | Miscellaneous device | Differential lock | Coil | Control at auxiliary controller |
| Fog light (right) | Light device | Fog light circuit | Lamp | Control at auxiliary controller |
| Heater heating plug 1 | Heater device | Pre heater | Resistor | Control at auxiliary controller |
| Heater heating plug 2 | Heater device | Pre heater | Resistor | Control at auxiliary controller |
| Head lamp upper right | Light device | Light circuit | Lamp | Control at auxiliary controller |
| Differential lock switch illumination light | Miscellaneous device | Differential lock circuit | Lamp | Control at auxiliary controller |
| Light control drive light | Light control | Light control | Lamp | Control at auxiliary controller |
| Actuator (right) | Electrical device | Door lock circuit | Motor | Control at auxiliary controller |
| Head lamp lower left | Light device | Light circuit | Lamp | Control at auxiliary controller |
| Bed heater | Miscellaneous device | Bed heater device | Resistor | Control at auxiliary controller |
| Fuel cut-off magnetic valve | Heater device | Pre heater | Coil | Control at auxiliary controller |
| Engine stop motor | Cut-off device | Cut-off device | Motor | Control at auxiliary controller |
| Cigarette lighter | Miscellaneous device | Cigarette lighter circuit | Resistor | Control at auxiliary controller |
| Cap tilt motor | Miscellaneous device | Cap tilt | Motor | Control at auxiliary controller |
| License plate light 2 | Light device | License plate light circuit | Lamp | Control at auxiliary controller |
| Head lamp upper left | Light device | Light circuit | Lamp | Control at auxiliary controller |
| Internal light 1 | Light device | Interior light circuit | Lamp | Control at auxiliary controller |
| Horn (right) | Electrical | Horn circuit | Coil | Control at |

| Part | Classification | Device Classification | Distinguishing Means | Process method |
|---|---|---|---|---|
| | device | | | auxiliary controller |
| Direction indicator rear left | Light device | Direction light circuit | Lamp | Control at auxiliary controller |
| Washer fluid pump motor | Electrical device | Wiper circuit | Motor | Control at auxiliary controller |
| Wiper motor | Electrical device | Wiper circuit | Motor | Control at auxiliary controller |
| Rear parking light right | Light device | Parking light circuit | Lamp | Control at auxiliary controller |
| Power window switch illumination light (left) | Electrical device | Power window | Lamp | Control at auxiliary controller |
| Power window motor (left) | Electrical device | Power window | Motor | Control at auxiliary controller |
| Ashtray illumination light | Miscellaneous device | Ashtray circuit | Lamp | Control at auxiliary controller |
| Air conditioner switch illumination light | Air conditioner device | Air conditioner circuit | Lamp | Control at auxiliary controller |
| Horn (left) | Electrical device | Horn circuit | Coil | Control at auxiliary controller |
| Bed heater switch illumination light | Miscellaneous device | Bed heater device | Lamp | Control at auxiliary controller |
| Auto mirror left motor-left, right | Miscellaneous device | Auto mirror circuit | Motor | Control at auxiliary controller |
| Auto mirror right motor-left, right | Miscellaneous device | Auto mirror circuit | Motor | Control at auxiliary controller |
| Auto mirror left motor-upper, lower | Miscellaneous device | Auto mirror circuit | Motor | Control at auxiliary controller |
| Auto mirror right motor-upper, lower | Miscellaneous device | Auto mirror circuit | Motor | Control at auxiliary controller |
| Auto mirror heater (right) | Miscellaneous device | Auto mirror circuit | Motor | Control at auxiliary controller |
| Auto mirror heater (left) | Miscellaneous device | Auto mirror circuit | Motor | Control at auxiliary controller |
| Fan switch illumination light | Fan device | Fan circuit | Lamp | Control at auxiliary controller |
| Fan motor | Fan device | Fan circuit | Motor | Control at auxiliary controller |
| Fan actuator | Fan device | Fan circuit | Motor | Control at auxiliary controller |
| Power window motor (right) | Electrical device | Power window | Motor | Control at auxiliary controller |
| Front parking light-left | Light device | Parking light circuit | Lamp | Control at auxiliary controller |
| Brake light-right | Light device | Parking light circuit | Lamp | Control at auxiliary controller |
| Fog light-left | Light device | Fog light circuit | Lamp | Control at auxiliary controller |
| Vehicle width light-right | Light device | Vehicle width light circuit | Lamp | Control at auxiliary controller |
| Direction indicator light-front left | Light device | Direction light circuit | Lamp | Control at auxiliary controller |
| Interior light 2 | Light device | Interior light circuit | Lamp | Control at auxiliary controller |
| Interior light 3 | Light device | Interior light circuit | Lamp | Control at auxiliary controller |
| Interior light 4 | Light device | Interior light circuit | Lamp | Control at auxiliary controller |
| Interior light 5 | Light device | Interior light circuit | Lamp | Control at auxiliary controller |
| Interior light 6 | Light device | Interior light circuit | Lamp | Control at auxiliary controller |
| Direction indicator light-side right | Light device | Direction light circuit | Lamp | Control at auxiliary controller |
| Glovebox illumination light | Illumination device | Cargo bay circuit | Lamp | Control at auxiliary controller |
| Direction indicator light-side left | Light device | Direction light circuit | Lamp | Control at auxiliary controller |
| Front parking light-right | Light device | Parking light circuit | Lamp | Control at auxiliary controller |
| Rear parking light-left | Light device | Parking light circuit | Lamp | Control at auxiliary controller |
| Split magnetic valve | Electrical device | Split device | Coil | Control at auxiliary controller |
| Auto glass pump motor | Electrical device | Auto glass circuit | Motor | Control at auxiliary controller |
| Direction indicator light-rear right | Light device | Direction light circuit | Lamp | Control at auxiliary controller |
| Direction indicator light-front right | Light device | Direction light circuit | Lamp | Control at auxiliary controller |
| Cornering lamp-left | Light device | Direction light circuit | Lamp | Control at auxiliary controller |
| Cornering lamp-right | Light device | Direction light circuit | Lamp | Control at auxiliary controller |
| Exhaust brake magnetic valve | Electrical device | Exhaust brake circuit | Coil | Control at auxiliary controller |
| Step light | Light device | Step light circuit | Lamp | Control at auxiliary controller |

The effects of the present invention are as follows:

A plurality of vehicles are connected to the network, and states, location, etc. are automatically and remotely analyzed to provide information on optimal performance of the vehicles.

All electrical devices of a vehicle are integrally and digitally controlled, and to provide a method in which a vehicle is separated into logic regions and all parts of an automotive electrical device are divided into logic regions.

Conventional wiring, connectors and electronic control units are not used, but instead parts of a vehicle are independently provided such that repair and replacement are easily performed.

Circuitry of the vehicle is not realized by the conventional method where parts are connected by wires, and instead is realized by each independent division and method being provided in a memory such that improvements to the vehicle can be easily made without consideration to the effect on various other parts.

All malfunctions in an automotive electrical device can be automatically detected according to part, and all division information is shared; to enable the use of an operating system in a central controller to, in turn, enable control by referencing integrated code data in the operating system, thereby allowing easy development of an application program; to digitize an automotive electrical device to enable use of digital equipment such as computer software and hardware; and to enable the transmission and reception of automotive information through the Internet such that integrated code data communication between vehicles themselves, vehicles and offices, etc. is possible such that states of a vehicle can be remotely checked, analyzed and controlled.

What is claimed is:

1. An integrated digital control system for an automotive electrical device comprising:

switch means for controlling a plurality of portions of a vehicle, the switch means including switches;

switch monitor means for displaying switch functions and operational states of the switches input from the switch means;

switch control means for generating pulse signals corresponding to the switches operated and controlling the switch monitor means;

auxiliary control means for performing input/output control, malfunction detection and automatic control of each portion of the vehicle;

central control means for performing control of the auxiliary control means and all data;

instrument panel/monitor means for performing an instrument panel simulation and applications program graphic processing according to control by the central control means; and RPM pulse generating means for providing RPM pulses to the central control means and the auxiliary control means through an RPM pulse cable.

2. The integrated digital control system of claim 1 wherein the switch means comprises panel switch means including switches in a panel configuration for the control of each portion of the vehicle; remote switch means for enabling the switches of the panel switch means to be freely positioned; and means for generating pulses according to depressed switches.

3. The integrated digital control system of claim 2 wherein the panel switch means comprises S2 switches that are mode switches able to call the switches; S2 switches for individually operating the switches appearing on a screen of the switch monitor means; and P switches for varying a function of the switches according to an on operation of the S2 switch.

4. The integrated digital control system of claim 3 wherein the S2 switches alter the screen of the switch monitor means through a switch screen corresponding to a depressed switch, and which generates pulses according to the depressed switch.

5. The integrated digital control system of claim 3 wherein the P switches connect switches in the screen of the switch monitor means through a single switch, and are used as automatic operational switches when operated all at once.

6. The integrated digital control system of claim 2 wherein the remote switch means comprises P increase and P reduction switches for increasing and reducing P switches in the panel switch means during operation of the P switches; S2 increase and S2 reduction switches for temporarily increasing and reducing, by as many times as they are depressed, on positions of S2 switches of the panel switch means; and check/cancel switches for performing a check using a program when the switches are automatically controlled.

7. The integrated digital control system of claim 6 wherein if there is no switch input during a predetermined delay time in an on state of the S2 switches, which are increased and decreased, the S2 increase and S2 reduction switches are automatically initialized to a characteristic S2 switch value established in the remote switch means.

8. The integrated digital control system of claim 1 wherein the switch monitor means displays operational states of switches according to control by the switch control means by illuminating switch LEDs.

9. The integrated digital control system of claim 1 wherein the switch control means comprises chattering removal units for removing chattering generated at switch contact points during switch input of panel and remote switch means; toggle state memory units for separating odd operational frequencies and even operational frequencies of the switches from output of the chattering removal units; a microcomputer for outputting control values and pulse values corresponding to the input of the switches; a plurality of switch ports connected to the toggle state memory units and which enable reading of a presently pressed switch button by the microcomputer; an interrupt generator for enabling the microcomputer to read a port generated by the switches when the switches are depressed; a self-diagnosis interface unit for performing a self-diagnosis; a monitor output port and an LED output port for outputting display control values and switch LED control values of the switch monitor means, which are output from, the microcomputer through a data bus connected to each port and the microcomputer to the switch monitor means and the switch LEDs; and a pulse output unit connected to the microcomputer and which outputs pulse values corresponding to each switch input to the auxiliary control means.

10. The integrated digital control system of claim 1 wherein the switch means includes a ROM storing a systems operation program and a RAM for data processing.

11. The integrated digital control system of claim 1 wherein the auxiliary control means includes units corresponding on a 1:1 basis with logic regions of the vehicle.

12. The integrated digital control system of claim 1 wherein the auxiliary control means processes through software all electrical parts of the vehicle.

13. The integrated digital control system of claim 1 wherein the auxiliary control means comprises a variable sensor input unit to which all main variable sensors, auxiliary variable sensors, main switch sensors and auxiliary switch sensors are connected; a pulse sensor input unit to which all main pulse sensors and auxiliary pulse sensors are connected; a sensor input A/D converter for converting to digital values operational values of the variable sensors and switch sensors input to the variable sensor input unit; a pulse counter for converting to standard and digital values, pulses generated in all the pulse sensors, and counting the pulses; a switch input unit for reading all switching input; a switching pulse counter for standardizing then converting to digital values output of the switch input unit; a self-diagnostic unit for performing a self-diagnosis to determine the presence of irregularities in the system when power to the electrical device is initially applied; a microcomputer for receiving input via a data bus from the sensor input A/D converter, the pulse counter, the switching pulse counter and the self-diagnostic unit, and which transmits corresponding control values to enable control of each element of the vehicle; an interrupt generator for enabling the microcomputer to read pulse output of the pulse counter and the switching pulse counter; a power supplier for supplying power to each part of the system; a fuse unit connected to the power supplier and which acts to protect the system; a relay/TR output unit connected to the fuse unit and which controls each element of the vehicle having a motor; an output interface unit for operating the relay/TR output unit according to control values output from the microcomputer and received via the data bus; a current voltage detector for detecting a voltage supplied to the relay/TR output unit, converting the voltage to a digital value, and inputting the digital value to the microcomputer via the data bus; an output return unit for monitoring an output of the output controller and inputting the output to the microcomputer through the data bus for use in malfunction detection; and a fuse return unit for detecting a state of the fuse unit and inputting detection results to the microcomputer through the data bus for use in detecting malfunctions in various devices.

14. The integrated digital control system of claim 13 wherein the auxiliary control means further comprises a ROM for storing a program for controlling the system, and a RAM, which is a memory for processing data.

15. The integrated digital control system of claim 13 wherein the auxiliary control means further comprises a pulse output unit for controlling various pulse-control-type devices according to control by the microcomputer, and a communications port for transmitting various data results processed in the microcomputer to the central control means.

16. The integrated digital control system of claim 13 wherein identical sensors are used for the main sensors and auxiliary sensors to provide back-up in case one sensor malfunctions.

17. The integrated digital control system of claim 13 wherein the relay/TR output unit comprises a reference resistor connected to a battery supply and which reads a voltage drop that flows as a load; a relay having a relay coil connected to the reference resistor through a fuse, an "a" contact point connected to a protection resistor one end of which is connected to the fuse, a "b" contact point grounded to a battery supply, a "c" contact point connected to both an output terminal, which is connected to vehicle devices, and a current detection input terminal; a diode connected to both ends of the relay coil of the relay and which absorbs a surge voltage generated by the relay coil; a first zener diode and first and second resistors for protecting the current voltage detector from excess voltage flowing to the current detection input terminal and for generating a needed voltage; a second zener diode, an anode terminal of which is grounded and a cathode terminal of which is connected to a third resistor and an interface diagnosis port to protect the output return interface from excess voltage; and a third zener diode, an anode terminal of which is grounded and a cathode terminal of which is connected between the fuse and the relay coil, and, at the same time, to a fuse diagnosis port to protect the fuse return interface from excess voltage.

18. The integrated digital control system of claim 17 wherein the reference resistor is a metallic resistor.

19. The integrated digital control system of claim 13 wherein the relay has an output of a battery+power voltage in a state where the output port is in an on state, and an output of a battery−power voltage in a state where the output port is in an off state.

20. The integrated digital control system of claim 13 wherein motors connected to the relay/TR output unit include a pulse ring for detecting rpm of the motors, and a main pulse sensor and an auxiliary pulse sensor for reading motor rpm, the pulse ring, main pulse sensor, and auxiliary pulse sensor being mounted on or adjacent to a rotational shaft of the motors.

21. The integrated digital control system of claim 20 wherein non-contact sensors are used for the main pulse sensor and the auxiliary pulse sensor.

22. The integrated digital control system of claim 1 wherein the central control means references integrated code data, permanently stores the integrated code data, and includes an operations system for controlling an applications program based in the integrated code data.

23. An integrated digital control method for an automotive electrical device comprising the steps of:
logically dividing a plurality of portions of a vehicle into predetermined regions;
performing digital conversion of corresponding input/output data according to each divided region, and analyzing the input data according to region and performing integrated management into integrated code data to control the electrical device in the corresponding region;
detecting malfunctions of the electrical device in the corresponding region; and controlling the detected malfunction in the corresponding region.

24. The method of claim 23 wherein the detection of malfunctions in the electrical device is realized through a sensor malfunction detection routine comprising the steps of:
detecting a disconnection, short, or error malfunction by referencing converted data of variable sensors or pulse sensors if a predetermined timer interrupt value is a predetermined variable sensor or pulse sensor malfunction detection execution value, and recording the malfunction; and
detecting and recording an operational frequency if the timer interrupt value is an operational frequency detection execution value.

25. The method of claim 24 wherein the detection of a sensor disconnection malfunction comprises the steps of:
comparing a sensor value with a predetermined disconnection value;
comparing a disconnection detection frequency with a predetermined disconnection determination value if the sensor value is greater than the predetermined disconnection value; and
determining that there is a sensor disconnection if the disconnection detection frequency is greater than the predetermined disconnection determination value.

26. The method of claim 24 wherein the detection of a sensor short malfunction comprises the steps of:
comparing a sensor value with a predetermined short value;
comparing a short detection frequency with a predetermined short determination value if the sensor value is greater than the predetermined short value; and
determining that there is a sensor short if the short detection frequency is greater than the predetermined short determination value.

27. The method of claim 24 wherein the detection of a sensor error malfunction comprises the steps of:
determining if sensing values of a main sensor and an auxiliary sensor are identical;
comparing an error detection frequency of a corresponding sensor with a predetermined error determination value if the sensing values of the main and auxiliary sensors are not identical; and
determining that there is an error in the corresponding sensor if the error detection frequency is greater than the predetermined error determination value.

28. The method of claim 24 wherein the detection of the operational frequency of the sensor comprises the steps of:
determining if a corresponding sensor is established as a frequency detection sensor;
determining if the corresponding sensor corresponds to an overall operation state if the corresponding sensor is established as a frequency detection sensor; and
determining an increase in the operation frequency of the corresponding sensor if the corresponding sensor corresponds to an overall operational state.

29. The method of claim 23 wherein the detection of malfunctions in the electrical device is realized through a malfunction detection routine comprising the steps of:
detecting a short or disconnection malfunction of devices connected to output ports if a timer value is a predetermined short or disconnection malfunction detection execution value of a corresponding output element, and recording the malfunction; and
detecting and recording the malfunction of the corresponding device if the timer value is the predetermined malfunction detection execution value.

30. The method of claim 29 wherein the short malfunction detection of the corresponding output element comprises the steps of:
comparing a short detection frequency of the corresponding output element with a predetermined short determination value if a current value of the corresponding output element is greater than a predetermined short value; and determining that there is a short in the corresponding output element if the short detection frequency is greater than the short determination value.

31. The method of claim 29 wherein the disconnection malfunction detection of the corresponding output element comprises the steps of:
comparing a disconnection detection frequency of the corresponding output element with a predetermined disconnection determination value if a current value of the corresponding output element is less than a predetermined disconnection value; and
determining that there is a disconnection in the corresponding output element if the disconnection detection frequency is greater than the disconnection determination value.

32. The method of claim 23 wherein the detection of malfunctions in the electrical device is realized through a motor malfunction detection routine comprising the steps of:
detecting a position control motor malfunction if a predetermined timer interrupt value becomes a predetermined malfunction detection value of a corresponding position control motor; and
determining a malfunction in a motor rotational state of the corresponding motor if the timer interrupt value becomes the predetermined malfunction detection value of the corresponding motor.

33. The method of claim 32 wherein in the detection of a malfunction in the corresponding position control motor, a malfunction is determined to have occurred if the corresponding motor has not reached a stop position within a predetermined delay effective time.

34. The method of claim 32 wherein the detection of a malfunction in the corresponding position control motor comprises the steps of:
comparing a malfunction detection frequency of the corresponding motor with a predetermined malfunction determination value if a rotational value of the corresponding motor is less than a predetermined malfunction permission limit value; and
determining that the corresponding motor is experiencing a rotational malfunction if the malfunction detection frequency is greater than the malfunction determination value.

35. The method of claim 23 wherein the controlling of the electrical device is realized through a motor position control routine comprising the steps of:
stopping a corresponding motor if a position value of the corresponding motor is within a stop value permission range, which is determined in the case where a predetermined timer interrupt value is identical to a predetermined motor control operational value;
performing control for the reverse rotation of the corresponding motor if the position value of the motor is greater than the stop value, which is determined in the case where the position value of the corresponding motor is not within the stop value permission range; and
performing control for the forward rotation of the corresponding motor if the position value of the corresponding motor is smaller than the stop value.

36. The method of claim 23 wherein the malfunction detection of the electrical device is realized through rotational state malfunction detection of devices rotating by engine torque comprising the steps of:
comparing a malfunction detection frequency with a predetermined malfunction determination value if a rotational ratio is greater than a predetermined permission limit value; and
determining that there is a malfunction in a rotational state of a corresponding rotating element if the malfunction detection frequency is greater than the predetermined permission limit value.

37. The method of claim 23 wherein the malfunction detection and control of the electrical device is realized through battery connection defect detection and control comprising the steps of:
comparing a battery connection defect detection frequency with a predetermined battery connection defect detection determination value if engine RPM is greater than a standard value and a battery B voltage is greater than an M voltage; and
recording a battery connection defect and converting to a low voltage charge is the battery connection defect detection frequency is greater than the battery connection defect detection determination value.

38. The method of claim 23 wherein the malfunction detection and control of the electrical device is realized through generator output wire connection defect detection and control comprising the steps of:
comparing a generator output wire connection defect detection frequency with a predetermined generator output wire connection defect determination value if engine RPM and a generator N voltage value are greater than predetermined values and if a battery voltage is less than a predetermined value; and
discontinuing generator charging and recording a generator output wire connection defect if the generator output wire connection defect detection frequency is greater than the determination value.

39. The method of claim 23 wherein the detection of malfunctions in the electrical device is realized through generator malfunction detection comprising the steps of:
comparing a generator malfunction detection frequency with a predetermined determination value for detecting a generator malfunction if engine RPM and a generator F voltage are greater than predetermined values and if a battery voltage is less than a predetermined value; and
recording a generator malfunction detecting a generator malfunction if the generator malfunction detection frequency is greater than the determination value.

40. The method of claim 23 wherein the detection of malfunctions in the electrical device is realized through generator N wire malfunction detection comprising the steps of:
determining there is a generator N wire malfunction if engine RPM is greater than a predetermined value, a generator N voltage is less than a predetermined value, and a battery voltage is normal, then increasing a generator N wire malfunction detection frequency; and
recording an N wire malfunction and detecting a generator N wire malfunction if the generator N wire malfunction detection frequency is greater than a generator N wire malfunction determination value.

41. The method of claim 23 wherein the malfunction detection and control of the electrical device is realized through generator N danger voltage detection and control comprising the steps of:
comparing an N danger voltage detection frequency with a predetermined generator N danger voltage determination value if a generator N voltage is greater than a danger voltage standard value; and
cutting off a generator F power and recording the discontinuing of the generator F power if the N danger voltage detection frequency is greater than the generator N danger voltage determination value.

42. The method of claim 23 wherein the malfunction detection and control of the electrical device is realized through battery terminal defect detection and control comprising the steps of:
comparing a battery terminal defect detection frequency with a predetermined generator terminal defect determination value if an RPM is greater than a predetermined value and a generator M voltage is less than a predetermined value; and
converting to low voltage charging if the battery terminal defect detection frequency is greater than the generator terminal defect determination value, the recording the battery terminal defect.

43. The method of claim 23 wherein the malfunction detection and control of the electrical device is realized through excess voltage detection and control comprising the steps of:

comparing an excess voltage detection frequency with an excess voltage determination value if a battery voltage is greater than a predetermined excess voltage value; and recording an excess voltage detection and a voltage regulator malfunction, and converting to an auxiliary voltage regulator, if the excess voltage detection frequency is greater than the determination value.

44. The method of claim 23 wherein the malfunction detection of the electrical device is realized through voltage regulator malfunction detection comprising the steps of:
comparing a voltage regulator malfunction detection frequency with a predetermined voltage regulator malfunction determination value if engine RPM is greater than a predetermined value and if a battery voltage is less than a predetermined generator F voltage; and
recording a voltage regulator malfunction if the voltage regulator malfunction detection frequency is greater than the predetermined voltage regulator malfunction determination value.

45. The method of claim 23 wherein the malfunction detection and control of the electrical device is realized through danger voltage detection and control comprising the steps of:
comparing a danger voltage detection frequency with a determination value for determining a danger voltage if a battery voltage is greater than a predetermined danger voltage value;
and cutting off a generator F power and recording a danger voltage detection if the danger voltage detection frequency is greater than the determination value.

46. The method of claim 23 wherein the control of the electrical device is realized by, where there is switch pulse input, counting switching pulses during a switching pulse input effective interval and a corresponding switch input interrupt is generated and controlled.

47. The method of claim 23 wherein the control of the electrical device is realized through a switch input processing procedure comprising the steps of:
(a) generating a pulse corresponding to a depressed switch when a panel switch is depressed for control of the electrical device, and refreshing a screen of a switch monitor means;
(b) increasing or reducing a temporary S2 switch value according to a value of an S2 temporary change effective timer during input of an S2 increase or decrease switch of a remote switch means for controlling the electrical device, then recharging the S2 temporary change effective timer and outputting a corresponding pulse to refresh the screen of the switch monitor means; and
(c) outputting an increased or decreased pulse from a P increase or decrease switch on position to a present S2 value according to the S2 temporary change effective timer value during input of the P increase or decrease switch of a remote switch means for controlling the electrical device, and refreshing the screen of the switch monitor means.

48. The method of claim 47 wherein in step (b), during the S2 increase switch input, if the S2 temporary change effective timer is 0, an S2 switch position value is converted to a standard S2 switch value and the S2 temporary change effective timer is recharged, and if not 0, the temporary S2 switch value is increased, the S2 temporary change effective timer is recharged, and the corresponding pulse is output to refresh the screen of the switch monitor means.

49. The method of claim 48 wherein if the S2 temporary change effective timer is not 0, only when a present S2 temporary change switch position value is not a final switch value is the temporary S2 switch value increased.

50. The method of claim 47 wherein in step (b), during the S2 decrease switch input, if the S2 temporary change effective timer is 0, the screen of the switch monitor means is refreshed, and if not 0, the temporary S2 switch value is decreased, the S2 temporary change effective timer is recharged, and the corresponding pulse is output to refresh the screen of the switch monitor means.

51. The method of claim 50 wherein if the S2 temporary change effective timer is not 0, only when a present S2 temporary change switch position value is not a standard S2 switch value is the temporary S2 switch value decreased.

52. The method of claim 47 wherein in step (c), during the P increase or decrease switch input, if the S2 temporary change effective timer is 0, an S2 position pointer is renewed to a predetermined characteristic S2 position pointer position, an increased or decreased position pulse from a P increase or decrease switch on position to a present S2 value, and a pulse is generated, and if the S2 temporary change effective timer is not 0, the S2 temporary change effective timer is recharged, an increased or reduced position pulse from the P increase or decrease switch on position is added to a present temporary S2 value, and a corresponding pulse is output to refresh the screen of the switch monitor means.

53. The method of claim 52 wherein if the present P increase switch on position is not a final switch during P increase switch input, increase is performed and a corresponding control code is output.

54. The method of claim 52 wherein if the present P decrease switch on position is not an initial switch during P decrease switch input, decrease is performed and a corresponding control code is output.

55. An integrated digital control method for an automotive electrical device comprising the steps of:
   digitally processing input data separately according to divided regions of the vehicle;
   analyzing the digitally processed input data according to region and performing integrated control;
   digitally controlling electrical devices according to region, and performing the detection of malfunctions generated in the electrical devices and controlling the malfunctions; and
   performing intelligent processing of electrical parts.

56. The method of claim 55 wherein the intelligent processing of electrical parts is realized through an electrical part control-type program.

57. The method of claim 55 wherein the intelligent processing of electrical parts is realized through a speed control controller routine comprising the steps of:
   determining if a present speed is greater than a predetermined value if a timer value is a predetermined speed control execution value;
   re-establishing a speed control motor at a stop position if the present speed is greater than the predetermined speed control execution value; and
   re-establishing the speed control motor at an acceleration position if the present speed is not greater than the predetermined speed control execution value.

* * * * *